US006697584B2

(12) United States Patent
Tsunoda et al.

(10) Patent No.: US 6,697,584 B2
(45) Date of Patent: Feb. 24, 2004

(54) IMAGE FORMATION APPARATUS AND TONE QUALITY IMPROVING METHOD OF IMAGE FORMATION APPARATUS

(75) Inventors: Koichi Tsunoda, Tokyo (JP); Motohisa Hirono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/189,232

(22) Filed: Jul. 5, 2002

(65) Prior Publication Data

US 2003/0123897 A1 Jul. 3, 2003

(30) Foreign Application Priority Data

Jul. 6, 2001 (JP) ....................................... 2001-206500
Jun. 3, 2002 (JP) ....................................... 2002-162122
Jun. 18, 2002 (JP) ....................................... 2002-177500

(51) Int. Cl.[7] .......................... G03G 15/00; G01H 3/00
(52) U.S. Cl. ....................................... 399/91; 381/71.1
(58) Field of Search ...................... 399/1, 91; 381/71.1, 381/71.2, 71.3

(56) References Cited

U.S. PATENT DOCUMENTS 4,647,961 A 3/1987 Kammoto et al.
4,841,358 A 6/1989 Kammoto et al.
4,954,849 A 9/1990 Koike et al.
4,968,997 A 11/1990 Saitoh et al.
4,975,749 A 12/1990 Tsunoda et al.
4,979,727 A 12/1990 Koike et al.
5,014,091 A 5/1991 Koike et al.
5,194,959 A 3/1993 Kaneko et al.
5,404,206 A 4/1995 Andoh et al.
6,157,797 A 12/2000 Saito et al.
6,215,974 B1 4/2001 Katoh et al.
6,256,461 B1 7/2001 Takeyama et al.
6,292,641 B1 9/2001 Takeyama et al.
6,308,027 B1 10/2001 Obu et al.
6,466,752 B2 * 10/2002 Tsunoda ...................... 399/91

FOREIGN PATENT DOCUMENTS

JP 5-188839 7/1993
JP 6-208385 7/1994
JP 7-295318 11/1995
JP 9-175693 7/1997
JP 9-193506 7/1997
JP 9-197921 7/1997
JP 10-232163 9/1998
JP 10-253440 9/1998
JP 10-253442 9/1998
JP 10-267742 10/1998
JP 10-267743 10/1998
JP 11-188945 A * 7/1999
JP 2001-13704 * 1/2001

* cited by examiner

*Primary Examiner*—Joan Pendegrass
(74) *Attorney, Agent, or Firm*—Oblon, Spivak, McClelland, Maier & Neustadt, P.C.

(57) ABSTRACT

A discomfort index of sound is obtained by an equation using the loudness value, sharpness value, tonality value and impulsiveness value of psychoacoustic parameters obtained from sounds at a position away from the end face of an image formation apparatus by 1 m. The discomfort index is decreased by reducing the high frequency component, charging noise, metallic impulsive sound and the like of the image formation apparatus, to thereby contribute to the improvement of the use environment.

141 Claims, 21 Drawing Sheets

IMAGE FORMATION APPARATUS AND TONE QUALITY IMPROVING METHOD OF IMAGE FORMATION APPARATUS

FIELD OF THE INVENTION

The present invention relates to an image formation apparatus and tone quality improving method of image formation apparatus.

BACKGROUND OF THE INVENTION

In Japanese Patent Application Laid-Open No. 9-193506, there is disclosed an invention relating to "Noise masking apparatus and noise masking method in image formation apparatus". This invention relates to a noise masking apparatus for a laser beam printer, a copying machine or the like, which has a sound-producing object having a drive mechanism, being a source of noise at the time of operation and generating masking sound for masking this noise, and a masking sound control unit which controls this sound-producing object to generate masking sound of a frequency in the range of including the main component frequency of the noise, so as to reduce uncomfortable feeling due to the noise.

In Japanese Patent Application Laid-Open No. 10-232163, there is disclosed an invention relating to "Tone quality evaluation apparatus and tone quality evaluation method". This is for enabling evaluation of only the roaring sound, which is a gloomy noise of low-frequency random noise generated by an air flow system, such as exhaust sound, from the noise constituted by the sound of various tones of the image formation apparatus, to make the correspondence with psychological annoyance easy.

Similarly, in Japanese Patent Application Laid-Open No. 10-253440, there are disclosed a tone quality evaluation apparatus and a tone quality evaluation method which extracts only creaking sound, which is recognized as offensive sound to the ear and is a persistent pure tone quality generated by a scanner motor or a charging device, from noise constituted of sound of various tones of the image formation apparatus and performs evaluation.

In Japanese Patent Application Laid-Open No.10-253442, there are disclosed a tone quality evaluation apparatus and a tone quality evaluation method which makes it possible to evaluate only "sha" sound, which is a high-frequency random noise due to rubbing of the sheet of paper, from the noise constituted of sound of various tones of the image formation apparatus.

In Japanese Patent Application Laid-Open No. 10-267742, there are disclosed a tone quality evaluation apparatus and a tone quality evaluation method which makes it possible to evaluate only the moaning sound consisting of pure sound having peaks in a plurality of adjacent frequencies especially due to beat of the drive system, from the noise constituted of sound of various tones of the image formation apparatus.

In Japanese Patent Application Laid 7Open No.10-267743, there are disclosed a tone quality evaluation apparatus and a tone quality evaluation method as described below. That is, in the noise constituted of sound of various tones of the image formation apparatus, if there is no pure sound or moan, that is, when there is no protruding component in the frequency wavelength, it is felt smooth. Based on this, when the annoyance felt by human is generally referred to smoothness, the apparatus and the method can-evaluate the smoothness of sound.

According to the invention described in Japanese Patent Application Laid-Open No. 9-193506, it is considered that the noise level is increased, by adding the masking sound to this generated noise, not by reducing the generated noise.

There is a disadvantage in that it requires a sound-producing object for generating the masking sound, and a control unit and a speaker for generating the masking sound only while the sound to be masked is generated, thereby increasing extra space in the layout of the machine and increasing the cost considerably.

In the series of inventions relating to the above-described tone quality evaluation apparatus and tone quality evaluation method, only the tone quality evaluation method is proposed, and a tone quality improving method of the actual product is not described.

Recently, from a viewpoint of softness to the environment, there is an increasing interest in the noise problem, and there is an increasing demand for solving the noise problem of the OA equipment in offices. Therefore, attempts have been made for quieting down the OA equipment, and considerably quiet environment has been achieved than before. Currently, as a method of evaluating the noise in the OA equipment, there are generally used a sound power level and a sound pressure level (ISO7779). However, these levels indicate values of acoustic energy generated by the office equipment such as a copying machine and a printer, and hence the correlation between these values and the human's subjective discomfort with respect to the noise may not be good.

For example, when sounds having the same value of the sound pressure level (equivalent noise level Leq: a value obtained by averaging the energy over the whole measuring time) are heard and compared, there may be a difference in the discomfort due to a difference in the sound frequency distribution or the existence of impulsive sound. Further, even if the value of the sound pressure level is small, but if a high-frequency component or a pure sound component is included, the sound may be felt uncomfortable.

Therefore, in order to improve the future office environment, not only the evaluation and reduction of the OA equipment by the sound power level and the sound pressure level, but also evaluation and improvement of the tone quality are both necessary. For the evaluation and improvement of the tone quality, it is necessary to carry out quantitative measurement of the tone quality for understanding the current situation, and to measure how much improvement has been achieved before and after the improvement. However, since the tone quality is not a physical quantity, quantitative measurement cannot be carried out. Hence, it is difficult to set a target value.

When the tone quality is to be evaluated by human, qualitative expression is obtained, such as "the tone quality has been improved a little", or "the tone quality has been improved considerably", etc. Further, since there is a difference between individuals, the evaluation is different depending on the person, or judgment may be difficult whether the obtained result can be generalized. It is impossible to perform objective evaluation relating to whether there is actually an effect by the measures taken, or how much effect can be obtained, unless the tone quality is quantitatively expressed by physical properties.

Therefore, it is necessary to carry out subjective evaluation tests, and to execute statistical processing, to thereby quantify the tone quality.

There are psychoacoustic parameters as physical quantities for evaluating the tone quality. The representative parameters are as described below (unit is shown in the bracket). (For example, see "Seventh Lecture of Design Engineering/System Section, Design for the 21st century, Aim at innovative progress of the system!", The Japan Society of Mechanical Engineers, Nov. 10 and 11, 1997, "Sound and Vibration and Design Color and Design (1)" Section No. 089B.)

| | |
|---|---|
| Loudness (sone): | Size of audibility |
| Sharpness (acum): | Relative distribution quantity of high-frequency component |
| Tonality (tu): | Tunability, relative distribution tity of pure sound component |
| Roughness (asper): | Rough feeling of the sound |
| Flunctuation strength (vacil): | Fluctuation strength, beat feeling. |

And, other than the above, there has been proposed an instrument capable of measuring the psychoacoustic parameters, such as:

| | |
|---|---|
| Impulsiveness (iu): | Impact property |
| Relative approach: | Fluctuation feeling. |

All the parameters have a tendency that with an increase of the value, the discomfort increases.

Among these, only the loudness is standardized by ISO532B. With regard to other parameters, the basic idea and definition are the same, but since the program and the calculation method are different due to individual research by measuring instrument manufacturers, it is natural that the measurement value differs in each manufacturer. Further, there are original parameters, such as impulsiveness and relative approach, developed originally by the measuring instrument manufacturers.

Noise generated by the OA equipment such as a copying machine and a printer is constituted of noise of various tones due to the complexity of the mechanism. For example, gloomy sound of a low frequency, high-pitched sound of a high frequency, strikingly generated sound and the like are generated from a plurality of sound source such as a motor, paper or a solenoid, while changing timewise.

Human judges these sounds comprehensively to judge whether it is uncomfortable. It is considered that the judgment is performed by executing weighting such that which part of the sound is related with discomfort. That is, there are a psychoacoustic parameter having large influence and a psychoacoustic parameter having small influence with respect to the discomfort, depending on the tone of the machine.

For example, with a high-speed printer having a large number of frequencies of impulsive sound, the impulsive sound is felt unpleasant and hence the relation between the impulsiveness and discomfort becomes large. With a low-speed and relatively quiet desktop printer, since the occurrence of the impulsive sound is few, the charging sound which occurs at the time of AC charging is felt unpleasant and hence the relation between the tonality and discomfort becomes large. Thus, the sound source to be felt unpleasant is different depending on the type of the printer. Therefore, the sound source which requires improvement in the tone quality may be different in a low-speed machine and a high-speed machine.

Accordingly, the tone quality can be efficiently improved by searching a sound source and the psychoacoustic parameter having a large improvement effect with respect to the discomfort, and dropping the psychoacoustic parameter by means of measures against the sound source of the unpleasant sound and transmission measures.

The objective evaluation of the tone quality becomes possible by combining the psychoacoustic parameters having a large improvement effect with respect to the discomfort, performing weighting to the parameters to form a tone quality valuation plan, and calculating the subjective evaluation value with respect to the discomfort. It is expected that the tone quality can be improved based on the objective evaluation.

Based on this idea, the present applicant filed an application in which the discomfort of the OA equipment is expressed by an equation of loudness (the size of audibility) and tonality (relative distribution quantity of a pure sound component), according to subjective evaluation tests and the multiple regression analysis, and a discomfort index S obtained by this equation is decreased by reducing the AC charging sound having high correlation with the tonality. According to this application, the tone quality can be improved in an image formation apparatus of 16 to 20 ppm (low speed) ppm denotes the number of copies per minute for an A4 lateral size.

The present applicant filed an application in which the discomfort of the OA equipment is expressed by an equation of loudness square and sharpness (relative distribution quantity of a high-frequency component), according to subjective evaluation tests and the multiple regression analysis, and a discomfort index S obtained by this equation is decreased by reducing the vibration noise of paper having high correlation with the sharpness. According to this application, the tone quality can be improved in an image formation apparatus of 45 to 75 ppm (high speed).

The present applicant filed an application in which the discomfort of the OA equipment is expressed by an equation of sound pressure level and sharpness, according to subjective evaluation tests and the multiple regression analysis, and a discomfort index S obtained by this equation is decreased by reducing the vibration noise of paper having high correlation with the sharpness. According to this application, the tone quality can be improved in an image formation apparatus of around 27 ppm (medium speed).

However, as described above, since the part which is felt uncomfortable is different depending on the speed, 3 types of tone quality evaluation equations exist. These three tone quality evaluation equations are respectively obtained by using the image formation apparatus of 16 to 20 ppm (low speed), 27 ppm (medium speed) and 45 to 70 ppm (high speed).

The tone quality evaluation value calculated by this tone quality evaluation equation is a value which predicts the grade of sound calculated from the result of subjective intercomparison of sound, and hence there is no unit, and is concluded within the range where the subjective evaluation tests are performed. Therefore, when the tone quality evaluation equation is different, even if the tone quality evaluation value is the same, the discomfort is different.

For example, even if the values calculated by the tone quality evaluation equation for low velocity layers and by the tone quality evaluation equation for medium to high velocity layers are the same, such as 0, the discomfort thereof is not the same.

In the three tone quality evaluation equations, there is a portion where it is not confirmed in the speed range. For example, it is not clear that in the ranges of from 21 to 26 ppm, and from 28 to 44 ppm, which equation should be used or should not be used.

SUMMARY OF THE INVENTION

It is an object of the present invention to provide an image formation apparatus which can reduce the discomfort index in any range of from low speed to high speed, and a method of improving the tone quality of the image formation apparatus.

In the present invention, the above-described three evaluation equations are unified, to derive a tone quality evaluation equation available in the range of from low speed to high speed. Further, a tolerance at which the discomfort is alleviated has been respectively proposed within the range of the three tone quality evaluation equations, and the relation between this tolerance and the image formation speed is approximated. That is, by providing an apparatus which improves the tone quality so that the tone quality becomes lower than the tolerance of the tone quality corresponding to the image formation speed, the problem of the uncomfortable sound relating to the low-speed to high-speed image formation apparatus in the office can be dissolved.

Specifically, according to one aspect of the present invention, there is provided an image formation apparatus in which the discomfort index S of the sound obtained by the following tone quality evaluation equation (a) expressed in a regression equation, using regression coefficients of loudness value, sharpness value, tonality value and impulsiveness value of psychoacoustic parameters obtained from the operating noise at a position away from the end face of the image formation apparatus by a predetermined distance:

$$S = A\times(\text{loudness value}) + B\times(\text{sharpness value}) + C\times(\text{tonality value}) + D\times(\text{impulsiveness value}) + E$$

$$0.209 \leqq A \leqq 0.249$$

$$0.308 \leqq B \leqq 0.439$$

$$3.669 \leqq C \leqq 4.984$$

$$0.994 \leqq D \leqq 1.461$$

$$-4.280 \leqq E \leqq -3.274 \qquad \text{(a)}$$

satisfies the condition of:

$$S \leqq 0.6708\times\text{Ln}\ (\text{ppm}) - 2.824$$

$$16 \leqq \text{ppm} \leqq 70 \qquad \text{(b).}$$

According to another aspect of the present invention, there is provided an image formation apparatus in which the discomfort index S of sound obtained by the following tone quality evaluation equation (c) expressed in a regression equation, using regression coefficients of loudness value, sharpness value, tonality value and impulsiveness value of psychoacoustic parameters obtained from the operating noise at a position away from the end face of the image formation apparatus by a predetermined distance:

$$S = A\times(\text{loudness value}) + B\times(\text{sharpness value}) + C\times(\text{tonality value}) + D\times(\text{impulsiveness value}) + E$$

$$A = +0.229$$

$$B = +0.373$$

$$C = +4.327$$

$$D = +1.202$$

$$E = -3.767 \qquad \text{(c)}$$

satisfies the condition of:

$$S \leqq 0.6708\times Ln(ppm) - 2.824$$

$$16 \leqq \text{ppm} \leqq 70 \qquad \text{(b)}$$

According to still another aspect of the present invention, there is provided an image formation apparatus in which, of the loudness value, the sharpness value, the tonality value, the impulsiveness value and the roughness value of the psychoacoustic parameters obtained from the operating noise at a position away from the end face of the image formation apparatus by a predetermined distance, the roughness value satisfies the condition of not larger than 2.20 (asper), and the discomfort index S of the sound obtained by the following tone quality evaluation equation (a) expressed in the regression equation, using the regression coefficients of loudness value, sharpness value, tonality value and impulsiveness value:

$$S = A\times(\text{loudness value}) + B\times(\text{sharpness value}) + C\times(\text{tonality value}) + D\times(\text{impulsiveness value}) + E$$

$$0.209 \leqq \text{A} \leqq 0.249$$

$$0.308 \leqq \text{B} \leqq 0.439$$

$$3.669 \leqq \text{C} \leqq 4.984$$

$$0.994 \leqq \text{D} \leqq 1.461$$

$$-4.280 \leqq E \leqq -3.274 \qquad \text{(a)}$$

satisfies the condition of:

$$S \leqq 0.6708\times Ln(ppm) - 2.824$$

$$16 \leqq \text{ppm} \leqq 70 \qquad \text{(b)}$$

According to still another aspect of the present invention, there is provided an image formation apparatus in which, of the loudness value, the sharpness value, the tonality value, the impulsiveness value and the roughness value of the psychoacoustic parameters obtained from the operating noise at a position away from the end face of the image formation apparatus by a predetermined distance, the roughness value satisfies the condition of not larger than 2.20 (asper), and the discomfort index S of sound obtained by the following tone quality evaluation equation (c) expressed in a regression equation, using the regression coefficients of loudness value, sharpness value, tonality value and impulsiveness value of psychoacoustic parameters;

$$S = A\times(\text{loudness value}) + B\times(\text{sharpness value}) + C\times(\text{tonality value}) + D\times(\text{impulsiveness value}) + E$$

$$A = +0.229$$

$$B = +0.373$$

$$C = +4.327$$

$$D = +1.202$$

$$E = -3.767 \qquad \text{(c)}$$

satisfies the condition of:

$$S \leqq 0.6708\times Ln(ppm) - 2.824$$

$$16 \leqq \text{ppm} \leqq 70 \qquad \text{(b)}$$

According to still another aspect of the present invention, there is provided an image formation apparatus in which, of the loudness value, the sharpness value, the tonality value, the impulsiveness value and the relative approach value of the psychoacoustic parameters obtained from the operating noise at a position away from the end face of the image formation apparatus by a predetermined distance, the relative approach value satisfies the condition of not larger than 2.21, and the discomfort index S of the sound obtained by the following tone quality evaluation equation (a) expressed in a regression equation, using the regression coefficients of loudness value, sharpness value, tonality value and impulsiveness value:

$$S=A\times(\text{loudness value})+B\times(\text{sharpness value})+C\times(\text{tonality value})+D\times(\text{impulsiveness value})+E$$

$$0.209\leqq A\leqq 0.249$$

$$0.308\leqq B\leqq 0.439$$

$$3.669\leqq C\leqq 4.984$$

$$0.994\leqq D\leqq 1.461$$

$$-4.280\leqq E\leqq -3.274 \qquad (a)$$

satisfies the condition of:

$$S\leqq 0.6708\times Ln(ppm)-2.824$$

$$16\leqq ppm\leqq 70 \qquad (b).$$

According to still another aspect of the present invention, there is provided an image formation apparatus in which, of the loudness value, the sharpness value, the tonality value, the impulsiveness value and the relative approach value of the psychoacoustic parameters obtained from the operating noise at a position away from the end face of the image formation apparatus by a predetermined distance, the relative approach value satisfies the condition of not larger than 2.21, and the discomfort index S of sound obtained by the following tone quality evaluation equation (c) expressed in a regression equation, using the regression coefficients of loudness value, sharpness value, tonality value and impulsiveness value of psychoacoustic parameters:

$$S=A\times(\text{loudness value})+B\times(\text{sharpness value})+C\times(\text{tonality value})+D\times(\text{impulsiveness value})+E$$

$$A=+0.229$$

$$B=+0.373$$

$$C=+4.327$$

$$D=+1.202$$

$$E=-3.767 \qquad (c)$$

satisfies the condition of:

$$S\leqq 0.6708\times Ln(ppm)-2.824$$

$$16\leqq ppm\leqq 70 \qquad (b).$$

According to still another aspect of the present invention, there is provided an image formation apparatus in which the discomfort index S of the sound obtained by the following tone quality evaluation equation (e) expressed in a regression equation, using the regression coefficients of sound pressure level, and loudness value, sharpness value, tonality value and impulsiveness value of the psychoacoustic parameters obtained from the operating noise at a position away from the end face of the image formation apparatus by a predetermined distance, and ppm (number of printed sheets of paper per minute of A4 lateral size) value:

$$S=G\times(\text{sound pressure level value})+A\times(\text{loudness value})+B\times(\text{sharpness value})+C\times(\text{tonality value})+D\times(\text{impulsiveness value})+F\times(\text{ppm value})+E$$

$$0.0442\leqq G\leqq 0.0830$$

$$0.0678\leqq A\leqq 0.1677$$

$$0.3629\leqq B\leqq 0.5084$$

$$2.5473\leqq C\leqq 4.0677$$

$$-0.0533\leqq D\leqq 0.3279$$

$$-0.0058\leqq F\leqq 0.0006$$

$$-3.7769\leqq E\leqq 7.6274 \qquad (e)$$

satisfies the condition of:

$$S\leqq 0.5432\times Ln(ppm)-2.3398$$

$$16\leqq ppm\leqq 70 \qquad (f).$$

According to still another aspect of the present invention, there is provided an image formation apparatus in which the discomfort index S of the sound obtained by the following tone quality evaluation equation (g) expressed in a regression equation, using the regression coefficients of sound pressure level, and loudness value, sharpness value, tonality value and impulsiveness value of the psychoacoustic parameters obtained from the operating noise at a position away from the end face of the image formation apparatus by a predetermined distance, and ppm (number of printed sheets of paper per minute of A4 lateral size) value:

$$S=G\times(\text{sound pressure level value})+A\times(\text{loudness value})+B\times(\text{sharpness value})+C\times(\text{tonality value})+D\times(\text{impulsiveness value})+F\times(\text{ppm value})+E$$

$$G=+0.0636$$

$$A=+0.1178$$

$$B=+0.4356$$

$$C=+3.3075$$

$$D=+0.1373$$

$$F=-0.0026$$

$$E=-5.7022 \qquad (g)$$

satisfies the condition of:

$$S\leqq 0.5432\times Ln(ppm)-2.3398$$

$$16\leqq ppm\leqq 70 \qquad (f).$$

According to still another aspect of the present invention, there is provided the tone quality improving method of an image formation apparatus, wherein the noise of the electromagnetic clutch of the paper feed unit having the correlation with the impulsiveness value, loudness value and sharpness value is decreased.

Other objects and features of this invention will become understood from the following description with reference to the accompanying drawings.

DETAILED DESCRIPTION

The present invention relates to an image formation apparatus such as copying machines, printers and facsimile systems, which generate noise such as motor driving noise, impulsive sounds due to the operation of a clutch or a solenoid, charging noise and carrying noise of a recording medium, at the time of operation, and a tone quality improving method of the image formation apparatus.

A first embodiment of an image formation apparatus according to the present invention will now be explained in order of "configuration of the image formation apparatus", "derivation of a tone quality evaluation equation of the image formation apparatus", and "measures for reducing uncomfortable sound of the image formation apparatus", with reference to the accompanying drawings. The present invention is not limited to the embodiments shown below.

(Construction of the Image Formation Apparatus)

Figure 1:
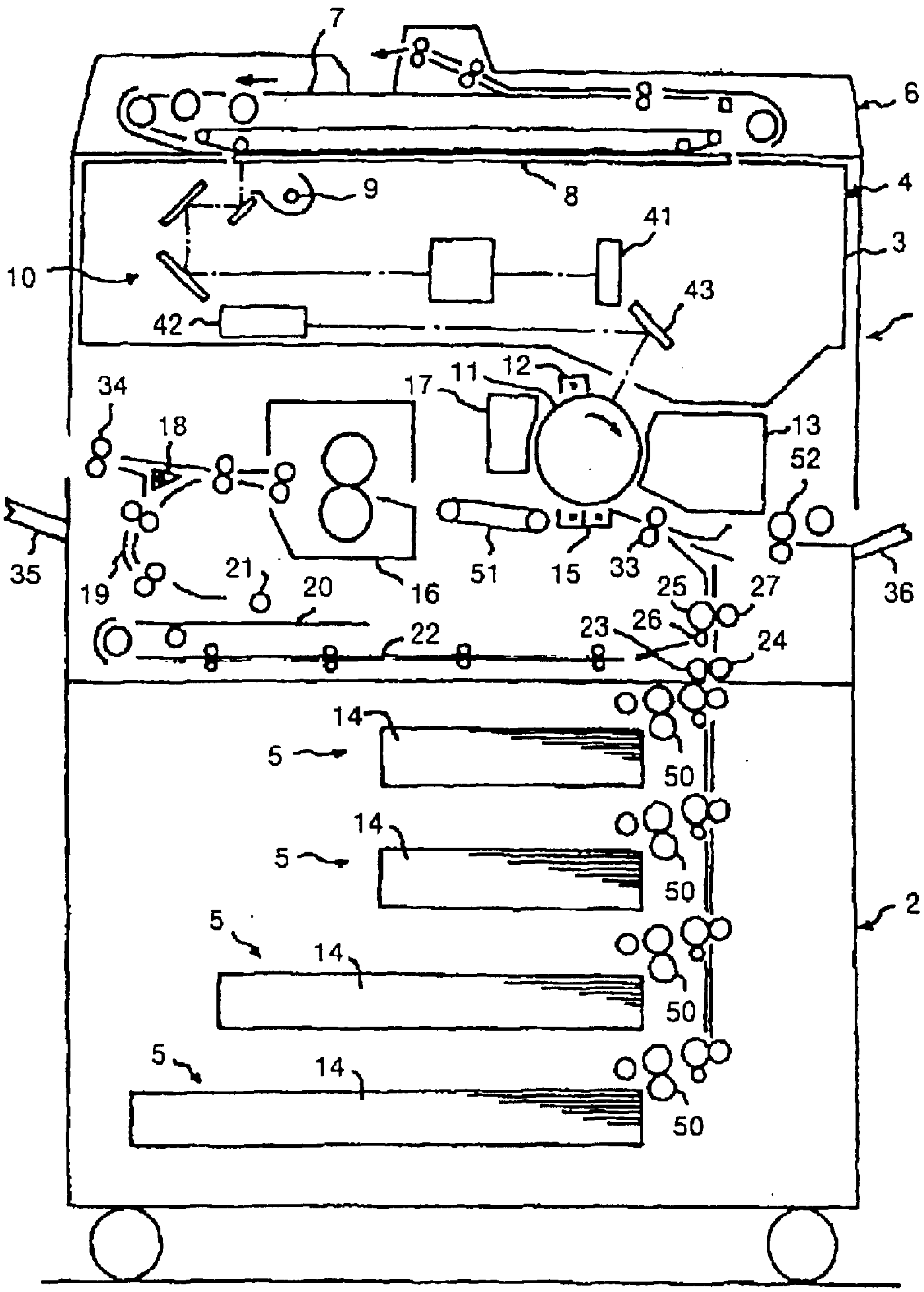
FIG. 1 is a schematic elevational view which shows a digital copying machine as an image formation apparatus.

FIG. 1 is a block diagram which shows an outline of a digital copying machine, being an example of an image formation apparatus. For easy understanding of the present invention, the overall configuration and the operation of the image formation apparatus will be briefly explained.

The digital copying machine shown in FIG. 1 is generally referred to as a console-type copying machine, in which the overall height thereof is set high so that it can be installed on the floor, and the whole body is constituted by an upper part 1 and a lower part 2. A high-speed machine has generally this configuration.

The upper part 1 has an optical unit 4 which houses optical elements in a case 3, and each unit of an image formation system located below the optical unit 4. The lower part 2 has a plurality of paper feed units 5. Above the upper part 1, there is mounted an automatic document feeder (ADF) 6. The original document (not shown) placed on an original table 7 of the automatic document feeder 6 is automatically fed onto a contact glass 8 supported by the case 3 of the optical unit 4 and stopped.

A light source 9 of the optical unit 4 moves from the position shown in FIG. 1 to the right, and at this time, the document face is illuminated by the light source 9, and the document image is formed on a CCD 41 by an image formation optical system 10.

The document image formed on the CCD 41 is photoelectrically exchanged by the CCD 41, to become an analog electric signal. This analog electric signal is converted to a digital electric signal by an A/D converter which converts an analog value to a digital value.

The digital electric signal is subjected to the image processing, and transferred to a writing unit 42. From the writing unit 42, a light beam based on the digital signal is generated, and is emitted onto the photosensitive material 11 via a mirror 43.

The photosensitive material 11 rotates in the clockwise direction, and at this time, the surface thereof is charged uniformly by an electrification charger 12, so that the document image is formed on the charged surface. Thereby, an electrostatic latent image is formed on the photosensitive material 11, and this latent image is turned into a visible image as a toner image by a developing unit 13.

On the other hand, paper 14 is carried from any of the paper feed units 5 arranged in the lower part 2 towards the photosensitive material 11, and the toner image on the photosensitive material 11 is transferred to the paper 14 by a transfer charger 15.

In order to make the copying time of the first sheet as short as possible, there is a mode in which after the paper has been separated by a paper feed member 50, a transfer motor (not shown) is rotated at a high speed, to carry the paper at a high speed to the photosensitive material 11.

The paper 14 on which the toner image is transferred is carried by a carrier belt 51, and passes through a fixing unit 16, in which the transferred toner image is fixed on the paper. Then, the paper is ejected as a copy paper onto a feeder output tray 35.

The toner remaining on the photosensitive material 11 after the toner image has been transferred is removed by a cleaning unit 17. In this copying machine, the operation of forming a copy on the opposite sides of the paper (duplex copying mode) is possible.

In the duplex copying mode, a copied image is formed on the surface of the paper (first surface) to finish fixation, and the paper passes through a switching claw 18 and a paper carrier path 19 and is arranged on an intermediate tray 20 for the next paper feed. When a copy is to be made on the back face (second surface) of the paper, a paper feed roller 21 of the intermediate tray 20 operates at a timing of feeding the paper, so that the paper on the intermediate tray 20 is switched back and fed so as to pass through a paper refeed carrier path 22, and carried to a transport section which guides both the transport from the paper feed tray and the transport from the intermediate tray for duplex copying towards a resist roller pair 33, to thereby perform the above-described duplex operation.

Figure 2:
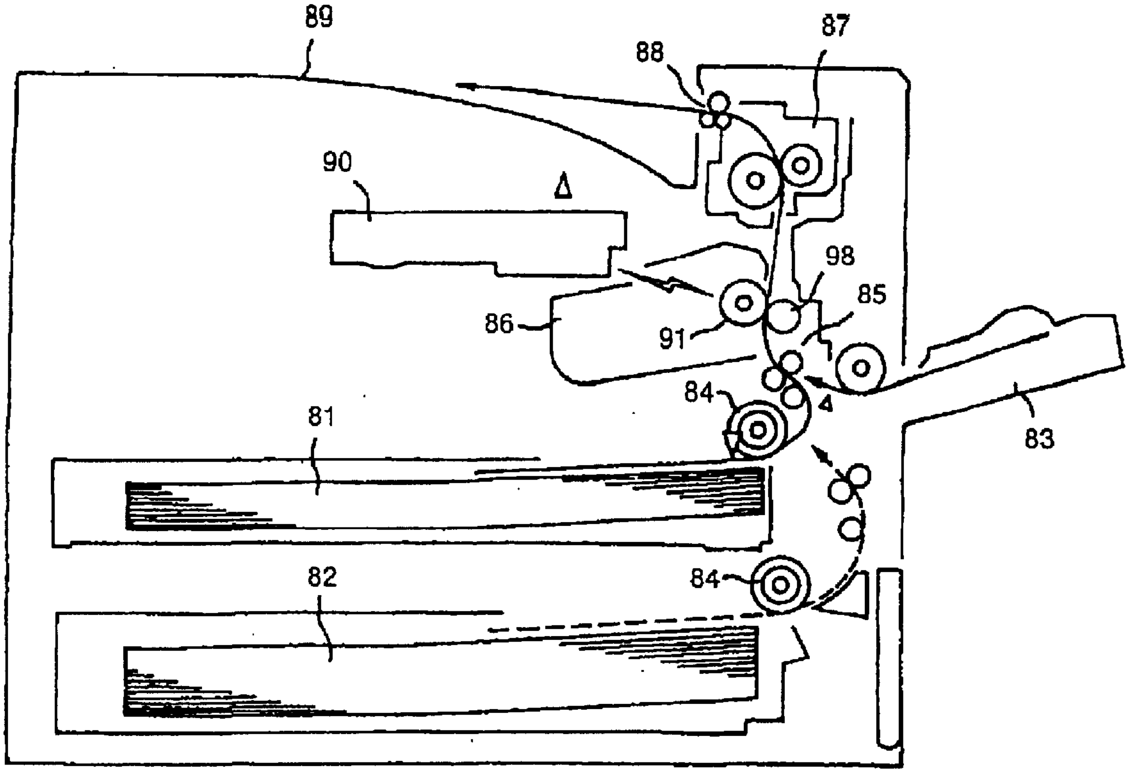
FIG. 2 is a schematic elevational view which shows an image formation apparatus of another type.

FIG. 2 is a schematic elevational view which explains the desktop type image formation apparatus, wherein a paper feed transport system including a main body tray 81, a bank feed tray 82, a manual feed tray 83, a feed roller 84 and a resist roller 85 is arranged, and above the paper feed transport system, there are arranged a process cartridge 86, a fixing unit 87, a paper ejection roller 88 and a feeder output tray 89. The transfer paper is fed from the paper feed transport system through the process cartridge 86, and then passes through the fixing unit 87, the paper ejection roller 88 and the feeder output tray 89.

Above the process cartridge 86, there are arranged an image writing unit 90 comprising an LD unit, a polygon mirror, an fθ mirror (not shown), and the like. In addition to that, the image formation apparatus has a drive transmission system including a drive motor, a solenoid and a clutch (not shown), for driving and rotating the photosensitive drum 91 and rollers.

In such a configuration, at the time of image formation, the driving noise of the drive motor and the drive transmission system, the operation noise of the solenoid and the clutch, noise at the time of transporting the paper and the charging noise are emitted.

Figure 3:
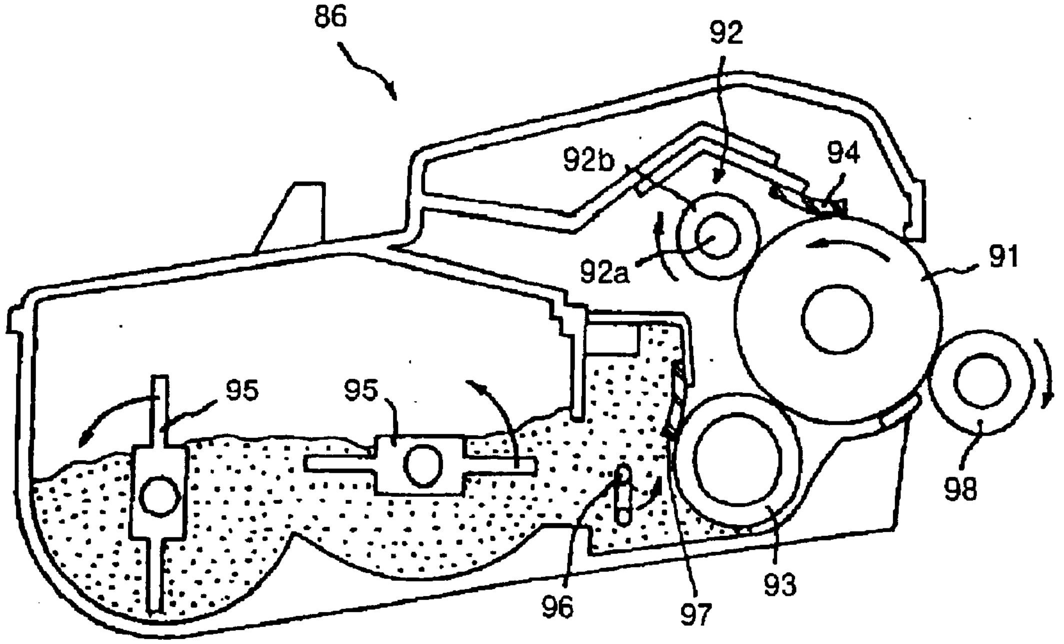
FIG. 3 is a sectional view in an enlarged scale, which shows a developing unit in the embodiment shown in FIG. 1.

FIG. 3 is a sectional view which shows the process cartridge 86. There are arranged the photosensitive drum 91 as an image carrier, and in the vicinity thereof, a charging roller 92 as a charging unit, a developing roller 93 as a developing unit, and a cleaning blade 94 as a cleaning unit.

The toner in the process cartridge 86 is stirred by an agitator 95 and a stirring shaft 96, and carried to the developing roller 93. The toner adhered on the developing roller 93 by a magnetic force is negatively charged by triboelectrification, at the time of passing through the developing blade 97.

The friction-charged toner is moved to the photosensitive drum 91 by the bias voltage, and adheres on the electrostatic latent image. When the transfer paper having passed through the resist roller 85 passes through between the photosensitive drum 91 and the transfer roller 98, the toner on the photosensitive drum 91 is transferred to the transfer paper due to the positive charge from the transfer roller 98.

The residual toner on the photosensitive drum 91 is scraped of f by the cleaning blade 94, and recovered into a tank located above the cleaning blade 94 as exhaust toner. Parts other than the transfer roller 7 are unified for easy replacement.

Figure 4:
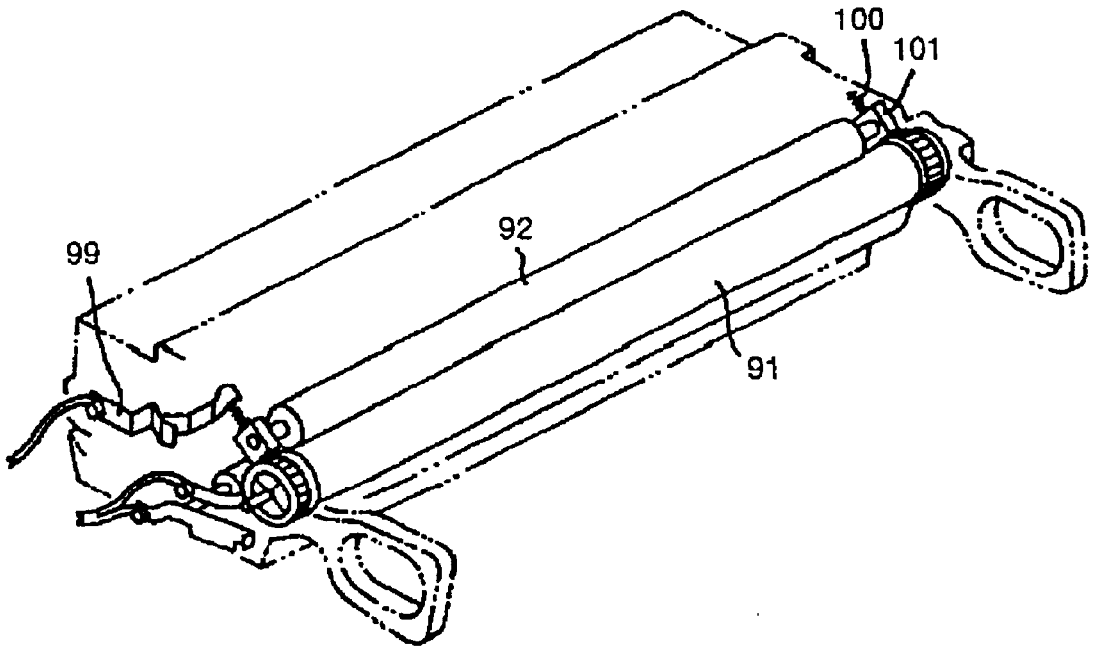
FIG. 4 is a perspective view which shows a charging unit.

FIG. 4 is a diagram which explains the charging roller 92. The charging roller 92 is, as shown in FIG. 3 and FIG. 4, a charging member which is rotated by being driven by a frictional force, while being brought into contact with the photosensitive drum 91 at all times, to thereby primarily charge the outer surface of the photosensitive drum 91 uniformly. As shown in FIG. 3, the charging roller 92 comprises a core metal section 92*a* of a rotation shaft, and a charging section 92*b* formed concentrically around the core metal section 92*a*.

To the charging roller 92, a bias voltage, in which the AC voltage is superimposed on the DC voltage, is applied to the core metal section 92*a* thereof, from a high voltage power supply via an electrode terminal 99, a charging roller pressurizing spring 100, and an electrically conducting bearing 101, at the time of charging operation. Thereby, the charging roller 92 uniformly charges the photosensitive drum 91 to the same voltage as the DC component of the bias voltage. The AC component of the bias voltage serves to uniformly charge the photosensitive drum 91 by the charging roller 92.

A proper value of the frequency in the AC component, at which nonuniformity does not occur in the image, will be explained.

In general, it the number of printed paper per minute (hereinafter, referred to as "ppm") increases, it is necessary to increase the frequency of the AC component.

Specifically, when an example in which the number of copies per minute is at least 16 ppm is considered, it is desired that the proper value of the frequency in the AC component is not smaller than 1000 Hz. However, in the case of a machine having a smaller ppm, it is not necessary to set such a high frequency.

When the photosensitive drum 91 is contact-charged by the charging roller 92, generally an attractive force and a repulsive force alternately works between the surface of the charging roller 92 and the surface or the photosensitive drum 91, due to the AC component in the bias voltage, to thereby cause a vibration in the charging roller 92. This vibration of the charging roller 92 generates high-frequency vibrating noise (charging noise), which offends human ear, in the charging roller 92 itself, which is transmitted to the photosensitive drum 91, to thereby vibrate the photosensitive drum 91 and generate noise.

Generally, the charging noise comprises a frequency of the AC component and higher harmonics of a multiple thereof. When the basic frequency of the AC component is 1000 Hz, frequently, the charging noise occurs such that secondary harmonics is 2000 Hz, third order harmonics is 3000 Hz, . . . . Frequently, with an increase of the order, the level decreases.

When vibrations are generated from the image formation apparatus, a frequency of less than 200 Hz appears as banding in the image, and a frequency of 200 Hz or higher is heard well as a noise. The noise of frequency of less than 200 Hz does not cause a big problem aurally (loudness: the size of audibility is small), since the sensitivity of the ear is bad. Therefore, relating to the charging noise, when the AC component at the time of charging becomes 200 Hz or higher has only to be considered.

(Derivation of the Tone Quality Evaluation Equation of the Image Formation Apparatus)

The present inventor has performed weighting by combining the psychoacoustic parameters having a large improvement effect with respect to the uncomfortable noise of the image formation apparatus over the three layers of the above-described low speed machine, medium speed machine and high speed machine, and succeeded in deriving a tone quality evaluation equation for guessing a subjective evaluation value of the tone quality, that is, the objective tone quality evaluation equation. Further, in the derived tone quality evaluation equation, the present inventor has succeeded in proposing conditions under which discomfort is not caused. The derivation of the tone quality evaluation equation of the image formation apparatus and the conditions under which discomfort is not caused will be explained below.

At first, in order to objectively evaluate the degree of discomfort of mechanical sounds, it is necessary to have a "scale" to measure the discomfort. When the sound energy is to be evaluated, a noise meter corresponds to the "scale". In order to create such a "scale", a method of paired comparisons is one of the main test methods in the subjective (sensory) evaluation. This is a method in which two stimulus pairs are created with respect to a stimulus which is difficult to be evaluated absolutely, such as the sound of the image formation apparatus, to determine a difference in grade with respect to all combinations of the stimulus to be evaluated, to thereby give a relative average grade to the respective stimulus.

When one stimulus is presented to the human, it is difficult for the human to grade it all of a sudden, but it is relatively easy to compare two stimuli and judge which is better or worse. For example, when there are three stimuli A1, A2 and A3, it is assumed that the respective models of the stimuli are:

$$y_1=\mu+\alpha_1,\ y_2=\mu+\alpha_2,\ y_3=\mu+\alpha_3.$$

Here, for simplifying the explanation, it is assumed that the model is constituted of only the gross average $\mu$ and the main effect $\alpha_i$ (i=1, 2, 3).

It is assumed that the sum total of the main effect is 0, similarly to general constraints necessary for estimation of parameters in the testal planning. That is, $$\alpha_1+\alpha_2+\alpha_3=0 \quad \text{(equation 1).}$$

Impossibility of the absolute evaluation means that it cannot be seen how much is the $\mu$ value, and hence it means that $y_1$, $y_2$ and $y_3$ cannot be estimated. Therefore, when a difference between the stimuli is obtained, $\mu$ is deleted, and hence it is expressed only by the difference in the main effects.

$$y_1-y_2=(\mu+\alpha_1)-(\mu+\alpha_2)=\alpha_1-\alpha_2 \quad \text{(equation 2)}$$

$$y_1-y_3=\alpha_1-\alpha_3 \quad \text{(equation 3)}$$

$$y_2-y_3=\alpha_2-\alpha_3 \quad \text{(equation 4)}$$

$$2y_1-(y_2+y_3)=2\alpha_1-(\alpha_2+\alpha_3).$$

From the above constraint equation (1), $$2y_1-(y_2+y_3)=3\alpha_1,$$

and the effect of each stimulus can be taken out.

At this time, if it is assumed that the effect of each stimulus can be expressed by the primary relation, depending on the difference in physical properties held by the image formation apparatus, whose sound is now being compared, the following relation can be obtained:

$$\alpha_1-\alpha_2=b(x_1-x_2) \quad \text{(equation 5),}$$

wherein b denotes a constant, $x_i$ is such that i=1, 2, 3 . . . n). The intercept is compensated, since the difference between the two stimuli is modeled.

Therefore, a model for estimating the difference in the evaluation can be obtained by performing the multiple regression analysis, designating a difference in grade as an objective variable and a difference in a plurality of physical property values (sound pressure level, psychoacoustic parameters, ppm value) as an explanatory variable group. In short, there can be obtained such a model that by inputting the physical quantities which the two sounds to be compared have, a difference in discomfort of the two sound is output by a numerical value.

In the psychoacoustic parameters, loudness, tonality, sharpness, roughness, relative approach and impulsiveness are defined.

This method is on the extension line of the method of the above-described three evaluation plans, in which the calculation method is improved as a device for connecting a plurality of test results. The method of the above three evaluation equations is such that, at first, calculation of a relative grade ($\alpha_1$) of each stimulus is carried out by the Scheffe's method of paired comparisons (bay modification). Then, the multiple regression model is obtained by designating the grade as an objective variable and the tone quality property (psychoacoustic parameter) of the stimulus as an explanatory variable.

With the method in the earlier application by the present applicant (hereinafter simply referred to as the earlier application), it is necessary to derive a model for each test, and paired comparison is required for all the stimulus pairs, thereby the scale of the test becomes huge. Thereby, it is difficult to standardize the models respectively created by the image formation apparatus of the low velocity layer, medium velocity layer and medium to high velocity layer.

With the method in this application, if it is assumed that the regression coefficient (inclination of the line) of each tone quality property in the respective paired comparison tests is substantially equal, a unified model can be obtained by performing the multiple regression analysis, designating the grade of difference in the stimulus (sample sound) as an objective variable, and designating a difference in the psychoacoustic parameter values of two stimuli as an explanatory variable.

The final object is to obtain the discomfort grade of the sound, not to obtain a difference in discomfort. Therefore, after the model for estimating the difference in discomfort is derived, it is converted to a model for estimating the grade of sound (tone quality evaluation value with respect to discomfort) used in the technique of the earlier application, by creating a reference point.

Examples of the tone quality evaluation test of uncomfortable sound carried out by the present inventors will be explained. The test flow is as described below.

(Test in Respective Speed Regions of Image Formation Apparatus)

(1) Recording the operating noise of the image formation apparatus by a dummy head (2) Processing of the operating noise and creation of a plurality of processing noise (creation of sample sound)

(3) Measurement of psychoacoustic parameters of the created sample sound (4) Test by the method of paired comparisons, using the sample sound To calculate a difference in the subjective evaluation values (grade) of each sample sound pair with respect to the discomfort (5) Calculation of a difference in the psychoacoustic parameter values of each sample sound pair In this example, tests are carried out respectively for three image formation apparatus of low speed, medium speed and high speed.

(6) To derive equation for estimating the grade difference All data of the three tests are used, to perform the multiple regression analysis, designating the grade difference as an objective variable, and the difference in the psychoacoustic parameter values as an explanatory variable group.

(7) To derive a tone quality evaluation equation which predicts the grade (8) Verification for each test by the derived tone quality evaluation equation.

Each test will now be explained in detail.

(1) To Collect the Operating Sound of the Image Formation Apparatus

The operating noise on the front face of the image formation apparatus was collected by a dummy head HMS (Head Measurement System) manufactured by Head Acoustics Co., and recorded binaurally in a hard disk.

By performing the binaural recording and by reproducing the noise by a special purpose headphone, the noise can be reproduced in such sense that the human actually hears the mechanical noise.

Measurement Conditions

Recording environment: semi-anechoic chamber

Position of the ear of the dummy head: height of 1.2 m, horizontal distance from the end of the equipment: 1 m Recording mode: FF (free field (for the semi-anechoic chamber)

HP filter: 22 Hz.

(2) Processing of the Operating Noise and Creation of a Plurality of Processing Noise (Creation of Sample Sound)

Processing of the operating noise of the image formation apparatus was carried out by a tone quality analysis software ArtemiS of Head Acoustics Co.

The noise processing method is such that a portion of the main sound source of the image formation apparatus is attenuated or emphasized on the frequency axis or on the time base, from the recorded operating noise.

The main sound source means metallic impulsive sound, paper impulsive sound, paper sliding sound, noise of the motor drive system, AC charging noise, or the like. This main sound source differs depending on the configuration of the image formation apparatus. For example, in the image formation apparatus employing the DC charging method, the charging noise does not occur.

The sound pressure level of three levels (emphasized sound, original sound, and attenuated sound) was assigned to each sound source for each type of the apparatus, to thereby create 9 sounds of combination having a different level of the sound source based on the direct action table of L9. Since it is necessary to carry out a round robin comparison test, 72 types comparison tests are to be carried out in the case of 9 sounds.

(3) Measurement of Psychoacoustic Parameters of the Created Sample Sound

With regard to the original sound and the processed sound of the image formation apparatus, the psychoacoustic parameters were obtained by the tone quality analysis software ArtemiS of Head Acoustics Co.

(4) Test by the Method of Paired Comparisons, Using the Sample Sound: to Calculate a Difference in the Subjective Evaluation Values of Each Sample Sound Pair With Respect to the Discomfort Examinees were gathered for evaluating the sample sound, to carry out paired comparison of the sample sounds to thereby judge which was more uncomfortable. Specifically, the tests were carried out in the following manner.

Taking the comparison order into consideration, one examinee compared all combinations one each. Specifically, combinations of two were made from materials for the number of t, and N examinees compared all of the combinations (i, j) and (j, i), to thereby obtain a difference in the subjective evaluation values of i and j, with respect to each sample sound pair.

For example, the value is calculated such that when a sample sound (1) and a sample sound (2) are compared, 1 point when the sample sound (1) is uncomfortable, and −1 point when the sample sound (2) is uncomfortable. The points are added up for the number of the examinees, and then the added value is divided by the number of the examinees. The obtained value is the difference in the subjective evaluation value (grade). This is calculated for all combinations of the sounds.

(5) Calculation of a Difference in the Psychoacoustic Parameter Values of Each Sample Sound Pair The difference in the psychoacoustic parameter values of each sample sound pair measured in (3) was calculated. This calculation was performed for 382 data in total, that is, data of 72 (times)×3 (models)=216, obtained by testing for 3 models for each velocity layer, and 166 data obtained by the pretests and the mixture tests of sounds of each velocity layer.

(6) To Derive Equation for Estimating the Grade Difference

All of the 382 data obtained by performing the paired comparison was used to carry out the multiple regression analysis, by designating a difference in grade as an objective variable and a difference in psychoacoustic parameter values as an explanatory variable group. In this case, this is a model of the grade difference, and hence the intercept was set to 0, to carry out the multiple regression analysis. As a result of variable selection, the loudness, sharpness, tonality and impulsiveness were selected. The result of the analysis of variance is as shown in Table 1.

TABLE 1

| FACTORS | DEGREE OF FREEDOM | SUM OF SQUARES | MEAN SQUARE | F VALUE |
|---|---|---|---|---|
| REGRESSION | 4 | 111.84754 | 27.9619 | 241.9411 |
| RESIDUALS | 378 | 43.68664 | 0.1156 | Prob > F |
| TOTAL | 382 | 155.53418 | | <.0001 |

The contribution ratio of the regression model is such that contribution ratio=sum of squares by the regression/entire sum of squares=111.55507/155.5342≈0.72.

The estimated value of the regression coefficient is as shown in Table 2.

TABLE 2

| FACTORS | PARTIAL REGRESSION COEFFICIENT | STANDARD DEVIATION | t VALUE | P VALUE | 95% LOWER LIMIT | 95% UPPER LIMIT |
|---|---|---|---|---|---|---|
| INTERCEPT | 0 | 0 | | | 0 | 0 |
| LOUDNESS | 0.2290047 | 0.010194 | 22.47 | <.0001 | 0.2089615 | 0.2490478 |
| SHARPNESS | 0.3734458 | 0.033183 | 11.25 | <.0001 | 0.3082003 | 0.4386913 |
| TONALITY | 4.3267266 | 0.334452 | 12.94 | <.0001 | 3.6691076 | 4.9843457 |
| IMPULSIVENESS | 1.2023233 | 0.131631 | 9.13 | <.0001 | 0.9435022 | 1.4611445 |

Since all the P values in Table 2 are not larger than 5%, the partial regression coefficients thereof are 95% significant.

An upper limit and a lower limit at which the partial regression coefficient has a reliability of 95% are put down. Since the values of the partial regression coefficients are all positive values, if the difference in the psychoacoustic parameters increases in the positive direction, discomfort increases.

Figure 5:
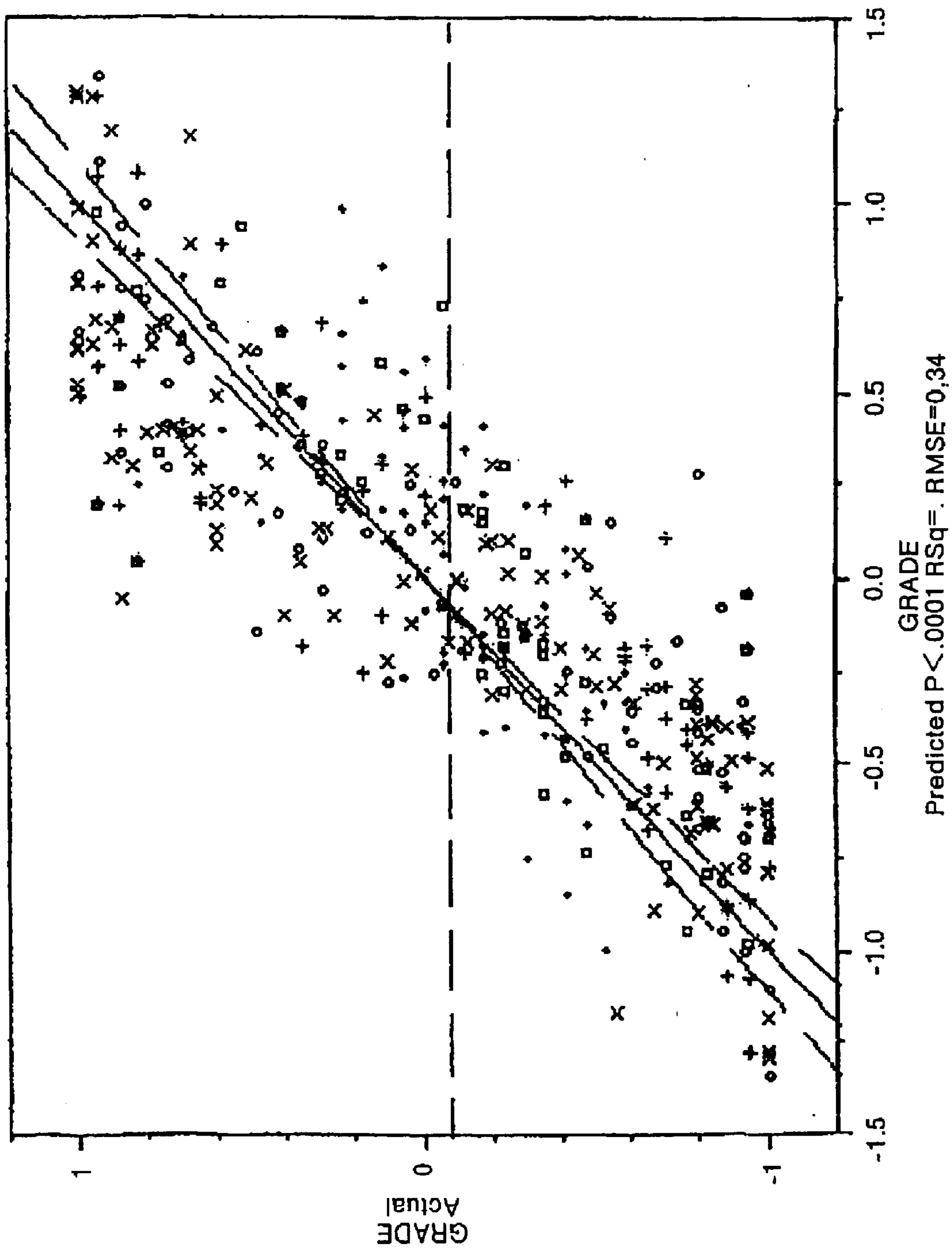
FIG. 5 is a scatter diagram of expected values and actual values in this embodiment, relating to a difference in the grade.

FIG. 5 is a scatter diagram of expected values and actual values in this model. The grade difference can only take a value of from −1 to 1, since even if all examinees judge that one is uncomfortable, as a result of the paired comparison, the maximum value is −1 or 1. However, the expected value is approximately in the range of from −1.5 to 1.5, and hence, it is seen that the expected value is slightly expanded.

(7) To Derive a Tone Quality Evaluation Equation Which Predicts the Grade

A change from the multiple regression model of difference to the relative evaluation model is considered here.

When the difference model obtained in (6) is put into an equation described below.

$$\alpha i-\alpha j=0.2290047\times(xloudnessi-xloudnessj)+0.3734458\times(xsharpnessi-xsharpnessj)+4.3267266\times(xtonalityi-xtonalityj)+1.2023233\times(ximpulsivenessi-ximpulsivenessj)$$

Zero is substituted in the grade, and a mean value of the sample sound used for the tests is respectively substituted in the xloudness0, xsharpness0, xtonality0 and ximpulsiveness0 at that time.

Table 3 collectively shows measured values of the psychoacoustic parameters of the sample sounds used for the test. The mean value of each psychoacoustic parameter is calculated and shown in the lower part of the table.

TABLE 3

| FACTORS | LOUDNESS (Sone) | SHARPNESS (acum) | TONALITY (tu) | IMPULSIVENESS (lu) | ROUGHNESS (asper) | RELATIVE APPROACH |
|---|---|---|---|---|---|---|
| LOW VELOCITY | 7.5 | 2.3 | 0.12 | 0.61 | 1.90 | 1.76 |
| LAYER | 8.8 | 2.3 | 0.20 | 0.61 | 2.00 | 1.93 |
| | 6.6 | 2.2 | 0.08 | 0.37 | 1.40 | 1.53 |
| | 8.8 | 2.2 | 0.14 | 0.66 | 2.20 | 1.82 |
| | 8.6 | 1.4 | 0.22 | 0.29 | 1.40 | 1.89 |
| | 8.2 | 2.2 | 0.10 | 0.68 | 2.10 | 1.61 |
| | 6.8 | 2.4 | 0.11 | 0.43 | 1.60 | 1.64 |
| | 7.5 | 2.3 | 0.21 | 0.48 | 1.65 | 1.88 |
| | 7.0 | 2.4 | 0.07 | 0.76 | 2.15 | 1.64 |
| MEDIUM VELOCITY | 6.9 | 2.4 | 0.05 | 0.40 | 1.45 | 1.31 |
| LAYER | 9.0 | 2.9 | 0.06 | 0.40 | 1.65 | 1.41 |
| | 4.8 | 2.1 | 0.04 | 0.48 | 1.05 | 1.09 |
| | 7.9 | 3.1 | 0.04 | 0.45 | 1.55 | 1.28 |
| | 6.9 | 1.8 | 0.05 | 0.43 | 1.45 | 1.29 |
| | 7.6 | 2.3 | 0.07 | 0.42 | 1.55 | 1.40 |
| | 5.7 | 1.8 | 0.08 | 0.42 | 1.15 | 1.23 |
| | 6.3 | 2.8 | 0.04 | 0.48 | 1.35 | 1.13 |
| | 6.8 | 3.2 | 0.05 | 0.42 | 1.35 | 1.34 |
| HIGH VELOCITY | 7.6 | 2.1 | 0.03 | 0.50 | 1.60 | 1.84 |
| LAYER | 11.9 | 2.4 | 0.08 | 0.49 | 1.90 | 2.20 |
| | 10.7 | 2.1 | 0.05 | 0.51 | 2.00 | 2.13 |
| | 12.0 | 2.7 | 0.06 | 0.47 | 1.95 | 2.04 |
| | 10.0 | 2.4 | 0.04 | 0.48 | 1.85 | 2.00 |
| | 11.0 | 1.9 | 0.08 | 0.50 | 1.85 | 2.21 |
| | 12.3 | 2.3 | 0.06 | 0.52 | 2.05 | 2.13 |
| | 11.5 | 2.1 | 0.05 | 0.54 | 2.15 | 2.18 |
| | 10.8 | 3.1 | 0.03 | 0.57 | 1.95 | 1.96 |
| PRELIMINARY | 8.7 | 2.2 | 0.03 | 0.47 | 1.70 | 1.86 |
| TESTS | 10.4 | 2.8 | 0.03 | 0.52 | 1.90 | 2.05 |
| | 9.0 | 2.9 | 0.06 | 0.40 | 1.65 | 1.41 |
| | 7.6 | 2.3 | 0.07 | 0.42 | 1.55 | 1.40 |
| | 6.9 | 2.4 | 0.05 | 0.40 | 1.45 | 1.31 |
| | 6.3 | 2.8 | 0.04 | 0.48 | 1.35 | 1.13 |
| | 7.0 | 2.4 | 0.07 | 0.76 | 2.15 | 1.64 |
| | 7.4 | 2.3 | 0.17 | 0.55 | 1.70 | 1.80 |

TABLE 3-continued

| FACTORS | LOUD-NESS (Sone) | SHARP-NESS (acum) | TONALITY (tu) | IMPULSI-VENESS (lu) | ROUGH-NESS (asper) | RELATIVE APPROACH |
|---|---|---|---|---|---|---|
| COMBINED | 10.4 | 2.4 | 0.15 | 0.43 | 1.72 | 1.96 |
| TESTS | 10.4 | 1.9 | 0.11 | 0.46 | 1.83 | 1.97 |
| | 10.4 | 3.0 | 0.05 | 0.47 | 1.82 | 1.99 |
| | 8.7 | 1.9 | 0.15 | 0.41 | 1.39 | 1.60 |
| | 8.7 | 3.0 | 0.09 | 0.40 | 1.51 | 1.61 |
| | 8.7 | 2.5 | 0.05 | 0.41 | 1.68 | 1.66 |
| | 7.0 | 2.9 | 0.16 | 0.56 | 1.69 | 1.68 |
| | 7.0 | 2.3 | 0.10 | 0.63 | 1.83 | 1.74 |
| | 7.0 | 1.9 | 0.07 | 0.70 | 1.83 | 1.75 |
| OVERALL MEAN VALUE | 8.4 | 2.4 | 0.08 | 0.50 | 1.70 | 1.69 |
| AVERAGE OF LOW VELOCITY LAYER | 7.7 | 2.2 | 0.14 | 0.54 | 1.82 | 1.74 |
| AVERAGE OF MEDIUM VELOCITY LAYER | 6.9 | 2.5 | 0.05 | 0.43 | 1.39 | 1.28 |
| AVERAGE OF HIGH VELOCITY LAYER | 10.8 | 2.3 | 0.05 | 0.51 | 1.92 | 2.08 |
| AVERAGE OF PRELIMINARY TESTS | 7.9 | 2.5 | 0.07 | 0.50 | 1.68 | 1.58 |
| AVERAGE OF COMBINED TESTS | 8.7 | 2.4 | 0.10 | 0.50 | 1.70 | 1.77 |

When the mean value is respectively substituted in $\alpha i-\alpha 0=0.2290047\times(\text{xloudnessi}-\text{xloudness0})+0.3734458\times(\text{xsharpnessi}-\text{xsharpness0})+4.3267266\times(\text{xtonalityi}-\text{xtonality0})+1.2023233\times(\text{ximpulsivenessi}-\text{ximpulsiveness0})$, $\alpha i=0.2290047\ \text{xloudnessi}+0.3734458\ \text{xsharpnessi}+4.3267266\ \text{xtonalityi}+1.2023233\ \text{ximpulsivenessi}-3.76748892619596$.

For easy use, if $\alpha i$ is designated as a discomfort index S of the sound, and rounded off at the third decimal place, the following tone quality evaluation equation can be obtained.

$$S=0.229\times(\text{loudness value})+0.373\times(\text{sharpness value})+4.327\times(\text{tonality value})+1.202\times(\text{impulsiveness value})-3.767 \quad \text{(c)}$$

From the form of the equation, in order to reduce the discomfort, it is only necessary to execute, 1. reducing the size of audibility (reducing the loudness value),
2. reducing the high-frequency component (reducing the sharpness value),
3. reducing the pure sound component (reducing the tonality value), and
4. reducing the impulsive sound (reducing the impulsiveness value).

The partial regression coefficient takes a fiducial interval of 95%, as shown in Table 2 (multiple regression analysis result). The result of roundoff thereof at the third decimal place is as described below. The range of intercept is the result of executing calculation by substituting the 95% fiducial interval of the respective partial regression coefficients therein. The equation (a) uses this result. $0.209\leqq$partial regression coefficient of loudness$\leqq 0.249$ $0.308\leqq$partial regression coefficient of sharpness$\leqq 0.439$ $3.669\leqq$partial regression coefficient of tonality$\leqq 4.984$ $0.944\leqq$partial regression coefficient of impulsiveness$\leqq 1.461$ $-4.280\leqq$intercept$\leqq -3.274$ As a result of the multiple regression analysis, the psychoacoustic parameter which has not been selected as the variable is a parameter which is not significant if it is selected as the variable, since it does not have any relation with discomfort, or has high correlation with loudness, or any of the sharpness, tonality and impulsiveness.

The roughness and relative approach is any of these. Even a psychoacoustic parameter which does not have any relation with discomfort at present may have an influence on the discomfort, when it takes a larger value than the current value.

The psychoacoustic parameter which currently has a relation with the discomfort through the loudness, sharpness, tonality and impulsiveness has the possibility that if it takes a larger value than the current value, the influence on the discomfort is reversed, to thereby supersede the most uncomfortable psychoacoustic parameter.

Figure 6:
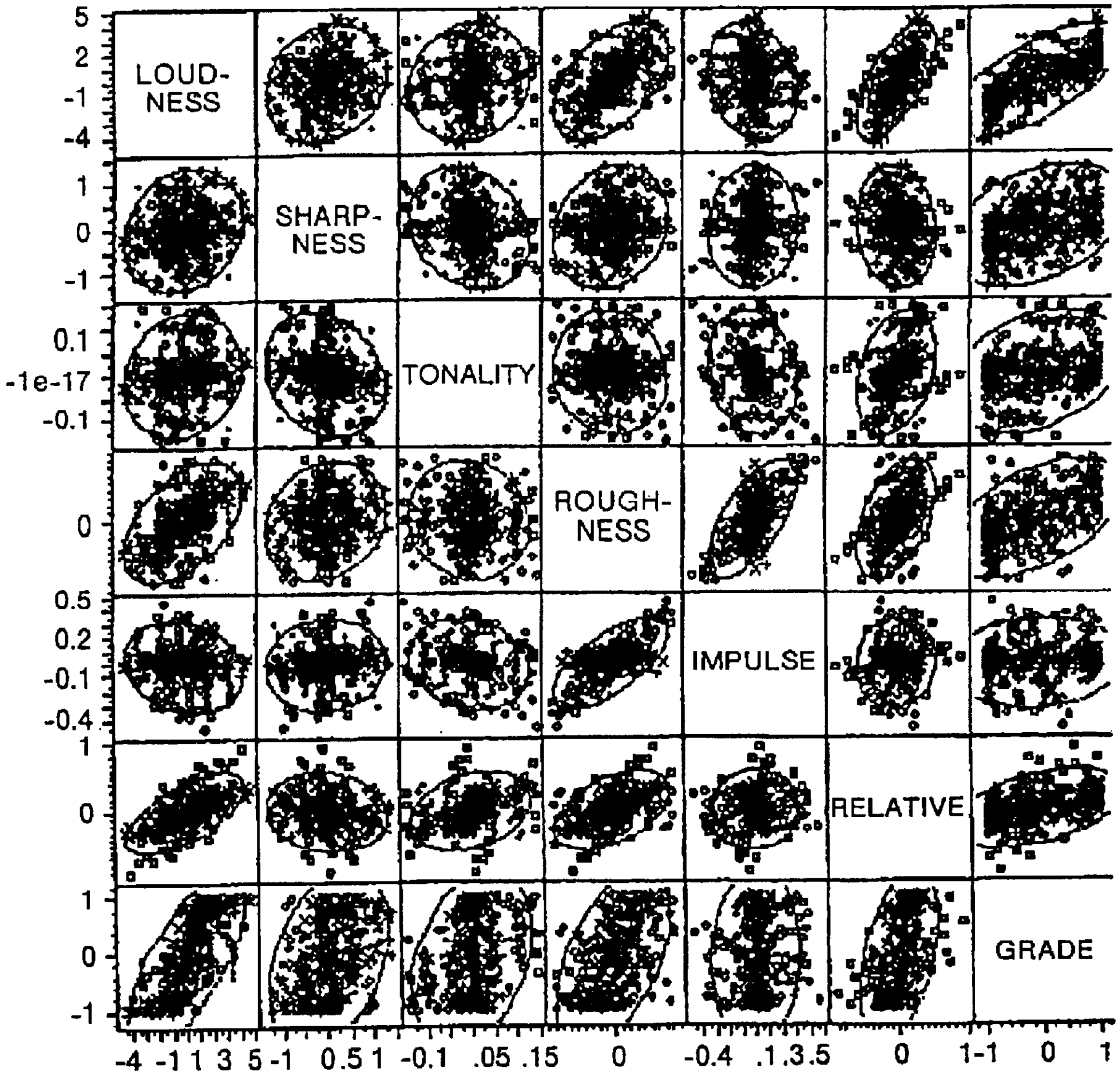
FIG. 6 is a diagram which shows the situation of the correlation between psychoacoustic parameters.

FIG. 6 is a diagram which shows the correlation between the psychoacoustic parameters, or between the psychoacoustic parameters and the discomfort grade (discomfort index S). When looking at the figure, the place where the latticed patterns intersect each other should be seen, in order to see the correlation, for example, between the loudness and the grade. The right upper half and the left lower half show the same content, wherein the Y axis and the X axis are only reversed.

Since the graph of the loudness and the grade is upward slanting to the right, it is seen that with an increase in the loudness, the grade value also increases (becomes uncomfortable). A 95% probability ellipse is output in the vicinity of the data plot. When the correlation is strong, the ellipse becomes long and slender, and when the correlation is not strong, the ellipse approaches a circular shape.

As seen from FIG. 6, though there is a difference in level between each psychoacoustic parameter and the grade, it can be considered that there is a positive correlation such that with an increase of the psychoacoustic parameter, the grade also increases.

On the other hand, the roughness and the impulsiveness are in a strong correlation, and also have a correlation with the loudness. Therefore, it is considered that the roughness has not been selected as a variable, as a result of the multiple regression analysis.

The relative approach has a correlation with the loudness. As described above, the roughness and the relative approach have not been selected as a variable at present. However, when the equipment having larger fluctuation feeling of the sound level or larger roughness component than the current state (for example, the automatic document feeder or the finisher has not been confirmed yet) is to be evaluated, there is the possibility that with the tone quality evaluation equation of the present invention, the accuracy may be poor.

Therefore, from Table 3, it can be said that the equation (a) or (c) is concluded in the range satisfying the conditions described below, roughness value is not larger than 2.20 (asper), and relative approach value is not larger than 2.21.

Figure 7:
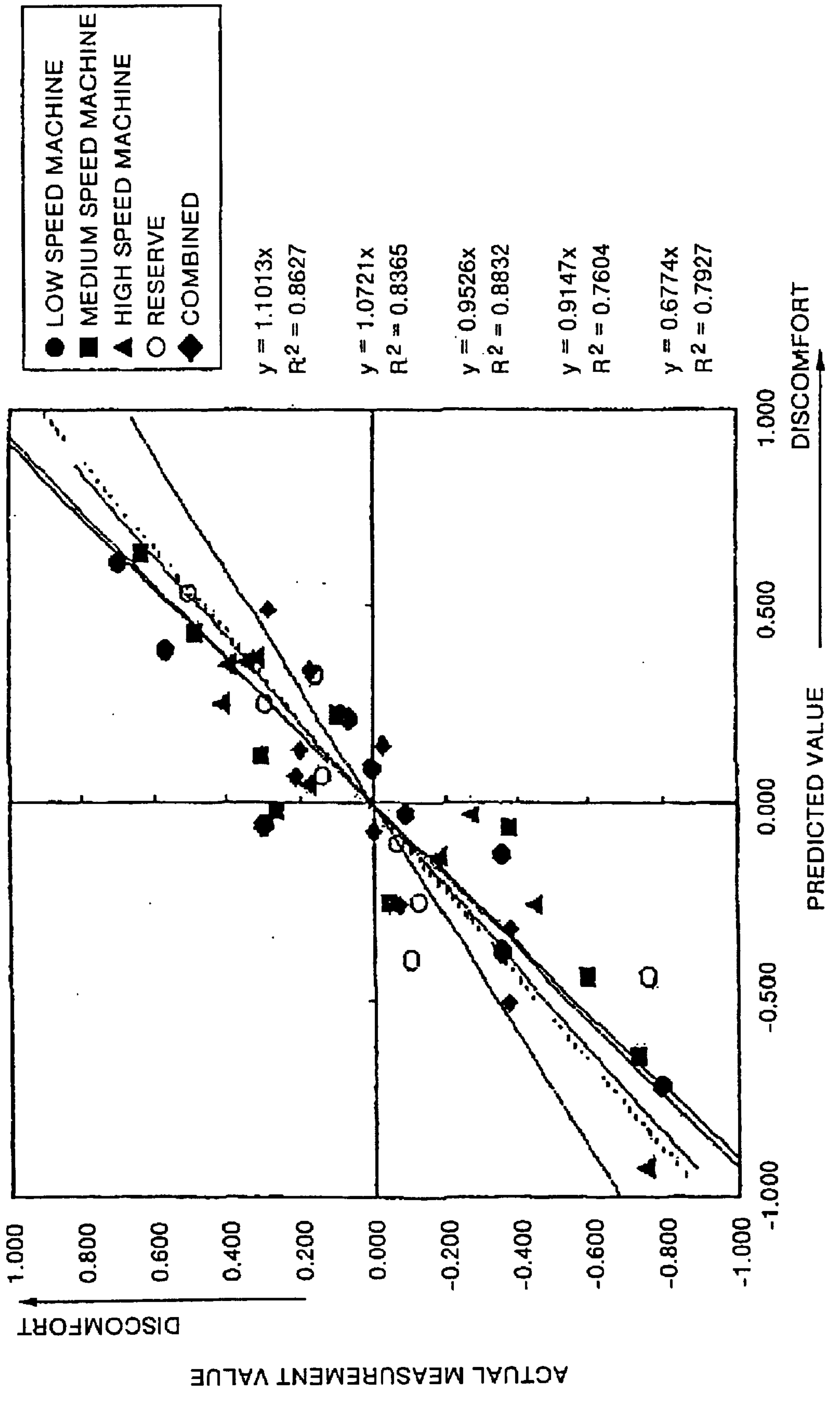
FIG. 7 is a scatter diagram of expected values and actual values of discomfort index by speed.

(8) To Perform Verification for Each Test by the Derived Tone Quality Evaluation Equation FIG. 7 shows the result of the regression analysis of the grade obtained by the tests using the image formation apparatus of the low velocity layer, medium velocity layer and the high velocity layer, and using the above equation (c). The inclination in each test is substantially 1, and the contribution ratio is a little less than 90%. That is, it is found that the derived and unified tone quality evaluation equation can excellently predict the respective test results of the past, and can correspond to the image formation apparatus having various tones, including the low-speed machine to the high-speed machine.

A constant term of the intercept is added for each test, and this is necessary because the relative origin (centroid) has been adjusted for each test. That is, if the tests for the low velocity layer and the high velocity layer are compared, the ranges that the psychoacoustic parameters such as loudness and the like can take are different. Hence, in the low velocity layer and the high velocity layer, the mean value of the loudness is different. Naturally, the loudness value is larger in the machine of the high velocity layer.

The derived and unified tone quality evaluation equation uses the mean value of the whole range of from the low velocity layer to the high velocity layer as the centroid, and hence it is necessary to correct the difference from the mean value for each test, when verification with the past tests is to be performed.

In FIG. 7, the constant term is output in a corrected value. Further, the regression equation and the contribution ratio in the figure are the same as the order in the explanatory notes.

The reason why the constant term is necessary is that a restriction is provided such that in each test, the sum of the grades is set to 0, to perform the calculation.

In this improved method, since this restriction itself is not necessary, and hence the coincidence degree of the inclination needs only to be noted. That is, the discomfort can be measured hereinafter by the value of the discomfort index S calculated by the unified equation (c), and adjustment is not required.

This constant term is a value obtained by the following manner, under the same idea as that of when a change is performed from the multiple regression model of difference to the grade model. That is, a mean value in each layer is substituted in the equation obtained in (6), to determine the intercept, to thereby obtain a difference from the overall average. The values are shown in Table 4. When this difference from the overall average is added to each test, it is put on the same base as the value of the tone quality evaluation equation derived this time.

TABLE 4

| | LOUDNESS | SHARPNESS | TONALITY | IMPULSIVE-NESS | INTERCEPT | DIFFERENCE FROM OVERALL AVERAGE |
|---|---|---|---|---|---|---|
| OVERALL MEAN VALUE | 8.4 | 2.4 | 0.08 | 0.50 | 3.767 | 0.000 |
| AVERAGE OF LOW VELOCITY LAYER | 7.7 | 2.2 | 0.14 | 0.54 | 3.828 | 0.060 |
| AVERAGE OF MEDIUM VELOCITY LAYER | 6.9 | 2.5 | 0.05 | 0.43 | 3.243 | −0.524 |
| AVERAGE OF HIGH VELOCITY LAYER | 10.8 | 2.3 | 0.05 | 0.51 | 4.189 | 0.421 |
| AVERAGE OF PRELIMINARY TESTS | 7.9 | 2.5 | 0.07 | 0.50 | 3.621 | −0.146 |
| AVERAGE OF COMBINED TESTS | 8.7 | 2.4 | 0.10 | 0.50 | 3.940 | 0.173 |

Table 5 collectively shows the result of tests for each layer, obtained by testing when to which level the discomfort index S drops, it is not felt uncomfortable.

A denotes a sound having good evaluation, C denotes a sound having bad evaluation, and B denotes the medium evaluation. Of these sounds, CC denotes a sound that has been evaluated as C by all examinees, and AA denotes a sound that has been evaluated as A by all examinees. The discomfort index S of the evaluation of AA is designated as a tolerance 2, and the discomfort index S of the sound that has been evaluated as A not by all examinees, but by most examinees is designated as a tolerance 1.

TABLE 5

| ppm | TOLERANCE 1 | TOLERANCE 2 |
|---|---|---|
| 20 | −0.6 | −0.7 |
| 27 | −0.448 | −0.672 |
| 65 | −0.3555 | −0.6296 |

The comparison is not possible in Table 5 as it is, but when a difference from the overall average in Table 4 is added to the values in FIG. 5, the tolerance by the derived tone quality evaluation equation is obtained. Those values are collectively shown in Table 6.

TABLE 6

| ppm | CORRECTED TOLERANCE 1 | CORRECTED TOLERANCE 2 |
|---|---|---|
| 20 | −0.543 | −0.643 |
| 27 | −0.976 | −1.200 |
| 65 | 0.069 | −0.205 |

Figure 8:
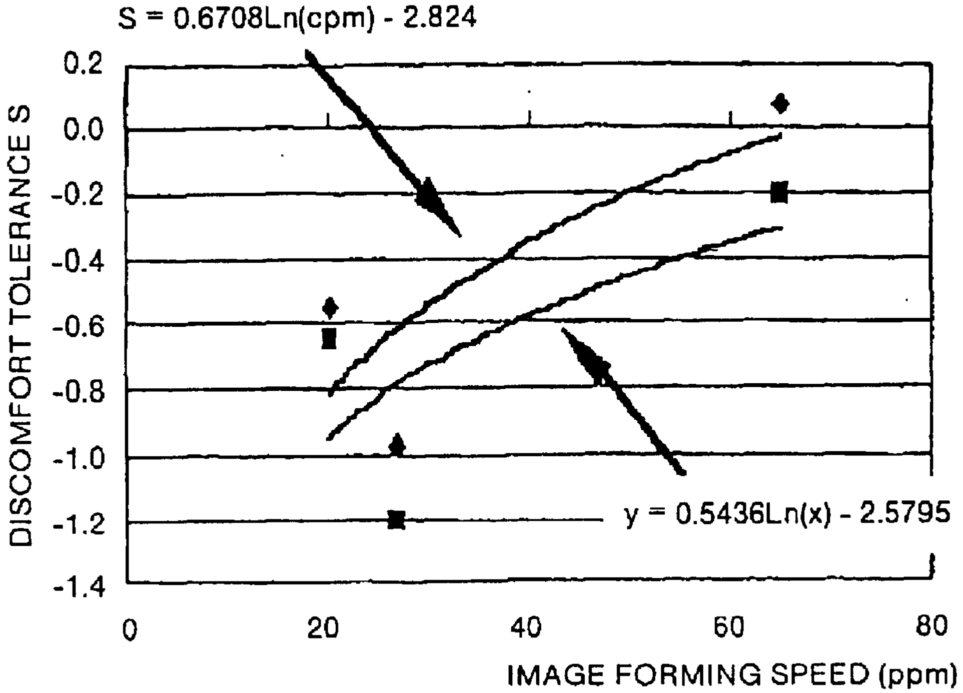
FIG. 8 is a graph which shows the relation between the image formation speed and the discomfort tolerance.

The high speed machine has a tendency that the tolerance becomes optomistic. FIG. 8 is a graph approximating the relation between the image formation speed and the tolerance from Table 6. The approximation of tolerance becomes:

$$S \leqq 0.6708 \times \mathrm{LN}(ppm) - 2.824 \quad \text{(b)}$$

$$S \leqq 0.5436 \times \mathrm{LN}(ppm) - 2.5795 \quad \text{(d).}$$

From the equations (b) and (d), when the tolerance is calculated for every 10 ppm, the result as shown in Table 7 is obtained. If these values are satisfied, the operating noise which does not cause discomfort can be obtained.

TABLE 7

| cpm | TOLERANCE 1 MEASUREMENT RESULT | TOLERANCE 2 MEASUREMENT RESULT |
|---|---|---|
| 20 | −0.814 | −0.951 |
| 30 | −0.542 | −0.731 |
| 40 | −0.349 | −0.574 |
| 50 | −0.200 | −0.453 |
| 60 | −0.078 | −0.354 |
| 70 | 0.026 | −0.270 |

A second embodiment in which a ppm value (the number of sheets at the time of using the A4 lateral size, which is printed out in one minute) is introduced in the explanatory variable will be explained below.

(1) Recording of the operating noise of the image formation apparatus by a dummy head Noise was collected by using a dummy head HMS (Head Measurement System) manufactured by Head Acoustics Co., and binaural recording into a hard disk was performed. By performing binaural recording, and by reproducing the noise by a special purpose headphone, the noise can be reproduced in such sense that the human actually hears the mechanical noise. The measurement conditions are as described below.

The reason why the height of the ear of the dummy head is 1.2 m in the measurement conditions below is that since the image formation apparatus is often used as a printer recently, by issuing a print command from a personal computer, there are many cases of hearing the operating noise of the image formation apparatus in the state of sitting on a chair. When the human sits on a chair, the height is about 1.2 m. When the human is in a standing condition, the standard position of the ear is about 1.5 m. These are defined by ISO7779. In this test, the noise was collected at the ear height of 1.2 m, but either height may be used, so long as the noise collected at the same height is compared.

| | |
|---|---|
| Recording environment, | semi-anechoic chamber |
| Position of the ear of the dummy head, | height of 1.2 m, horizontal distance from the end of the equipment, 1 m |
| Recording direction, | 4 directions of front (on the operating section side), back, right and left (see Fig. 10) |
| Recording mode, | FF (free field (for the semi-anechoic chamber) |
| HP filter, | 22 Hz. |

Figure 9:
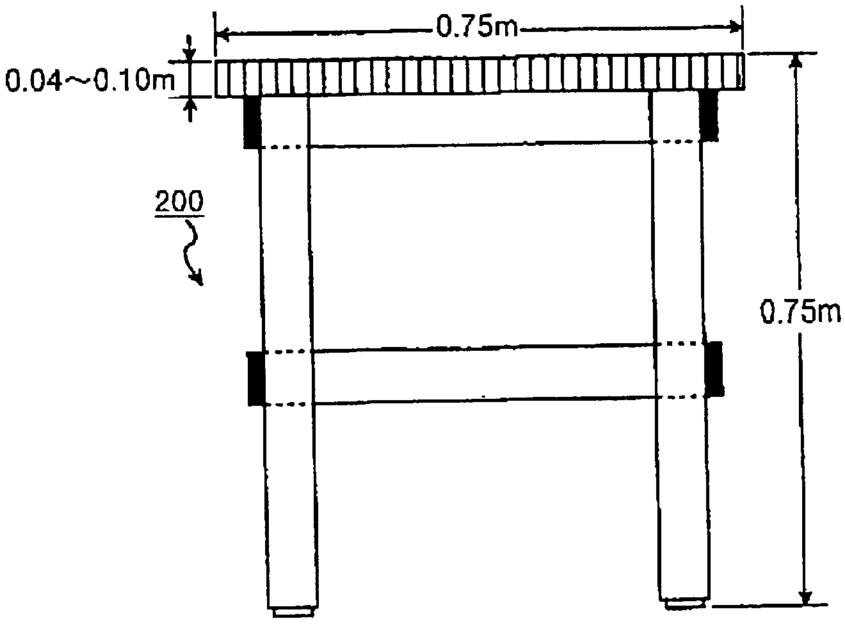
FIG. 9 is a diagram which explains the structure of a standard test board used for recording.

FIG. 9 is a diagram which shows the structure of the standard test board used for the recording. This standard test board 200 is in conformity with the specification specified in the Attachment A of ISO7779. The standard test board 200 is made of a combined wooden board having a thickness of from 0.04 m to 0.1 m, and the area thereof is at least 0.5 $m^2$, and the lateral minimum length is 0.7 m.

A desktop type image formation apparatus as shown in FIG. 2 (in this embodiment, 20 ppm machine) is installed at the center of the standard test board 200, to carry out measurement and collection of noise. On the other hand, with the console-type image formation apparatus as shown in FIG. 1 (in this embodiment, 27 ppm machine, and 65 ppm machine), measurement and collection of noise may be carried out in the state of being installed on the floor.

Figure 10:
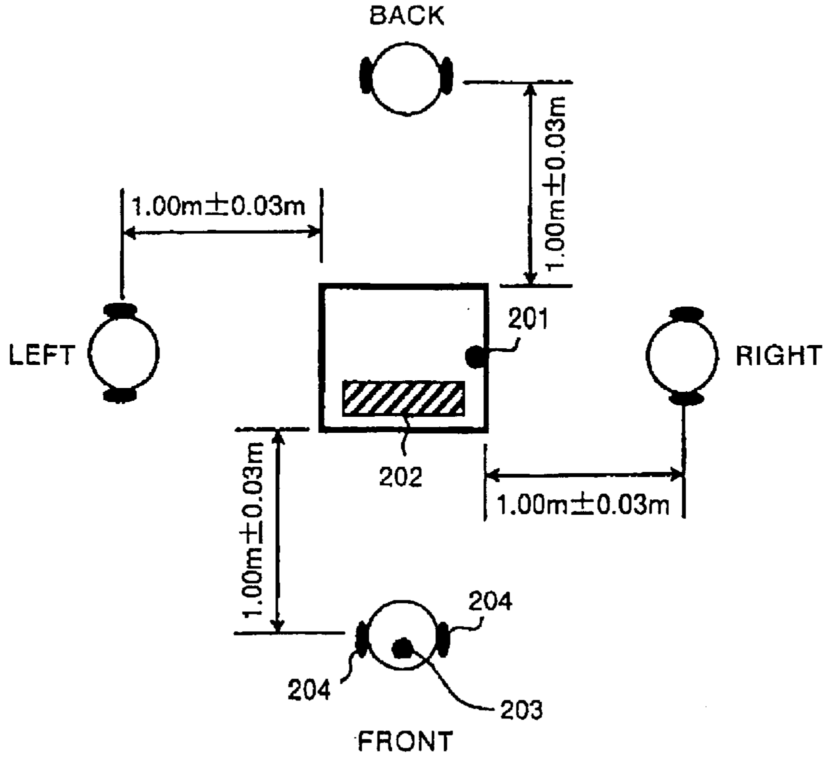
FIG. 10 is a diagram which explains the state of dummy heads, and microphone positions with respect to a machine to be measured, as seen from the upper face.

FIG. 10 is a diagram which explains dummy heads 203 and microphone positions 204 with respect to a machine to be measured 201, as seen from the upper face. When the machine to be measured 201 is installed in a place of a semi-anechoic chamber where there is enough space, and the side where the operating section 202 exists is designated as the front side, and when an operator is on the front side, the measurement and collection of the noise is carried out by assuming that the right direction of the machine to be measured 201 as seen from the operator is the right side, and the left direction thereof is the left side, and the opposite side to the front is the rear side.

As shown in FIG. 10, the dummy head 203 is installed at the center of each face, with the front face thereof facing the machine to be measured 201. The horizontal distance from the dummy head 203 to the end face of the machine to be measured 201 is set such that the ear position of the dummy head 203 (the position of the microphone) is at 1.00 m±0.03 m from the end face of the machine to be measured 201. In this manner, the noise in four directions are collected.

The noise of the image formation apparatus is generally different by direction. This is attributable to the fact that the frequency distribution and the energy amount of noise generated from each face is different due to the position of the motor drive system, the layout of the paper feed route, the opening state in the exterior and the position of the paper ejection port. Therefore, there may be such cases that the noise is heard well at the right side but hardly heard at the left side, depending on the sound source. Further, the noise may be heard on the front side at the medium level between the right side and the left side.

(2) Processing of the operating noise and creation of a plurality of processed noise (creation of sample noise)

The processing of the operating noise of the image formation apparatus was carried out by the tone quality analysis software ArtemiS of Head Acoustics Co. The noise processing method is such that a portion of the main sound source of the image formation apparatus is attenuated or emphasized on the frequency axis or on the time base, from the recorded operating noise.

The main sound source means metallic impulsive sound, paper impulsive sound, paper sliding sound, noise of the motor drive system, AC charging noise, or the like. This main sound source differs depending on the configuration of the image formation apparatus. For example, in the image formation apparatus employing the DC charging method, the charging noise does not occur.

According to the testal planning method, the sound pressure level of three levels (emphasized sound, original sound, and attenuated sound) was assigned to each sound source for each type of the apparatus, to thereby create 9 sounds of combination having a different level of the sound source based on the direct action table of L9. Since it is necessary to carry out a round robin comparison test, 72 types comparison tests are to be carried out in the case of 9 sounds.

In this embodiment, the sample noise was processed, particularly using the noise on the front side of the image formation apparatus. The nose on the front side is used because the backside of the image formation apparatus is often installed along the wall face of the office. As result, people are frequently present on the front side where the operating section is located.

The noise on the front and back, and right and left of the image formation apparatus differs from each other, but it has been confirmed that the sample noise obtained by assigning three levels with respect to the main sound source of the front noise has a wider range of value which the psychoacoustic parameter can take, than the difference in the psychoacoustic parameter value of the noise in the four directions. That is, if subjective evaluation tests are carried out with respect to the noise on the face which is representative of the image formation apparatus, it is possible-to derive the tone quality evaluation equation including the characteristic of noise in the four directions. Further, the discomfort in the four directions can be calculated by using the derived tone quality evaluation equation. Thereby, it is judged that it is not necessary to carry out the subjective evaluation tests for all the noise in the four directions.

(3) Measurement of psychoacoustic parameters of the created sample sound

With regard to the original sound and the processed sound of the image formation apparatus, the psychoacoustic parameters were obtained by the tone quality analysis software ArtemiS of Head Acoustics Co.

(4) Tests by the method of paired comparisons, using the sample sound: to calculate a difference in the subjective evaluation values (grades) of each sample sound pair with respect to the discomfort Examinees were gathered for evaluating the sample sound, to carry out paired comparison of the sample sounds to thereby judge which was more uncomfortable. At first, taking the comparison order into consideration, one examinee compared all combinations one each. Specifically, combinations of two were made from materials for the number of t, and N examinees compared all of the combinations (i, j) and (j, i), to thereby obtain a difference in the subjective evaluation values of i and j, with respect to each sample sound pair.

For example, the value is calculated such that when a sample sound (1) and a sample sound (2) are compared, 1 point when the sample sound (1) is uncomfortable, and −1 point when the sample sound (2) is uncomfortable. The points are added up for the number of the examinees, and then the added value is divided by the number of the examinees. The obtained value is the difference in the subjective evaluation value (grade). This is calculated for all combinations of the sounds.

(5) Calculation of a difference in the psychoacoustic parameter values of the sample sound pair The difference in the psychoacoustic parameter values of each sample sound pair measured in (3) was calculated. This calculation was performed for 400 data in total, that is, comparison data of 72×3=216, obtained by testing for 3 models for each velocity layer, and 184 comparison data obtained by the pretests and the mixture tests of sounds of each velocity layer. Table 8 shows a part of the result of creating the analysis data. This table 8 shows an example in which the sample sounds 1 to 6 are compared.

TABLE 8

CREATION OF DATA

| PRESENTATION ORDER i j | SOUND PRESSURE LEVEL DIFFERENCE | LOUDNESS DIFFERENCE | SHARPNESS DIFFERENCE | TONALITY DIFFERENCE | ROUGHNESS DIFFERENCE | IMPULSIVENESS DIFFERENCE | RELATIVE APPROACH DIFFERENCE | ppm DIFFERENCE | GRADE TOTAL | NUMBER OF EXAMINEES | SUBJECTIVE VALUE DIFFERENCE |
|---|---|---|---|---|---|---|---|---|---|---|---|
| ①-② | −3.7 | −1.3 | 0.0 | −0.08 | −0.10 | 0.00 | −0.17 | 0 | −31 | 31 | −1.000 |
| ②-① | 3.7 | 1.3 | 0.0 | 0.08 | 0.10 | 0.00 | 0.17 | 0 | 31 | 31 | 1.000 |
| ①-③ | 3.2 | 1.0 | 0.0 | 0.04 | 0.50 | 0.24 | 0.22 | 0 | 23 | 31 | 0.742 |
| ③-① | −3.2 | −1.0 | 0.0 | −0.04 | −0.50 | −0.24 | −0.22 | 0 | −29 | 31 | −0.935 |
| ①-④ | −3.1 | −1.3 | 0.1 | −0.02 | −0.30 | −0.05 | −0.06 | 0 | −25 | 31 | −0.806 |
| ④-① | 3.1 | 1.3 | −0.1 | 0.02 | 0.30 | 0.05 | 0.06 | 0 | 23 | 31 | 0.742 |
| ①-⑤ | −1.4 | −1.1 | 0.9 | −0.10 | 0.50 | 0.32 | −0.13 | 0 | −15 | 31 | −0.484 |
| ⑤-① | 1.4 | 1.1 | −0.9 | 0.10 | −0.50 | −0.32 | 0.13 | 0 | 9 | 31 | 0.290 |
| ①-⑥ | −1.4 | −0.7 | 0.1 | 0.02 | −0.20 | −0.06 | 0.15 | 0 | −7 | 31 | −0.226 |
| ⑥-① | 1.4 | 0.7 | −0.1 | −0.02 | 0.20 | 0.06 | −0.15 | 0 | 5 | 31 | 0.161 |

(6) To derive equation for predicting the grade difference

In order to accurately measure the subjective evaluation value (objective variable), it is effective to carry out the multiple regression analysis by using a plurality of psychoacoustic parameters (explanatory variable group). Since the single regression analysis is for predicting the objective variable by a single explanatory variable, the accuracy may be poor. The multiple regression analysis which predicts the objective variable by combining a plurality of explanatory variables is more effective. That is, the multiple regression analysis is a method of calculating the accurate prediction relation by using the addition relation (linear integration) of the explanatory variables.

The actual multiple regression analysis can be executed by using a commercially available spreadsheet software or statistical analysis software. For example, there can be used a regression analysis of an analysis tool of the spreadsheet software "Excel (trademark of Microsoft Corp.)", the statistical analysis software "JMP (trademark of SAS Institute Inc.)", or "SPSS (trademark of SPSS Inc.)".

By inputting the data in Table 8 (the subjective evaluation value a and the measurement result of the psychoacoustic parameters) in the "Excel" or "JMP" to execute the analysis, while selecting the explanatory variable, the statistical result such as regression coefficient, P-value of the selected explanatory variable and contribution ratio of the equation is output. Here, the P-value stands for the probability in the significance test, and it is judged such that it is significant if the P-value is 5% or less 5 and it is not significant (there is no relation) if it is larger than 5%.

All of the 400 data obtained by performing the paired comparison was used to carry out the multiple regression analysis, by designating a difference in grade as an objective variable and a difference in psychoacoustic parameter values and a difference in the ppm values as the explanatory variable group. In this case, this is a model of the grade difference, and hence the intercept was set to 0, to carry out the multiple regression analysis. As a result of variable selection, the sound pressure level, loudness, sharpness, tonality, impulsiveness and ppm value were selected. The result of the analysis of variance is as shown in Table 9.

TABLE 9

| DISPERSION ANALYSIS RESULT | | | | |
|---|---|---|---|---|
| FACTORS | DEGREE OF FREEDOM | SUM OF SQUARES | MEAN SQUARE | F VALUE |
| MODEL | 6 | 3937.3957 | 656.233 | 155.314 |
| DIFFERENCE | 394 | 1664.7285 | 4.225 | p VALUE (Prob > F) |
| OVERALL (CORRECTED) | 400 | 5602.1242 | | <.0001 |

From Table 9, the contribution ratio of the regression model is such that contribution ratio=sum of squares by the regression/entire sum of squares=3937.3957/5602.1242=0.7. The estimated value of the regression coefficient is as shown in Table 10.

TABLE 10

| MULTIPLE REGRESSION ANALYSIS RESULT | | | | | | |
|---|---|---|---|---|---|---|
| TERM | ESTIMATE VALUE | STANDARD ERROR | t VALUE | P VALUE | 95% LOWER LIMIT | 95% UPPER LIMIT |
| INTERCEPT | FIXED TO ZERO | 0 | | | 0 | 0 |
| SOUND PRESSURE LEVEL | 0.0636 | 0.009866 | 6.45 | <.0001 | 0.0442 | 0.0830 |
| LOUDNESS | 0.1178 | 0.025403 | 4.64 | <.0001 | 0.0678 | 0.1677 |
| SHARPNESS | 0.4356 | 0.03701 | 11.77 | <.0001 | 0.3629 | 0.5084 |
| TONALITY | 3.3075 | 0.38666 | 8.55 | <.0001 | 2.5473 | 4.0677 |
| IMPULSIVENESS | 0.1373 | 0.096945 | 1.42 | 0.1575 | −0.0533 | 0.3279 |
| PPM | −0.0026 | 0.001623 | −1.6 | 0.1113 | −0.0058 | 0.0006 |

regression coefficients thereof are 95% significant. Since the impulsiveness and the ppm have a slight correlation (as the ppm becomes high, the impulsiveness value becomes high, that is, the number of occurrence of the impulsive sound per # minute increases), the P-value exceeds 5%. However, it is not larger than 20%, and hence it is judged to be effective, and added in the variables. The upper limit and the lower limit at which the partial regression coefficient has a reliability of 95% are values obtained by summing up for plusses and minuses a double value ($2\sigma$) of the respectively corresponding standard error with respect to the estimated value of the regression coefficient.

Figure 11:
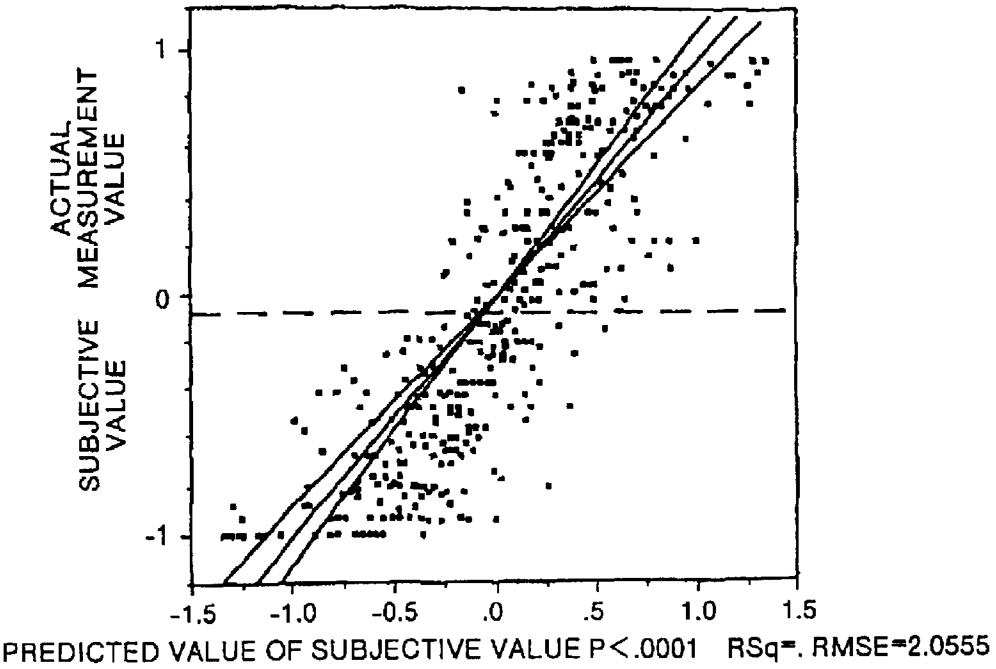
FIG. 11 is a scatter diagram plotting expected values and actual values of subjective values in this model.

FIG. 11 is a scatter diagram plotting the expected values and actual values of the subjective value in this model. In FIG. 11, the grade difference can only take a value of from −1 to 1, since even if all examinees judge that one is uncomfortable, as a result of the paired comparison, the maximum value is −1 or 1. However, the expected value is approximately in the range of from −1.5 to 1.5, and hence, it is seen that the expected value is slightly expanded.

(7) Calculation of a tone quality evaluation equation which predicts the grade

A change from the multiple regression model of difference to the relative evaluation model is considered here. When the difference model obtained in (6) is put into an equation, using the estimated value of the regression coefficient, it is expressed as described below:

$$\alpha i-\alpha j=0.0636365(\mathit{Xsound\ pressure\ level}_i-\mathit{Xsound\ pressure\ level}_j)$$
$$+0.117779(\mathrm{Xloudness}_i-\mathrm{Xloudness}_j)$$
$$+0.4356343(\mathrm{Xsharpness}_i-\mathrm{Xsharpness}_j)$$
$$+3.3074943(\mathrm{Xtonality}_j-\mathrm{xtonality}_j)$$
$$+0.1372841(\mathrm{Ximpulsiveness}_i-\mathrm{Ximpulsiveness}_j)$$
$$-0.00259(X_{ppmi}-X_{ppmj}) \quad \text{(equation 6).}$$

Therefore,

Zero is substituted in the grade, and a mean value of the sample sound used for the tests is respectively substituted in the Xsound pressure $\mathrm{level}_0$, $\mathrm{Xloudness}_0$, $\mathrm{Xsharpness}_0$, $\mathrm{Xtonality}_0$, $\mathrm{Ximpulsiveness}_0$ and $X_{ppm0}$ at that time. Table 11 collectively shows measured values of the psychoacoustic parameters of the sample sounds used for the tests. The mean value of each psychoacoustic parameter is calculated and shown in the lower part of the table.

TABLE 11

| TYPE | SOUND PRESSURE LEVEL dB(A) | LOUDNESS (sone) | SHARPNESS (acum) | TONALITY (tu) | IMPULSIVENESS (lu) | ppm |
|---|---|---|---|---|---|---|
| 20 ppm MACHINE | 52.8 | 7.5 | 2.25 | 0.12 | 0.61 | 20 |
| | 56.5 | 8.8 | 2.25 | 0.20 | 0.61 | 20 |
| | 49.6 | 6.6 | 2.20 | 0.08 | 0.37 | 20 |
| | 55.9 | 8.8 | 2.15 | 0.14 | 0.66 | 20 |
| | 54.2 | 8.6 | 1.40 | 0.22 | 0.29 | 20 |
| | 54.2 | 8.2 | 2.15 | 0.10 | 0.68 | 20 |

TABLE 11-continued

| TYPE | SOUND PRESSURE LEVEL dB(A) | LOUD-NESS (sone) | SHARP-NESS (acum) | TONALITY (tu) | IMPULSI-VENESS (lu) | ppm |
|---|---|---|---|---|---|---|
| | 51.8 | 6.8 | 2.35 | 0.11 | 0.43 | 20 |
| | 54.0 | 7.5 | 2.30 | 0.21 | 0.48 | 20 |
| | 53.6 | 7.0 | 2.35 | 0.07 | 0.76 | 20 |
| 27 ppm MACHINE | 51.0 | 6.9 | 2.40 | 0.05 | 0.40 | 27 |
| | 56.3 | 9.0 | 2.85 | 0.06 | 0.40 | 27 |
| | 47.1 | 4.8 | 2.05 | 0.04 | 0.48 | 27 |
| | 54.6 | 7.9 | 3.10 | 0.04 | 0.45 | 27 |
| | 55.7 | 6.9 | 1.80 | 0.05 | 0.43 | 27 |
| | 55.7 | 7.6 | 2.25 | 0.07 | 0.42 | 27 |
| | 49.2 | 5.7 | 1.80 | 0.08 | 0.42 | 27 |
| | 52.1 | 6.3 | 2.80 | 0.04 | 0.48 | 27 |
| | 50.1 | 6.8 | 3.15 | 0.05 | 0.42 | 27 |
| 65 ppm MACHINE | 51.3 | 7.6 | 2.10 | 0.03 | 0.50 | 65 |
| | 59.1 | 11.9 | 2.35 | 0.08 | 0.49 | 65 |
| | 57.2 | 10.7 | 2.10 | 0.05 | 0.51 | 65 |
| | 59.2 | 12.0 | 2.65 | 0.05 | 0.47 | 65 |
| | 55.3 | 10.0 | 2.40 | 0.04 | 0.48 | 65 |
| | 58.9 | 11.0 | 1.85 | 0.08 | 0.50 | 65 |
| | 60.3 | 12.3 | 2.30 | 0.06 | 0.52 | 65 |
| | 60.3 | 11.5 | 2.06 | 0.05 | 0.54 | 65 |
| | 58.2 | 10.8 | 3.10 | 0.03 | 0.57 | 65 |
| THREE TYPE COMBINED TEST | 56.8 | 10.4 | 2.36 | 0.15 | 0.43 | 65 |
| | 57.4 | 10.4 | 1.88 | 0.11 | 0.46 | 65 |
| | 55.9 | 10.4 | 2.96 | 0.05 | 0.47 | 65 |
| | 58.1 | 8.8 | 1.92 | 0.15 | 0.41 | 27 |
| | 54.6 | 8.7 | 3.05 | 0.09 | 0.39 | 27 |
| | 54.3 | 8.7 | 2.49 | 0.05 | 0.40 | 27 |
| | 51.9 | 7.0 | 2.89 | 0.16 | 0.57 | 20 |
| | 51.6 | 7.0 | 2.34 | 0.10 | 0.64 | 20 |
| | 52.8 | 7.0 | 1.90 | 0.06 | 0.71 | 20 |
| OVERALL MEAN VALUE | 54.3 | 8.4 | 2.3 | 0.08 | 0.51 | 38.8 |
| AVERAGE OF 20 ppm MACHINE | 53.6 | 7.7 | 2.2 | 0.14 | 0.54 | 20.0 |
| AVERAGE OF 27 ppm MACHINE | 52.6 | 6.9 | 2.5 | 0.05 | 0.43 | 27.0 |
| AVERAGE OF 65 ppm MACHINE | 57.7 | 10.8 | 2.3 | 0.05 | 0.51 | 65.0 |
| AVERAGE OF COMBINED TEST | 54.8 | 8.7 | 2.4 | 0.10 | 0.50 | 37.3 |

When the mean value is respectively substituted in the following equation according to the above equation 6:

$$\alpha i - a0 = 0.0636365(Xsound\ \text{pressure level}_i - Xsound\ \text{pressure level}_0)$$
$$+0.117779(\text{Xloudness}_i - \text{Xloudness}_0)$$
$$+0.4356343(\text{Xsharpness}_i - \text{Xsharpness}_0)$$
$$+3.3074943(\text{Xtonality}_i - \text{xtonality}_0)$$
$$+0.1372841(\text{Ximpulsiveness}_i - \text{Ximpulsiveness}_0)$$
$$-0.00259(X_{ppmi} - X_{ppm0}),$$

$$\alpha i = 0.0636365\ \text{Xsound pressure level}_i + 0.117779\ \text{Xloudness}_i + 0.4356343\ \text{Xsharpness}_i + 3.3074943\ \text{Xtonality}_i + 0.1372841\ \text{Ximpulsiveness}_i - 0.00259\ X_{ppmi} - 5.7021510214407.$$

For easy use, if αi is designated as a discomfort index S of the sound, and rounded off at the fourth decimal place, the following tone quality evaluation equation can be obtained.

$$S = 0.0636xsound\ \text{pressure level}_i + 0.1178\ Xloudness_i + 0.4356Xsharpness_i + 0.3075Xtonality_i + 0.1373Ximpulsiveness_i - 0.0026X_{ppmi} - 5.7022 \quad (g)$$

From the above equation, in order to reduce the discomfort, it is seen that it is only necessary to execute:

1. reducing the sound pressure level,
2. reducing the size of audibility,
3. reducing the high-frequency component,
4. reducing the pure sound,
5. reducing the impulsive sound.

Since the loudness and the sound pressure level have high correlation, these can be reduced at the same time frequently.

The regression coefficient takes a fiducial interval of 95%, as in the multiple regression analysis result shown in Table 10 (multiple regression analysis result). The result of round-off thereof at the fourth decimal place is as described below. The range of intercept is the result of carrying out calculation by substituting the 95% fiducial interval of the respective partial regression coefficients therein. The following equation (e) uses this result.

$$0.0442 \leqq \text{regression coefficient of sound pressure level} \leqq 0.0830$$
$$0.0678 \leqq \text{regression coefficient of loudness} \leqq 0.1677$$
$$0.3629 \leqq \text{regression coefficient of sharpness} \leqq 0.5084$$
$$2.5473 \leqq \text{regression coefficient of tonality} \leqq 4.0677$$
$$0.0533 \leqq \text{regression coefficient of impulsiveness} \leqq 0.3279$$
$$-0.0058 \leqq \text{regression coefficient of ppm} \leqq 0.0006$$
$$-3.7769 \leqq \text{intercept} \leqq 7.6274 \quad (e)$$

(8) Verification for Each Test by the Derived Tone Quality Evaluation Equation

Figure 12:
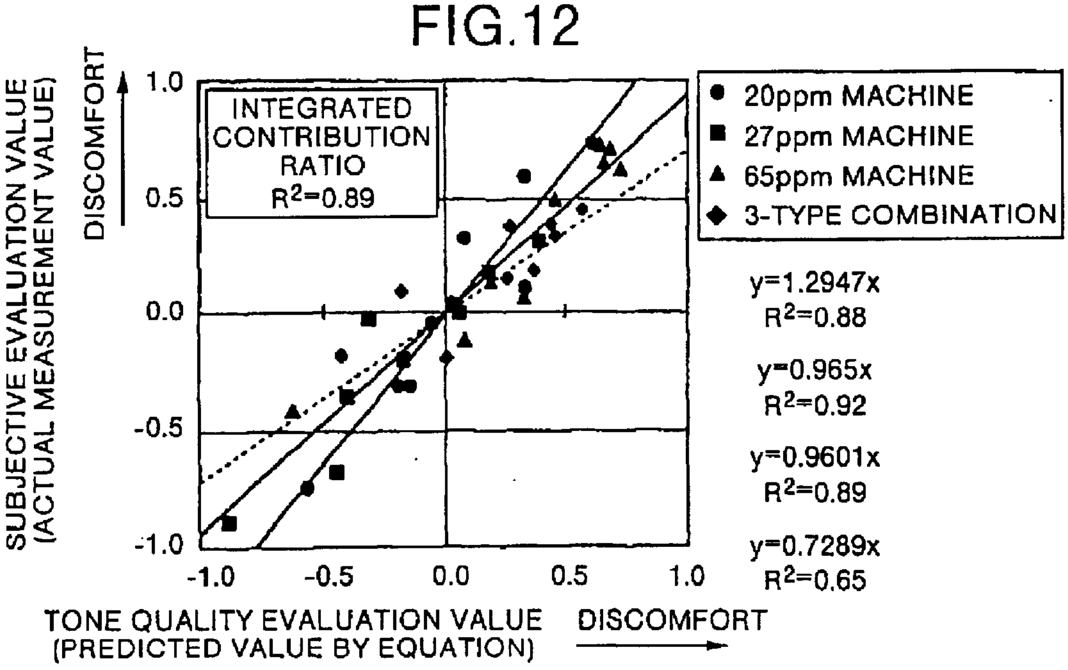
FIG. 12 is a graph plotting the results of regression analysis of grades obtained by tests using a 20 ppm machine, a 27 ppm machine and a 65 ppm machine, and using a tone quality evaluation equation.
Figure 13:
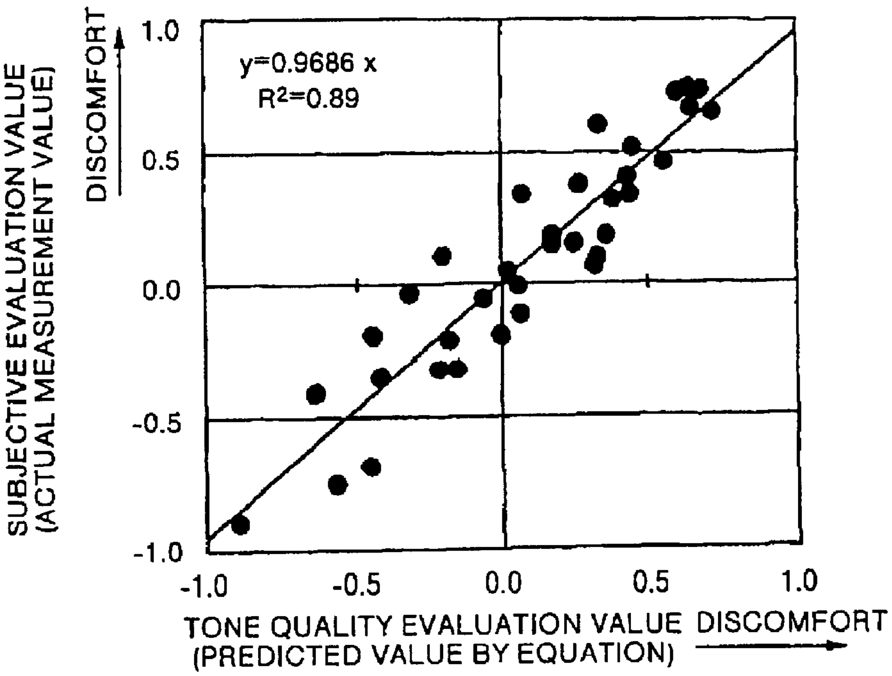
FIG. 13 is a graph which shows the result of FIG. 12, as seen as the overall data, without separating to each test.

FIG. 12 is a graph plotting the result of the regression analysis of the grade obtained by the tests with a 20 ppm machine, a 27 ppm machine and a 65 ppm machine, using the above equation (e). Though the accuracy of the mixture tests is slightly low, but the inclination in other tests is substantially 1, and the contribution ratio is about 99%. FIG. 13 is a graph which shows the result as seen as the whole data, without separating the result for each test. The inclination in this case is substantially 1, and the contribution ratio is about 90%.

That is, it is seen that the derived tone quality evaluation equation unifying from the low-speed machine to the high-speed machine can satisfactorily predict the past respective test results, and that this equation can correspond to image formation apparatus having various tones, of from the low-speed machine to the high-speed machine. A constant term of the intercept is added for each test, and this is necessary to adjust the relative origin (centroid) for each test. That is, if the tests for the low velocity layer and the high velocity layer are compared, the ranges which the psychoacoustic parameters such as loudness and the like can take are different. Hence, in the low velocity layer and the high velocity layer, the mean value of the loudness is different. Naturally, the loudness value is larger in the machine of the high velocity layer.

The derived and unified tone quality evaluation equation designates the whole range of from the low speed machine to the high speed machine as the centroid, and hence it is necessary to correct the difference from the mean value for each test, when verification with the past tests is to be performed. In FIG. 12, the constant term is output in a corrected value. Further, the regression equation and the contribution ratio in the figure are the same as the order in the explanatory notes.

The reason why the constant term is necessary is that a restriction is provided such that in each test, the sum of the grades is set to 0, to perform the calculation.

In this improved method, since this restriction itself is not necessary, and hence the coincidence degree of the inclination needs only to be noted. That is, the discomfort can be measured hereinafter by the discomfort level of the discomfort index S calculated by the unified tone quality evaluation equation (g) described above, and adjustment is not required. This constant term is a value obtained by the following manner, under the same idea as that of when a change is performed from the multiple regression model of difference to the grade model. That is, a mean value in each layer is substituted in the equation (6), to determine the intercept, to thereby obtain a difference from the overall average. The values are shown in Table 12. When this difference from the overall average is added to each test, it is put on the same base as the value of the tone quality evaluation equation derived this time.

TABLE 12

RELATION BETWEEN MEAN VALUE OF PSYCHOACOUSTIC PARAMETERS AND INTERCEPT FOR EACH TEST

| | SOUND PRESSURE LEVEL | LOUDNESS | SHARPNESS | TONALITY | IMPULSIVENESS | ppm | INTERCEPT | DIFFERENCE FROM OVERALL AVERAGE |
|---|---|---|---|---|---|---|---|---|
| OVERALL MEAN VALUE | 54.3 | 8.4 | 2.3 | 0.08 | 0.51 | 39 | −5.702 | 0.000 |
| AVERAGE OF LOW VELOCITY LAYER | 53.6 | 7.7 | 2.2 | 0.14 | 0.54 | 20 | −5.742 | 0.040 |
| AVERAGE OF MEDIUM VELOCITY LAYER | 52.6 | 6.9 | 2.5 | 0.05 | 0.43 | 27 | −5.396 | −0.306 |
| AVERAGE OF HIGH VELOCITY LAYE | 57.7 | 10.8 | 2.3 | 0.05 | 0.51 | 65 | −6.037 | 0.335 |

Table 13 collectively shows the result of tests for each layer of the low speed machine (20 ppm), the medium speed machine (27 ppm), and the high speed machine (65 ppm), obtained by testing when to which level the discomfort index S drops, it is not felt uncomfortable. A denotes a sound having good evaluation, C denotes a sound having bad evaluation, and B denotes the medium evaluation. Of these sounds, CC denotes a sound that has been evaluated as C by all examinees, and AA denotes a sound that has been evaluated as A by all examinees. The discomfort index S of the evaluation of AA is designated as a tolerance 2, and the discomfort index S of the sound that has been evaluated as A not by all examinees, but by most examinees is designated as a tolerance 1.

TABLE 13

| ppm | TOLERANCE 1 | TOLERANCE 2 |
|---|---|---|
| 20 | −0.6 | −0.7 |
| 27 | −0.448 | −0.672 |
| 65 | −0.3555 | −0.6296 |

Figure 14:
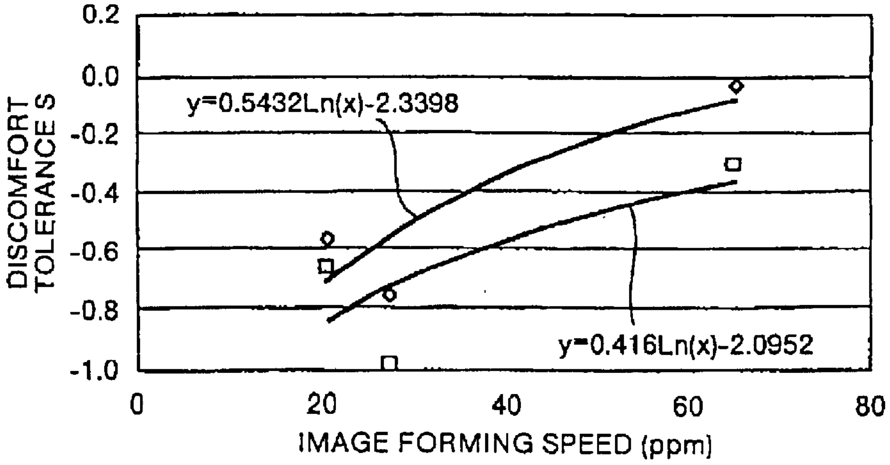
FIG. 14 is a graph which shows the result obtained by approximating the relation of the image formation apparatus and the tolerance based on Table 14.

The comparison is not possible in Table 13 as it is, but when a difference from the overall average in Table 12 is added to the values in FIG. 13, the tolerance by the derived tone quality evaluation equation is obtained. Those values are collectively shown in Table 14. As shown in FIG. 14, the high-speed machine has a tendency that the tolerance becomes optimistic.

TABLE 14

| ppm | CORRECTED TOLERANCE 1 | CORRECTED TOLERANCE 2 |
|---|---|---|
| 20 | −0.560 | −0.660 |
| 27 | −0.754 | −0.978 |
| 65 | −0.020 | −0.294 |

FIG. 14 is a graph which shows the result of approximating the relation between the image formation speed and the tolerance based on Table 14. The approximation of tolerance becomes:

$$S \leqq 0.5432\,\mathrm{LN}(x) - 2.3398 \quad \text{(f)}$$

$$S \leqq 0.416\,\mathrm{Ln}(x) - 2.0952 \quad \text{(h).}$$

From the equations (f) and (h), when the tolerance is calculated for every 10 ppm, the result as shown in Table 15 is obtained. If these values are satisfied, the operating noise of the formation apparatus which does not cause discomfort can be obtained.

TABLE 15

| ppm | TOLERANCE 1 MEASUREMENT RESULT | TOLERANCE 2 MEASUREMENT RESULT |
|---|---|---|
| 20 | −0.713 | −0.849 |
| 30 | −0.492 | −0.680 |
| 40 | −0.336 | −0.561 |
| 50 | −0.215 | −0.468 |
| 60 | −0.116 | −0.392 |
| 70 | −0.032 | −0.328 |

When the discomfort of noise is to be judged, the position where the noise is collected is set to a position of a neighboring person in ISO7779 (see FIG. 10), at a distance of 1.00 m±0.03 mm from the projection on the horizontal plane of a reference box, and at a height of 1.50±0.03 m above the floor level or at a height of 1.20±0.03 m above the floor level. Though the noise is different on the four sides of the image formation apparatus, it is necessary that at least the front side where people mainly exist is not higher than the tolerance. Preferably, noise on all sides is made not higher than the tolerance. Alternatively, it can be considered to make the mean value of the noise on the four sides not higher than the tolerance, or to make at least one side not higher than the tolerance.

(Reduction Example of Uncomfortable Sound of Image Formation Apparatus, Common to the First and Second Embodiments)

The source of uncomfortable sound has a high correlation with the sound pressure level, loudness, sharpness, tonality and impulsiveness, from the above-described equations (a) and (e). Here, the sound source of the image formation apparatus having a high correlation with each of the psychoacoustic parameters is as described below:

1) Sharpness, sliding noise of recording paper,
2) Tonality, AC charging noise,
3) Impulsiveness, metallic impulsive sound, and
4) Sound pressure level and loudness, acoustic energy and the size of audibility of various sound sources.

Therefore, measures are taken against the respective sound sources, such as "reduction of sliding noise of paper", "reduction of metallic impulsive sound" and "reduction of charging noise" described below.

"Reduction of Sliding Noise of Paper"

Figure 15:
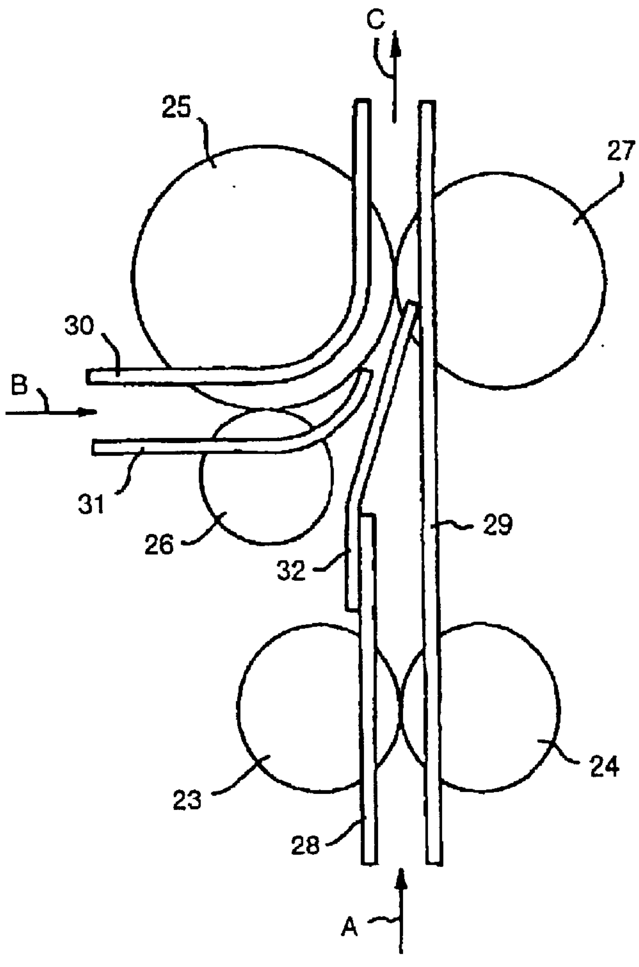
FIG. 15 is a diagram of a main part in an enlarged scale, which shows a transmission route.
Figure 16:
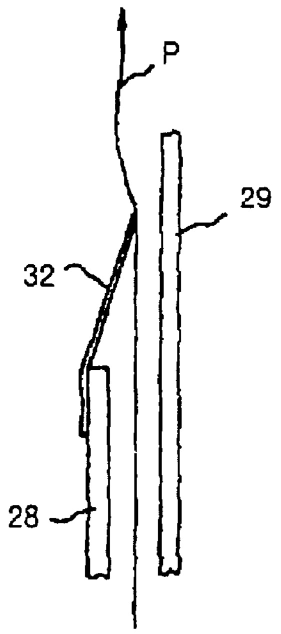
FIG. 16 is a diagram which shows a conventional paper-guiding structure.

FIG. 15 is a sectional view of a transport section which guides both the transport from the paper feed unit 5 and the transport from the intermediate tray 20 for duplex copying towards the resist roller pair 33. FIG. 14 is a diagram expressing the conventional relation between the paper and the flexible sheet 32.

In FIG. 15, reference numerals 23 and 24 denote a roller in which a plurality of runners are threaded on a shaft, wherein the roller 23 and the roller 24 are paired to form a first carrier roller pair for carrying the paper, and rotated so as to transport the paper carried from the paper feed tray (not shown) in the direction of an arrow A shown in the figure.

In FIG. 15, reference numerals 25, 26 and 27 denote a roller in which a plurality of runners are threaded on a shaft, wherein the roller 25 and the roller 26 are paired to form a second carrier roller pair for carrying the paper, and rotated so as to transport the paper carried from the intermediate tray (not shown) in the direction of an arrow B shown in the figure.

The roller 25 and the roller 27 are paired to form a third carrier roller pair for carrying the paper, and rotated so as to transport the paper in the direction of an arrow C shown in the figure, that is, towards the resist roller pair 33. In the transport passage of the first carrier roller pair which are rotated to carry the paper in the direction of the arrow A, guide plates 28 and 29 are provided, and these guide plates 28 and 29 are bored so as to avoid the runner portions of the rollers 23 and 24.

Similarly, in the transport passage of the second carrier roller pair which are rotated to carry the paper in the direction of the arrow B, guide plates 30 and 31 are provided, and these guide plates 30 and 31 are bored so as to avoid the runner portions of the rollers 25 and 26.

In the transport passage of the third carrier roller pair which are rotated to carry the paper in the direction of the arrow C, there are extension portions of the guide plates 29 and 30, and these are bored so as to avoid the runner portions of the rollers 25 and 27. At the end of the downstream side of the guide plate 28, there is attached a flexible sheet 32 extending in the paper feed direction, so as to guide the paper.

The transport passage is formed such that the paper carried from the direction A and the paper carried from the direction B are both carried in the direction C. The paper carried from the intermediate tray 20 to the direction B may be often curled downwards, and in order to prevent bending and paper jam, the flexible sheet (specifically, myler sheet) 32 is bent to the right in the figure.

Therefore, the paper carried from the paper feed unit 5 in the direction A detours the edge of the flexible sheet 32 and goes into the space in the carrier roller pair 25, 27.

Figure 19:
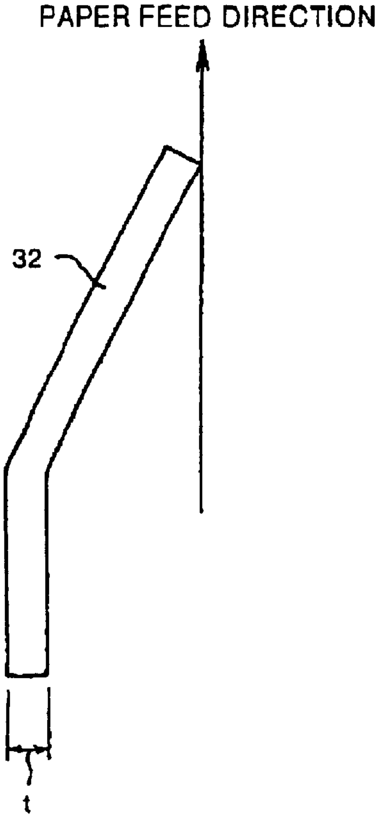
FIG.19 PRIOR ART
FIG. 19 is an elevational view which shows the contact state between the flexible sheet in the conventional paper-guiding structure and the paper.

As shown in FIG. 19, the paper is carried while sliding on the edge of the flexible sheet 32. There are undulations of fibers on the surface of the paper.

On the other hand, since the flexible sheet 32 is sheared, there are burrs on the periphery thereof. It takes time and is expensive to remove the burrs of the flexible sheet 32 one by one. As the undulations of fibers on the surface of the paper proceed, the burrs at the edge of the flexible sheet 32 and the paper vibrate together, to generate a large sound. Thus, noise occurs.

Therefore, in this embodiment, prevention of vibration generation is designed as described below.

Figure 17:
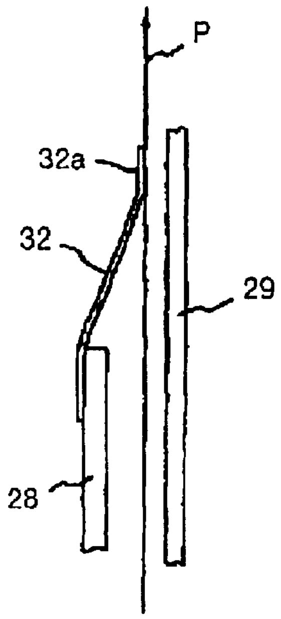
FIG. 17 is a diagram which shows a paper-guiding structure in this embodiment.
Figure 18A:
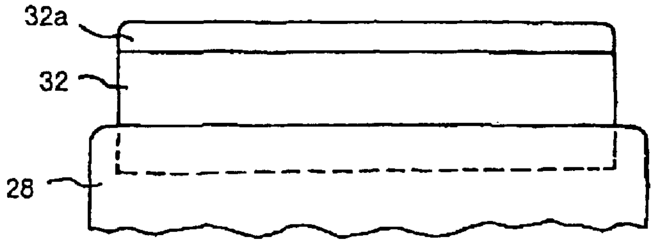
FIG. 18 is an elevational view and a side view which shows a flexible sheet in the paper-guiding structure shown in FIG. 17.
Figure 18B:

An example of the flexible sheet 32 according to this embodiment is shown in FIG. 17 and FIG. 18.

In FIG. 17 and FIG. 18, the edge of the flexible sheet 32 attached to the guide plate 28 has a bend 32*a*, in order to reduce a sliding noise generated at the time of sliding to scratch the paper carried from the direction of arrow A in FIG. 15 (the paper surface has a certain degree of surface roughness, and when the edge is slid, a noise containing lots of high frequency components is generated).

The surface of the flexible sheet 32 is very smooth, and even if the bend 32*a* is provided, the smoothness is not lost.

FIG. 17 shows the situation that the paper is carried while rubbing the bend 32*a* of the flexible sheet 32.

FIG. 19 shows a conventional example, wherein the edge of the flexible sheet 32 slides such that the paper is scratched by the edge.

Figure 20:
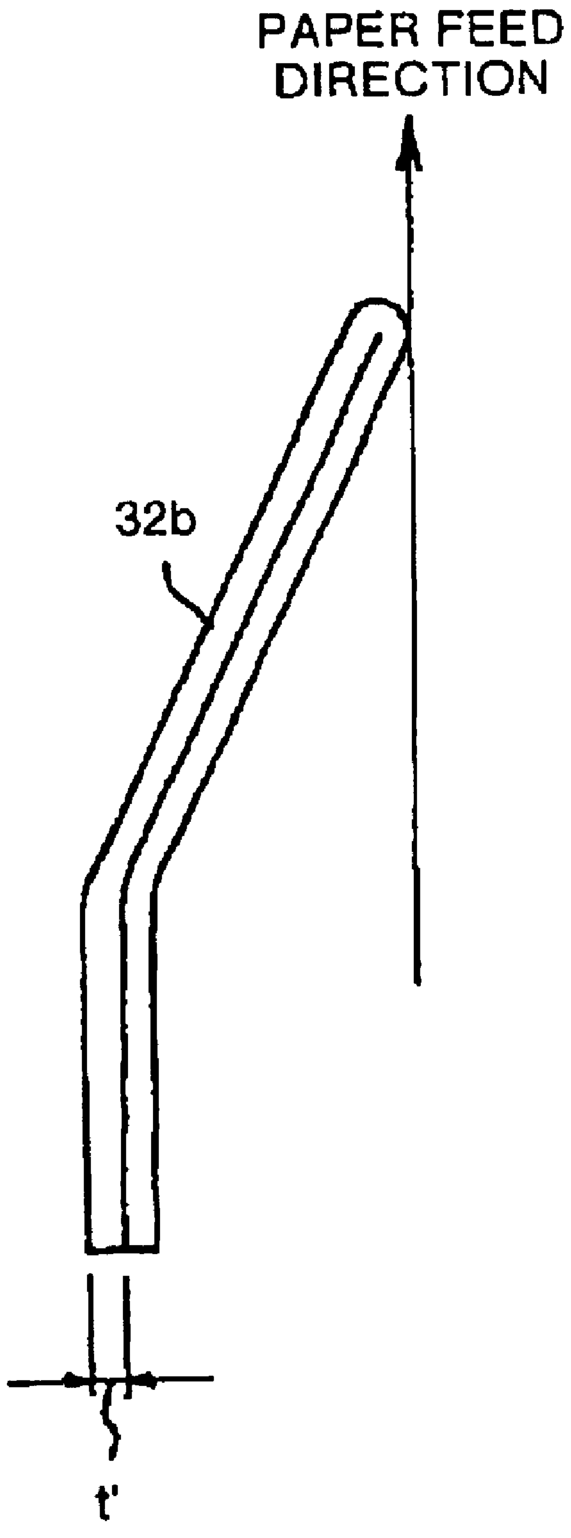
FIG. 20 is an elevational view which shows the contact state between the flexible sheet in the paper-guiding structure and the paper in another embodiment.

FIG. 20 shows a flexible sheet 32*b* in an other embodiment, which is formed by bending and overlapping a flexible sheet having a thickness of less than half the thickness t of the conventional flexible sheet. The edge of the sheet can be formed in the shape of R without changing the resiliency of the flexible sheet, and hence the sliding noise is not generated.

Figure 21:
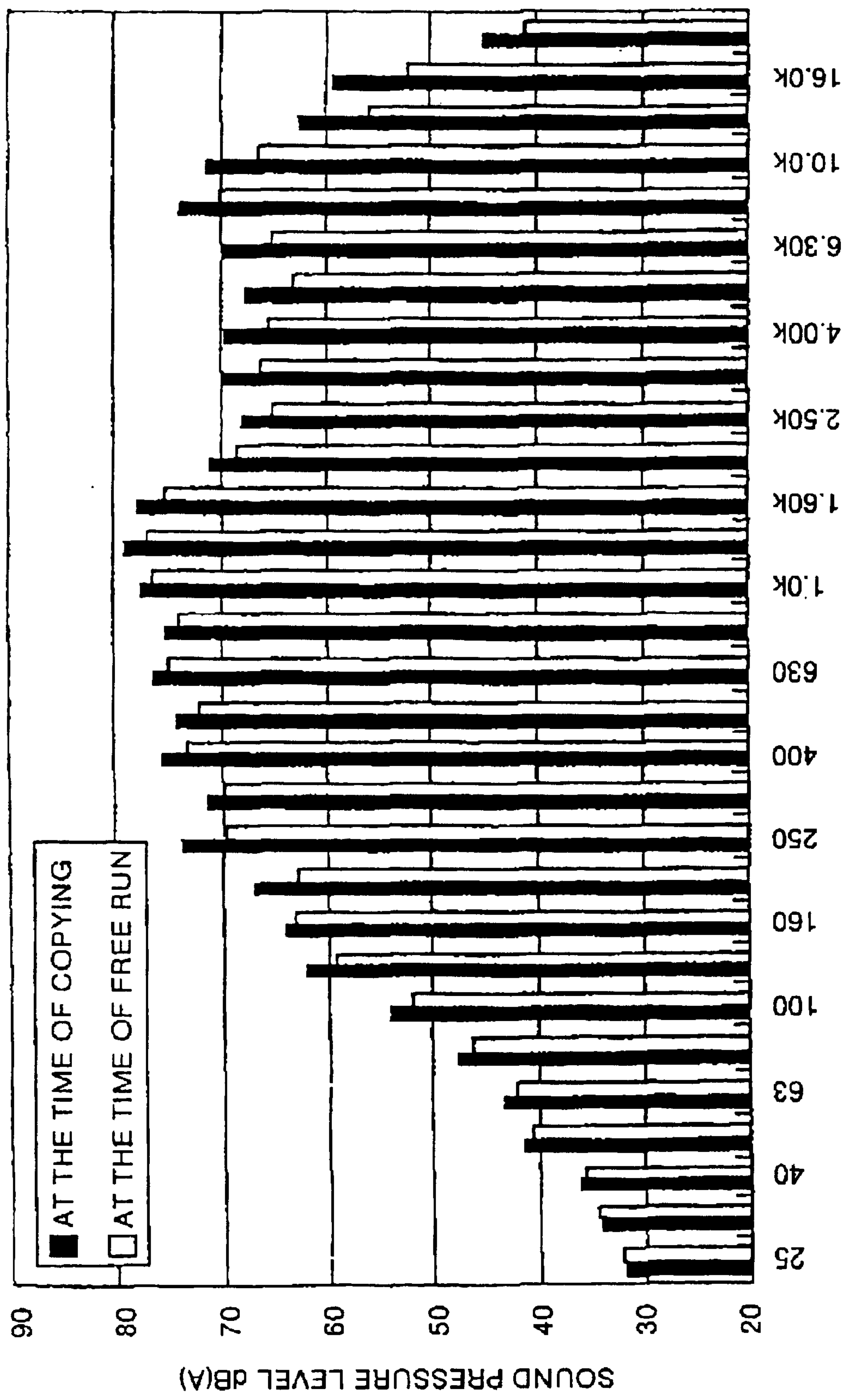
FIG. 21 is a graph which shows one example of the result of a noise frequency analysis (⅓ octave band analysis) of the image formation apparatus.

FIG. 21 shows an example of the frequency analysis (⅓ octave band analysis) result of noise of the image formation apparatus. It shows a comparison result of at the time of copying while carrying paper, and at the time of free run (in the mode in which copying operation is carried out without carrying paper).

Figure 22:
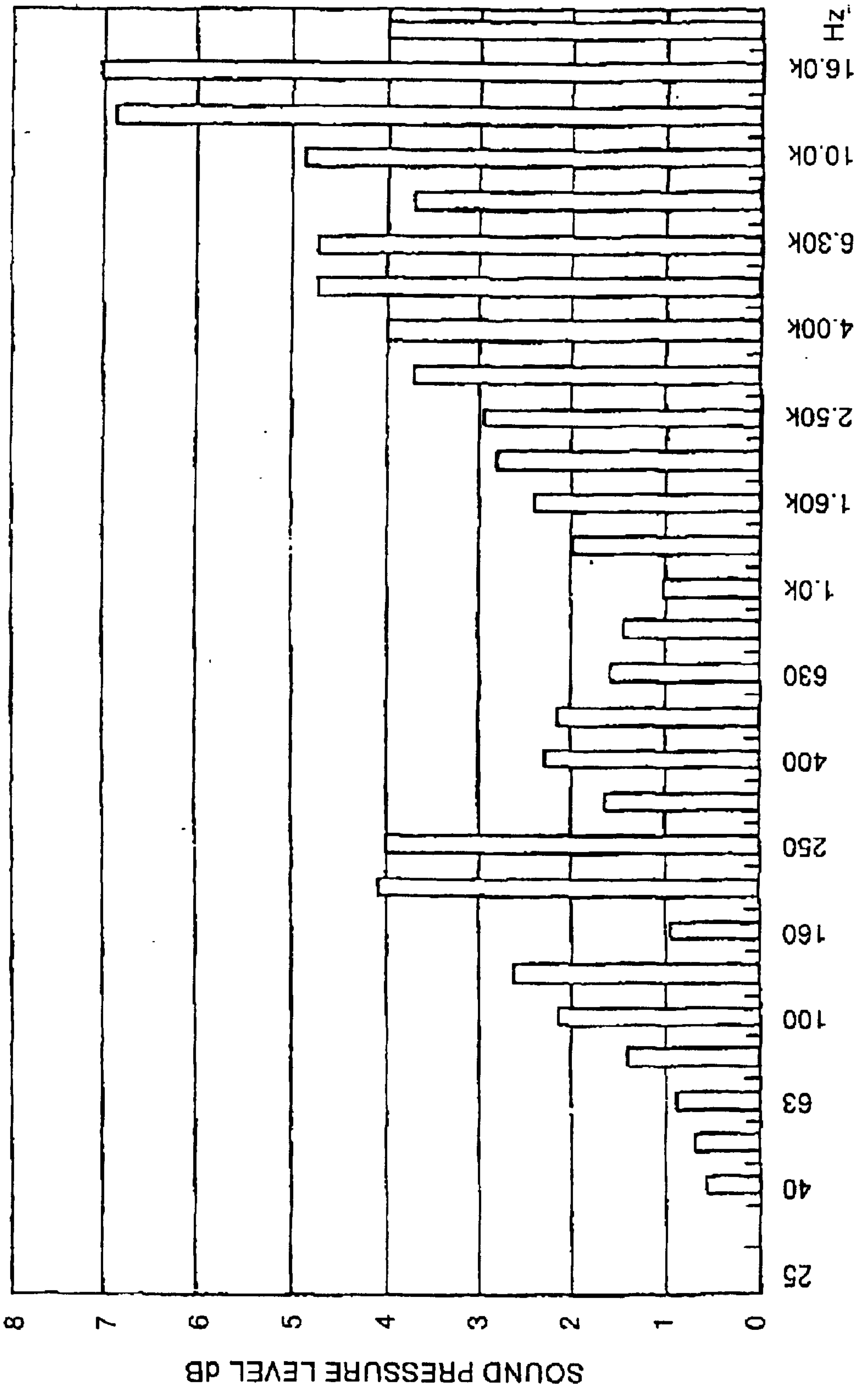
FIG. 22 is a graph which shows a difference in the sound pressure level between at the time of copying and at the time of free run.

FIG. 22 is a graph which shows a difference in sound pressure level at the time of copying and at the time of free run. In this graph, the main purpose is to study the distribution of frequency, and hence relative comparison of the sound pressure level in each frequency band has a meaning, but the absolute value of the sound pressure level does not have any meaning, since it is not calibrated accurately.

The difference in the sound pressure level in each frequency bandwidth in FIG. 22 is a difference caused depending on whether paper is carried or not. That is, it shows a frequency distribution of sound resulting from paper transport. From FIG. 22, the portion where there is a difference of 3 dB or larger is a frequency band of from about 200 to 250 Hz, which is a relatively low frequency, and is a frequency band of 3.15 kHz or higher, which is a relatively high frequency. Acoustically, when there is a difference of 3 dB, a double difference occurs in the acoustic energy.

As a result of analysis, it has been found that the noise in the frequency band of from about 200 to 250 Hz, which is a relatively low frequency, is a collision noise between the paper and the carrier roller. It is known that this does not have any relation with discomfort by the tone quality evaluation equation tests, and hence there is no need to takes measures relating to this, in view of improving the tone quality.

It has been also found that the frequency of 3.15 kHz or higher is due to the sliding noise of paper. That is, it is a noise caused by vibration of the paper, which is generated because the paper rubs against the edge of the flexible sheet 32.

As is seen from FIG. 22, in the frequency band of from 12.5 k to 16 kHz, there is a noticeable difference of about 7 dB.

By forming the flexible sheet 32 as shown in FIG. 17 and FIG. 20, fundamental measures can be taken against the source of the paper sliding noise, and it is possible to reduce the frequency of 3.15 kHz or higher. This frequency band has a large contribution to the sharpness, and the size of audibility also decreases. As a result, it also contributes to the loudness.

"Reduction of Metallic Impulsive Sound"

Figure 23:
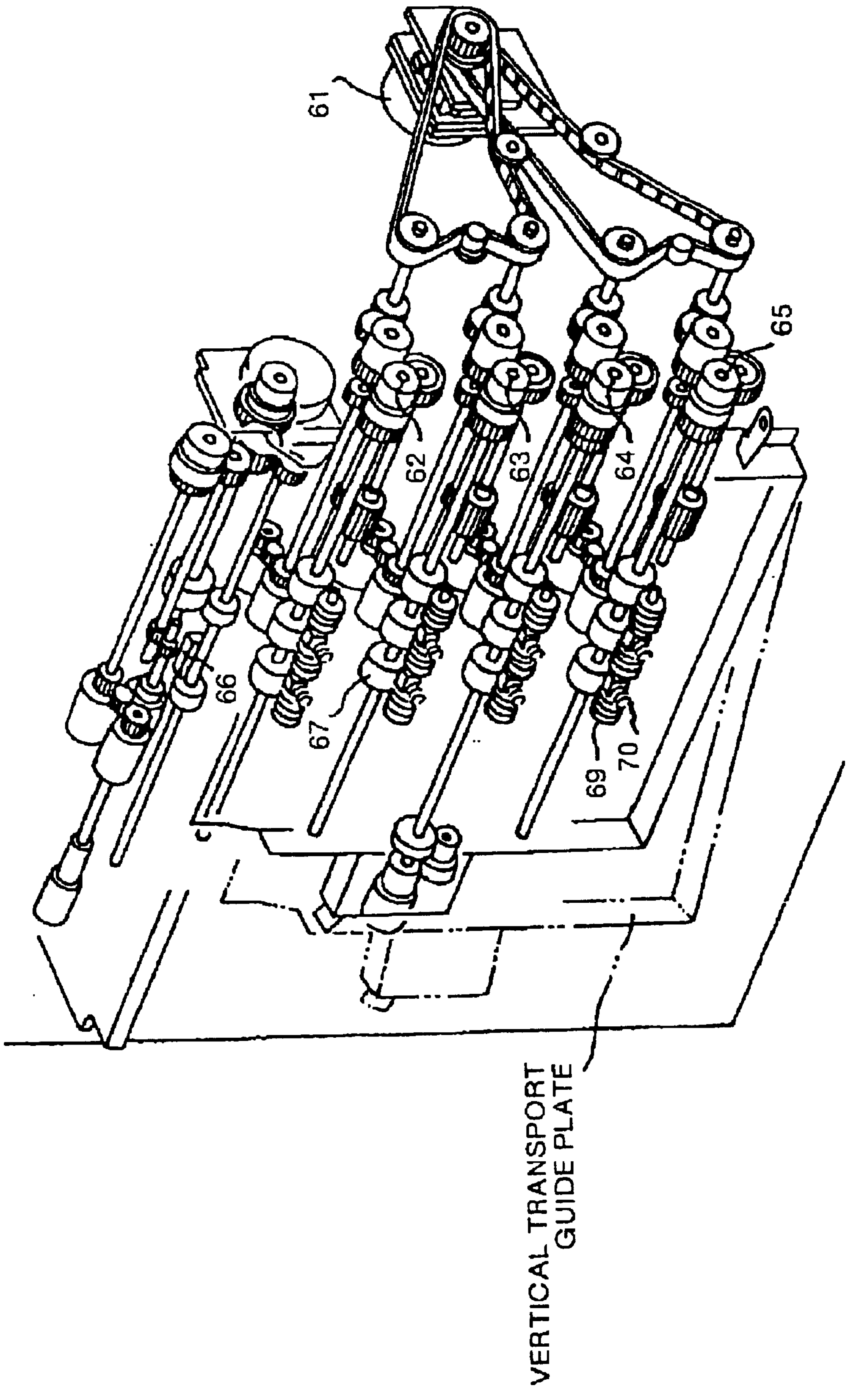
FIG. 23 is a perspective view which shows a drive transfer mechanism of a paper feed unit and a paper carrier roller.

FIG. 23 shows the situation of a drive transmission mechanism of the paper feed unit 5 and the paper carrier roller in the lower part 2 in a perspective view.

The paper feed unit 5 is capable of feeding paper in four stages. As the stage goes up, the transport passage becomes shorter, and hence the image formation for the first page becomes faster. Therefore, on the first stage (the uppermost stage), the sheets of A4 size which are used most frequently are often set, and on the third and fourth stages (lower stages), sheets of B4 size and A3 size, which are not used so frequently nowadays, may be set.

Grip rollers 67 are installed in each of the four paper feed units, so that the paper fed from each paper feed unit is carried upwards via the grip rollers 67. The grip rollers 67 are provided with driven runners 69, and pressurized by a pressurizing spring 70.

These grip rollers 72 and a paper separation mechanism (not shown) are driven by a bank motor 61, so as to carry the paper to the upper part 1. On each shaft of the grip rollers 67, there are provided an intermediate clutch (first clutch) 62, an intermediate clutch (second clutch) 63, an intermediate clutch (third clutch) 64 and an intermediate clutch (fourth clutch) 65. These clutches are electromagnetic clutches, and the drive is connected or disconnected by on/off of the electric current.

These are for cutting down the interval between sheets by feeding paper during image formation, to thereby increase the efficiency of image formation. An intermediate sensor 66 is provided for a trigger of image writing and jam detection.

It is known that the main factor of the metallic impulsive sound is the intermediate clutches 62 to 65 in the paper feed unit 5 (paper feed bank). These four intermediate clutches operate every time one sheet of paper is fed. In order to simplify the control, the configuration is such that these clutches operate, when the paper is fed from any stage of the paper feed unit 5.

Therefore, even when the paper is fed from the first stage of the bank, the grip rollers 67 in the second to the fourth stages, which are not required to be driven, are also driven.

When the paper is fed from the fourth stage (the lowermost stage) of the bank, paper is not fed upwards, unless all grip rollers 67 operate, and hence it is necessary that all intermediate clutches 62 to 65 are operated.

However, as described above, the use frequency is high only in the first stage or the second stage of the bank. The use frequency of the third and fourth stages is low, since paper of a size having a low use frequency is set therein.

A large metallic impulsive sound is generated because all the intermediate clutches 62 to 65 in the paper feed unit 5 simultaneously operate. Therefore, if the configuration is changed such that when the first stage of the bank is used, only the intermediate clutch 62 is operated, the occurrence of the energy of metallic impulsive sound can be suppressed to one fourth.

As described above, by controlling such that only the intermediate clutch on the upper stage than the bank which is used for paper feed is operated, the noise and electric energy can be suppressed.

Figure 24:
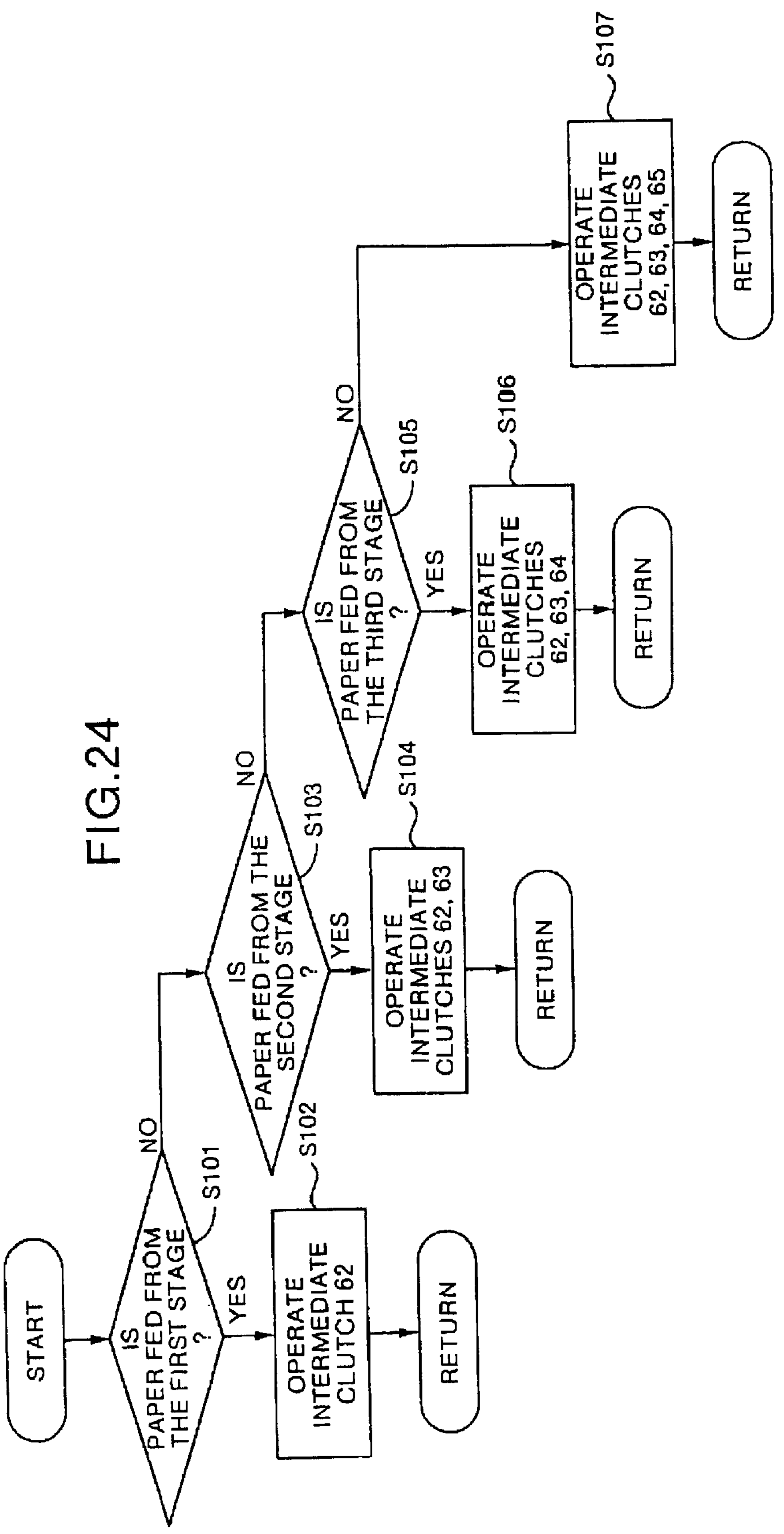
FIG. 24 is a flowchart which shows the control of an intermediate clutch.

FIG. 24 shows an example of a control flow of the intermediate clutches 62 to 65. Only the control part of the intermediate clutch is shown. At first, it is checked whether paper is fed from the first stage (S101), and if it is from the first stage, only the intermediate clutch 62 is operated (S102). At S101, when it is not from the first stage, it is checked whether paper is fed from the second stage (S103), and if it is from the second stage, only the intermediate clutches 62 and 63 are operated (S104).

At S103, when it is not from the second stage, it is checked whether paper is fed from the third stage (S105), and if it is from the third stage, the intermediate clutches 62, 63 and 64 are operated (S106). At S105, when it is not from the third stage, the intermediate clutches 62, 63, 64 and 65 are operated (S107).

By controlling in this manner, the intermediate clutch of the necessary portion is operated, and the intermediate clutches on the lower stage having a low use frequency are not operated. As a result, the occurrence of the metallic impulsive sound can be suppressed.

Figure 25:
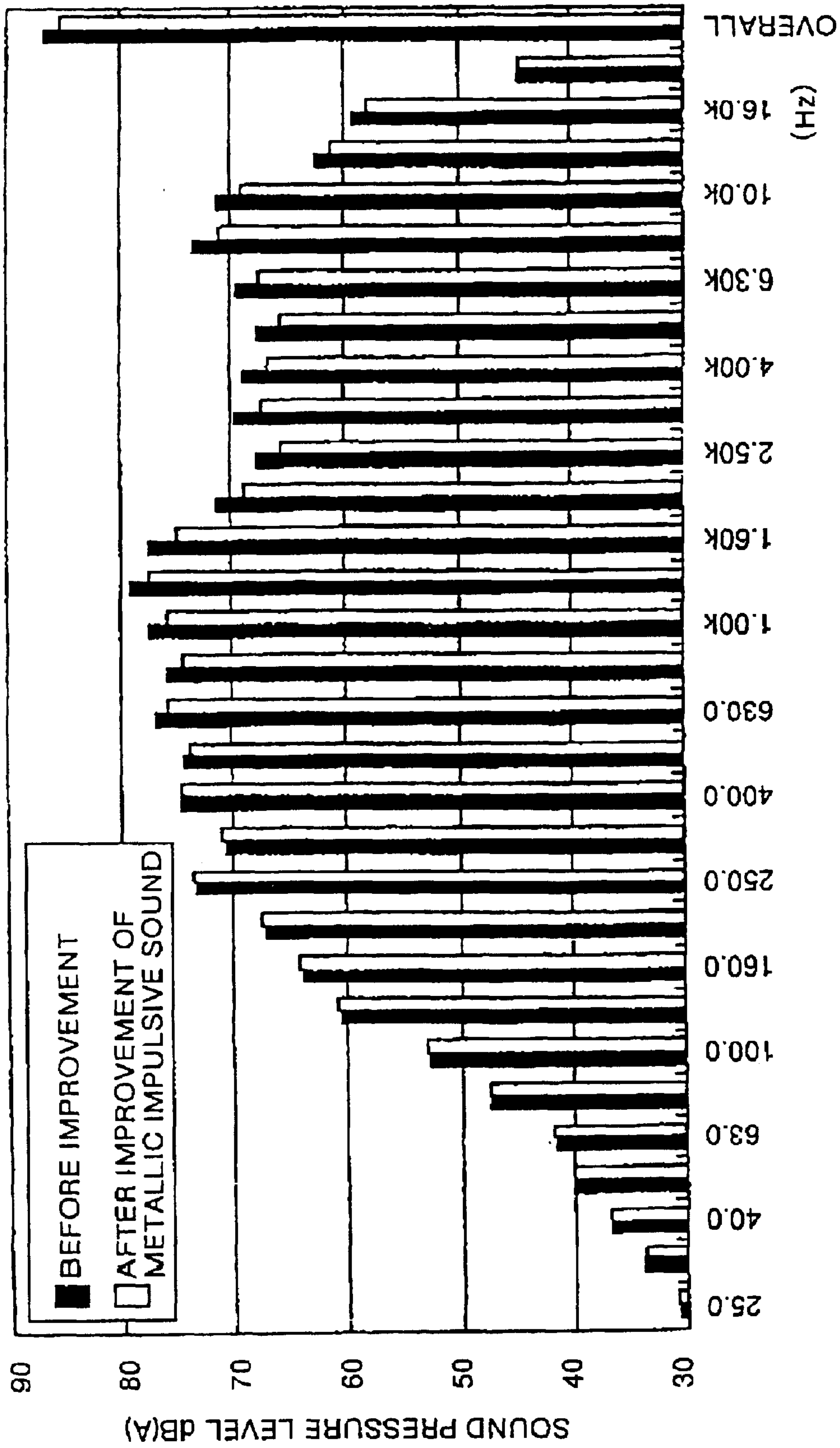
FIG. 25 is a graph which shows a difference in the sound pressure level before and after the improvement of a metal impulsive sound.

FIG. 25 is a graph which shows a change of noise before and after the control Of the intermediate clutch is changed.

Before the improvement in the graph is obtained by operating four intermediate clutches 62 to 65 as usual. The improvement of the metallic impulsive sound is obtained by operating only the intermediate clutch 62 of the first stage.

According to this figure, the impulsive sound of the clutch is a broad-band noise on the high frequency side of from about 1 k to 20 kHz, and contributes not only to the impulsiveness but also to the sharpness and the loudness. In this manner, reduction of uncomfortable sounds is achieved by suppressing the sound source of the impulsive sound.

"Reduction of Charging Noise"

The respective sound sources will be explained below. Measures have been taken in order of reduction of charging noise→reduction of paper sliding noise→reduction of metallic impulsive sound.

(Reduction Example 1 of Charging Noise)

In this reduction example 1 of charging noise, in the image formation apparatus shown in FIG. 2, the charging noise is reduced by press-fitting a cylindrical member having high rigidity into the photosensitive drum 91, being an image carrier, to thereby make the characteristic frequency in the photosensitive drum 91 a value different from a frequency obtained by multiplying a frequency f of an alternating current bias of the charging roller 92 by a natural number.

When the vibration frequency occurring between the charging roller 92 and the photosensitive drum 91 coincides with the frequency obtained by multiplying a characteristic frequency fd of the photosensitive drum 91 itself by a natural number, or is in the vicinity thereof, the photosensitive drum 91 causes resonance, and hence the sound pressure level of the charging noise increases abruptly.

Figure 26:
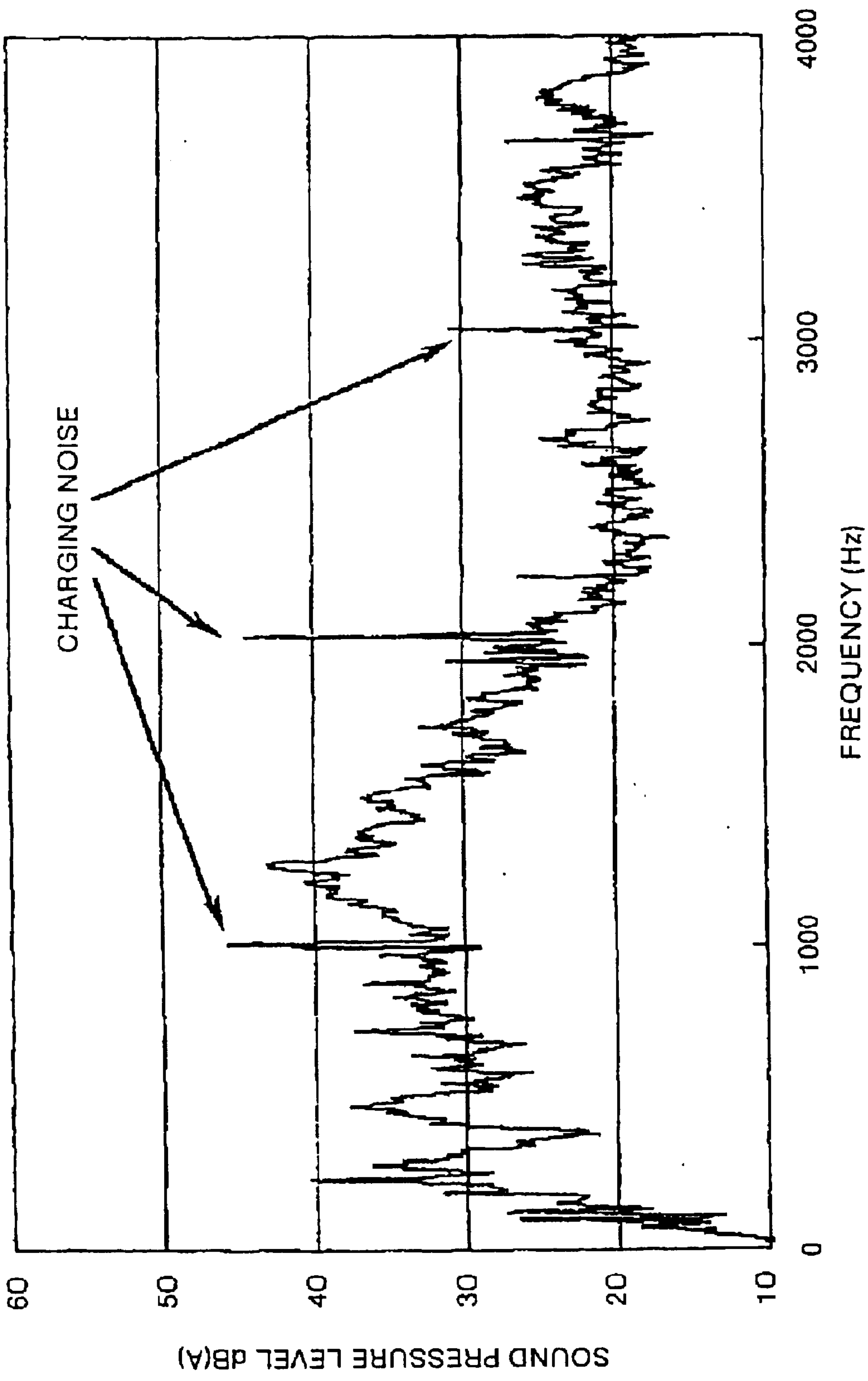
FIG. 26 is a graph which shows one example of the noise frequency analysis result of the image formation apparatus.

As a result, the discomfort index S increases abruptly. Therefore, by setting in advance the characteristic frequency fd of the photosensitive drum 91 to a frequency different from the frequency obtained by multiplying the frequency f of the alternating current bias at the time of charging by a natural number, resonance of the photosensitive drum 91 is prevented, to thereby reduce the charging noise. For example, in the example shown in FIG. 26, it is set such that the frequency obtained by multiplying 1000 Hz by a natural number does not coincide with the characteristic frequency fd of the photosensitive drum 91.

Figure 27:
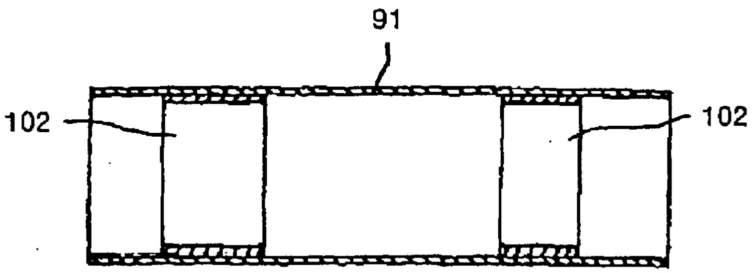
FIG. 27 is a schematic sectional view which shows an example in which a characteristic frequency of a photosensitive drum is changed.

FIG. 27 is a sectional view which shows a configuration example (1) in which the characteristic frequency of the photosensitive drum 91 is changed. In this figure, a cylindrical member 102 having high rigidity is press-fitted into the photosensitive drum 91. By press-fitting the cylindrical member 102, the weight and the rigidity of the photosensitive drum 91 is increased, and hence the characteristic frequency of the photosensitive drum 91 changes. Thereby, when the frequency obtained by multiplying the frequency f of the alternating current bias by a natural number coincides with the characteristic frequency fd of the photosensitive drum 91 or is in the vicinity thereof, the characteristic frequency fd of the photosensitive drum 91 can be changed. As a result, the occurrence of uncomfortable charging noise due to resonance can be prevented.

(Reduction Example 2 of Charging Noise)

In this reduction example 2 of charging noise, in the image formation apparatus shown in FIG. 2, the charging noise is reduced by providing a sound absorbing member inside the photosensitive drum 91, being an image carrier, to thereby make the characteristic frequency of the photosensitive drum 91 a value different from a frequency obtained by multiplying the frequency f of the alternating current bias of the charging roller 92 by a natural number.

Figure 28:
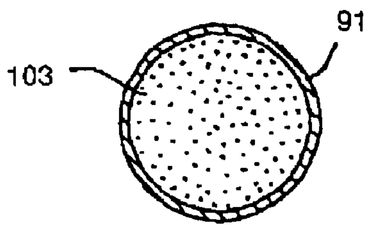
FIG. 28 is a schematic sectional view which shows another example in which a characteristic frequency of a photosensitive drum is changed.
Figure 29:
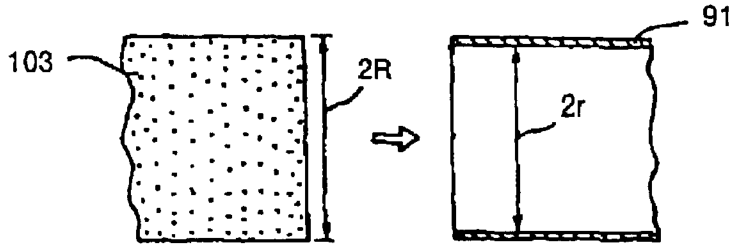
FIG. 29 is a diagram which shows the assembly operation in the example shown in FIG. 28.

FIG. 28 and FIG. 29 are respectively a sectional view which shows the configuration example (2) in which the characteristic frequency of the photosensitive drum 91 is changed. FIG. 28 shows a photosensitive drum 91 in which a sound absorbing member 103 is press-fitted. FIG. 29 is a sectional side view which shows the relation between the sound absorbing member 103 and the photosensitive drum 91.

As shown in FIG. 29, a columnar sound absorbing member 103 having a diameter 2 R larger than the inner diameter 2 r of the photosensitive drum 91 is prepared. The sound absorbing member 103 is preferably made of polyurethane foam in view of easy handling, and for example, a sound absorbing material Hamadamper HU-4 manufactured by The Yokohama Rubber Co., Ltd. is used. By elastically deforming this, it is inserted into the photosensitive drum 91.

FIG. 28 shows the state that the sound absorbing member 103 is press-fitted in the photosensitive drum 91. The inserted sound absorbing member 103 tries to return to the shape before the deformation and expands, and hence it is easy to take out the sound absorbing member 103 from the photosensitive drum 91. Thereby, the charging noise generated by the photosensitive drum 91 can be absorbed.

(Reduction Example 3 of Charging Noise)

In this reduction example 3 of charging noise, in the image formation apparatus shown in FIG. 2, the charging noise is reduced by adhering a damping member 104 inside of the photosensitive drum 91, being an image carrier, to thereby make the characteristic frequency of the photosensitive drum 91 a value different from a frequency obtained by multiplying the frequency f of the alternating current bias of the charging roller 92 by a natural number.

Figure 30:
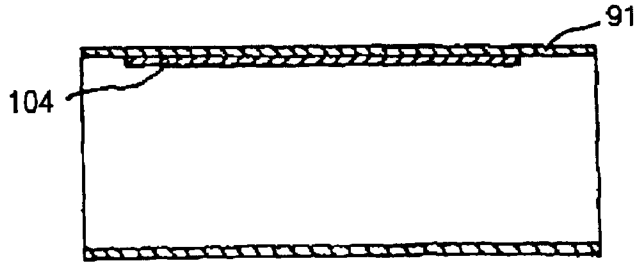
FIG. 30 is a schematic sectional view which shows an example in which a damping member is adhered to the photosensitive drum.

FIG. 30 is a sectional view which shows the configuration example (3) in which the characteristic frequency of the photosensitive drum 91 is changed. Here, the damping member 104 is adhered on the inside of the photosensitive drum 91. The damping member 104 has the effect that the energy generated by the vibration of the photosensitive drum 91 is absorbed and is changed to thermal energy, to attenuate the vibration speed or the vibration amplitude to thereby reduce the acoustic emission. As the material of the damping member 104, for example, there can be mentioned a lightweight damping material, Regetrex manufactured by NITTO DENKO CORPORATION. This is a damping material obtained by adhering an adhesive having high viscosity on a thin aluminum plate, which is a substrate, for absorbing the vibration energy by the adhesive. Thereby, the vibration energy between the charging roller 92 and the photosensitive drum 91 generated by the frequency f of the alternating current bias at the time of charging is absorbed, to thereby suppress the occurrence of the charging noise.

(Reduction Example 4 of Charging Noise)

In this reduction example 4 of charging noise, in the image formation apparatus shown in FIG. 2, the charging noise is reduced by charging a direct current bias to the photosensitive drum 91, being an image carrier, via the charging roller.

Figure 31:
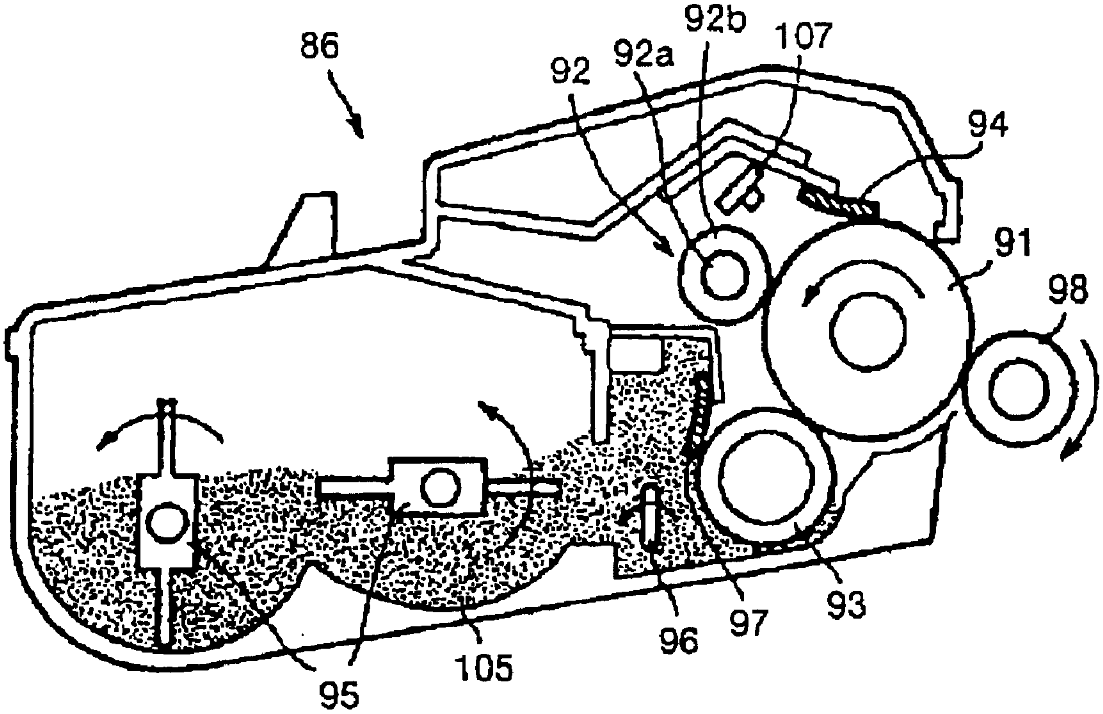
FIG. 31 is a diagram which explains a configuration example of a process cartridge in which the charging method is a DC charging method.

FIG. 31 is a diagram which explains the configuration example (4) of a process cartridge 86, in which a direct current charging method is used as the charging method. In this process cartridge 86, there are arranged the photosensitive drum 91 as an image carrier, and in the vicinity thereof, a charging roller 92 as a charging unit, a developing roller 93 as a developing unit, and a cleaning blade 94 as a cleaning unit. A toner hopper comprises an agitator 95 which stirs the toner 105 and sends it out to the developing roller 93, a stirring shaft 96 and a developing blade 106. The charging roller 92 comprises a core section 92_a_ and a charging section 92_b_.

Around the photosensitive drum 91 as the image carrier, the charging roller 92, the developing roller 93 and the cleaning blade 94 are arranged under predetermined conditions. The toner 105 in the process cartridge 86 is stirred by the agitator 95 and the stirring shaft 96, and carried to the developing roller 93. The toner 105 adhered on the surface of the roller by the magnetic force in the developing roller 93 is negatively charged by triboelectrification, at the time of passing through the developing blade 97. The negatively charged toner is moved to the photosensitive drum 91 by the bias voltage, and adheres on the electrostatic latent image.

When the transfer paper carried through the resist roller 85 passes through between the photosensitive drum 91 and the transfer roller 98, the toner on the photosensitive drum 91 is transferred to the transfer paper due to the positive charge from the transfer roller 98. The residual toner on the photosensitive drum 91 is scraped off by the cleaning blade 94, and recovered into a tank located above the cleaning blade 94 as exhaust toner. In order to eliminate the residual electric charge on the photosensitive drum 91, removal of electricity is executed by whole surface exposure of a discharging lamp (LED) 107, to thereby prepare for the next image formation. Parts other than the transfer roller 8 are unified as the process cartridge, so that a user can replace it.

In the case of charging by the alternating current bias, an attractive force and a repulsive force alternately works between the surface of the charging roller 92 and the surface of the photosensitive drum 91, due to the AC component in the bias voltage, to thereby cause vibrations in the charging roller 92. On the other hand, in the case of charging by the direct current bias, vibrations of the charging roller 92 does not occur, and hence charging noise is not generated. When only the direct current bias is applied to the charging roller 92, the discharging unit for removing the residual electric charge becomes necessary, which is not required in the alternating current charging. As described above, by changing the charging method from the alternating current charging method to the direct current charging method, occurrence of uncomfortable charging noise can be prevented.

In this embodiment, reduction of the AC charging noise has been considered. However, as a sound source in which pure sound tends to occur, there can be mentioned a rotation driving noise of a polygon motor and a polygon mirror, and a sound of drive frequency of a stepping motor, and when these sounds are also generated, it is very uncomfortable, and hence measures against it is necessary.

According to the embodiment, the configuration is such that the discomfort index of sound obtained by an equation using the loudness value, the sharpness value, the tonality value and the impulsiveness value of the psychoacoustic parameters obtained from the sound at a position away from the end face of the image formation apparatus by a predetermined distance (1 m) is reduced by conditions. As a result, the discomfort of noise generated by the image formation apparatus can be alleviated.

According to the embodiment, the discomfort of noise generated by the image formation apparatus can be alleviated, by tuning the image formation apparatus to less than a value at which discomfort is hardly felt, with respect to the tone quality evaluation value calculated by a tone quality evaluation equation using the psychoacoustic parameters in which the condition of the roughness value is limited.

According to the embodiment, the discomfort of noise generated by the image formation apparatus can be alleviated, by tuning the image formation apparatus to less than a value at which discomfort is hardly felt, with respect to the tone quality evaluation value calculated by a tone quality evaluation equation using the psychoacoustic parameters in which the condition of the relative approach value is limited.

According to the embodiment, by setting such that a discomfort index S calculated by the tone quality evaluation equation (e) using the sound pressure level, and the loudness value, the sharpness value, the tonality value and the impulsiveness value of the psychoacoustic parameters, and the ppm value satisfies the condition of $S \leqq 0.5432 \times \mathrm{Ln}\,(\mathrm{ppm}) - 2.3398$, it becomes possible to evaluate the relevant sound based on the physical quantity, with respect to the operating noise of the image formation apparatus which operates from low speed to high speed. As a result, uncomfortable sound source attributable to the noise generated by the image formation apparatus, including from the low speed machine to the medium to high speed machine, can be improved with respect to the people around the apparatus, according to the objective evaluation criteria, thereby psychological discomfort can be alleviated.

According to the embodiment, by setting such that a discomfort index S calculated by the tone quality evaluation equation (g) using the sound pressure level, and the loudness value, the sharpness value, the tonality value and the impulsiveness value of the psychoacoustic parameters, and the ppm value satisfies the condition of $S \leqq 0.5432 \times \mathrm{Ln}\,(\mathrm{ppm}) - 2.3398$, it becomes possible to evaluate the relevant sound based on the physical quantity, with respect to the operating noise of the image formation apparatus which operates from low speed to high speed. As a result, uncomfortable sound source attributable to the noise generated by the image formation apparatus, including from the low speed machine to the medium to high speed machine, can be improved with respect to the people around the apparatus, according to the objective evaluation criteria, thereby psychological discomfort can be alleviated.

According to the embodiment, since it is set such that the discomfort index S obtained by the tone quality evaluation S equation (e) or (g) satisfies the condition of $S \leqq 0.416\ \mathrm{Ln}\,(\mathrm{ppm}) - 2.0952$, the discomfort of noise generated by the image formation apparatus can be alleviated, with respect to the image formation apparatus.

According to the embodiment, with respect to the noise emitted from the image formation apparatus, a discomfort index S of the noise in the direction of at least the operating section (front direction) is calculated by a standard measurement method, setting the position of a neighboring person specified in ISO7779, that is, a predetermined distance from the end face of the image formation apparatus to 1.00 m±0.03 mm, and at a height of 1.50±0.03 m above the floor level or at a height of 1.20±0.03 m above the floor level, to thereby suppress the discomfort index S to not larger than the tolerance. As a result, the discomfort can be alleviated, in the direction that the human may often hear the noise.

According to the embodiment, with respect to the noise emitted from the image formation apparatus, by setting the position of a neighboring person specified in ISO7779, that is, a predetermined distance from the end face of the image formation apparatus to 1.00 m±0.03 mm, and at a height of 1.50±0.03 m above the floor level or at a height of 1.20±0.03 m above the floor level, discomfort indexes S of noise in four directions of front and back, and right and left are calculated by the standard measurement method, to thereby suppress the discomfort index S to not larger than the tolerance. As a result, the average discomfort on the four sides of the image formation apparatus can be alleviated.

According to the embodiment, with respect to the noise emitted from the image formation apparatus, by setting the position of a neighboring person specified in ISO7779, that is, a predetermined distance from the end face of the image formation apparatus to 1.00 m±0.03 mm, and at a height of 1.50±0.03 m above the floor level or at a height of 1.20±0.03 m above the floor level, a discomfort index S of noise of at least one side is calculated by the standard measurement method, to thereby suppress the discomfort index S to not larger than the tolerance. As a result, the side where the discomfort index S is not larger than the tolerance can be installed in the direction where many people often exist.

According to the embodiment, with respect to the noise emitted from the image formation apparatus, by setting the position of a neighboring person specified in ISO7779, that is, a predetermined distance from the end face of the image formation apparatus to 1.00 m±0.03 mm, and at a height of 1.50±0.03 m above the floor level or at a height of 1.20±0.03 m above the floor level, discomfort indexes S of noise of all the four sides are calculated by the standard measurement method, to thereby suppress the discomfort index S to not larger than the tolerance. As a result, in any side, the discomfort index S can be set not larger than the tolerance.

According to the embodiment, in order to satisfy the conditions, a high-frequency component reduction unit is provided. As a result, discomfort of noise can be alleviated by reducing the sharpness value and the loudness value.

According to the embodiment, in order to satisfy the conditions, a pure sound component reduction unit is provided. As a result, discomfort of noise can be alleviated by reducing the tonality value.

According to the embodiment, in order to satisfy the conditions, the configuration is made such that the impulsive sound is reduced. As a result, discomfort of noise can be alleviated by reducing the impulsiveness value, the loudness value and the sharpness value.

The present documents incorporates by reference the entire contents of Japanese priority documents 2001-206500 filed in Japan on Jul. 6, 2001, 2002-162122 filed in Japan on Jun. 3, 2002, and 2002-177500 filed in Japan on Jun. 18, 2002.

Although the invention has been described with respect to a specific embodiment for a complete and clear disclosure, the appended claims are not to be thus limited but are to be construed as embodying all modifications and alternative configurations that may occur to one skilled in the art which fairly fall within the basic teaching herein set forth.

What is claimed is:

1. An image formation apparatus in which the a discomfort index S of the sound obtained by the following tone quality evaluation equation a) expressed in a regression equation, using regression coefficients of loudness value, sharpness value, tonality value and impulsiveness value of psychoacoustic parameters obtained from the operating noise at a position away from an end face of an image formation apparatus by a predetermined distance:

$$S = A\times(\text{loudness value}) + B\times(\text{sharpness value}) + C\times(\text{tonality value}) + D\times(\text{impulsiveness value}) + E, \text{ where}$$

$$0.209 \leqq A \leqq 0.249$$

$$0.308 \leqq B \leqq 0.439$$

$$3.669 \leqq C \leqq 4.984$$

$$0.994 \leqq D \leqq 1.461$$

$$-4.280 \leqq E \leqq 3.274 \quad \text{(a)}$$

satisfies the condition of:

$$S \leqq 0.6708\times nN(ppm) - 2.824$$

$$16 \leqq ppm \leqq 70 \quad \text{(b)},$$

and where pmm is defined as the number of sheets of A4 lateral size paper printed in one minute, and Ln is natural logarithm.

2. The image formation apparatus according to claim 1, wherein a pure sound component reduction unit is provided, in order to satisfy the condition (b).

3. The image formation apparatus according to claim 2, wherein the pure sound component reduction unit has a configuration for reducing the charging noise generated when charging is performed by an alternating current bias with respect to an image carrier.

4. The image formation apparatus according to claim 3, wherein the configuration for reducing the charging noise is a configuration for making the characteristic frequency of the image carrier a frequency different from a frequency of obtained by multiplying the frequency f of the alternating current bias by a natural number.

5. The image formation apparatus according to claim 3, wherein the configuration for reducing the charging noise is one having a sound-absorbing member inside the image carrier.

6. The image formation apparatus according to claim 3, wherein the configuration for reducing the charging noise is one for performing damping processing to the image carrier.

7. The image formation apparatus according to claim 1, where n a high-frequency component reduction unit which reduces the high-frequency components is provided, in order to satisfy the condition (b).

8. The image formation apparatus according to claim 7, wherein the high-frequency component reduction unit has a configuration for reducing the sliding noise of a recording medium in a paper feed transport unit.

9. The image formation apparatus according to claim 8, wherein the high-frequency component reduction unit is a guide member which guides the according medium, the guide member is formed of a flexible sheet, and the end portion of the flexible sheet which is brought into contact with the recording medium is curved so as not to have an edge, or bent so as to be rounded.

10. The image formation apparatus according to claim 1, wherein an impulsive sound reduction unit for reducing the impulsive sound is provided in order to satisfy the condition (b).

11. The image formation apparatus according to claim 10, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

12. An image formation apparatus in which a discomfort index S of sound obtained by the following tone quality evaluation equation (a) expressed in a regression equitation, using regression coefficients of loudness value, sharpness value, tonality value and impulsiveness value of psychoacoustic parameters obtained from the operating noise at a position away from an end face of an image formation apparatus by a predetermined distance:

$$S=A\times(\text{loudness value})+B\times(\text{sharpness value})+C\times(\text{tonality value})+D\times(\text{impulsiveness value})+E,\ \text{where}$$

$$0.209\leqq A\leqq 0.249$$

$$0.308\leqq B\leqq 0.439$$

$$3.669\leqq C\leqq 4.984$$

$$0.994\leqq D\leqq 1.461$$

$$-4.280\leqq E\leqq -3.274 \quad \text{(a)}$$

wherein the discomfort index S satisfies the condition of:

$$S\leqq 0.5436\times nN(ppm)-2.5795$$

$$16\leqq \text{ppm}\leqq 70 \quad \text{(d)},$$

and where pmm is defined as the number of sheets of A4 lateral size paper printed in one minute, and Ln is natural logarithm.

13. The image formation apparatus according to claim 12, wherein a high-frequency component reduction unit which reduces the high-frequency components is provided, in order to satisfy the condition (d).

14. The image formation apparatus according to claim 13, wherein the high-frequency component reduction unit has a configuration for reducing the sliding noise of a recording medium in a paper feed transport unit.

15. The image formation apparatus according to claim 14, wherein the high-frequency component reduction unit is a guide member which guides the recording medium, the guide member is formed of a flexible sheet, and the end portion often flexible sheet which is brought into contact with the recording medium is curved so a not to have an edge, or bent so as to be rounded.

16. The image formation apparatus according o claim 12, wherein an impulsive sound reduction unit for reducing the impulsive sound is provided in order to satisfy the condition (d).

17. The image formation apparatus according to claim 16, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

18. An image formation apparatus in which the discomfort index S of sound obtained by the following tone quality evaluation equation (c) expressed in a regression equation, using regression coefficients of loudness value, sharpness value, tonality value and impulsiveness value of psychoacoustic parameters obtained from the operating noise at a position away from the end face of the image formation apparatus by a predetermined distance:

$$S=A\times(\text{loudness value})+B\times(\text{sharpness value})+C\times(\text{tonality value})+D\times(\text{impulsiveness value})+E,\ \text{where}$$

$$A=+0.229$$

$$B=+0.373$$

$$C=+4.327$$

$$D=+1.202$$

$$E=-3.767 \quad \text{(c)}$$

satisfies the condition of:

$$S\leqq 0.6708\times Ln(ppm)-2.824$$

$$16\leqq \text{ppm}\leqq 70 \quad \text{(b)},$$

and where ppm is defined as the number of sheets of A4 lateral size paper printed in one minute, and Ln is natural logarithm.

19. The image formation apparatus according to claim 18, wherein a pure sound component reduction unit is provided, in order to satisfy either on of the condition (b) and the equation (c).

20. The image formation apparatus according to claim 19, wherein the pure sound component reduction unit has a configuration for reducing the charging noise generated when charging is performed by an alternating current bias with respect to an image carrier.

21. The image formation apparatus according to claim 20, wherein the configuration for reducing the charging noise is a configuration for making the characteristic frequency of the image carrier a frequency different from a frequency of obtained by multiplying the frequency f of the alternating current bias by a natural number.

22. The image formation apparatus according to claim 20, wherein the configuration for reducing the charging noise is one having a sound-absorbing member inside the image carrier.

23. The image formation apparatus according to claim 20, wherein the configuration for reducing the charging noise is one for performing damping processing to the image carrier.

24. The image formation apparatus according to claim 20, wherein the configuration for reducing the charging noise is one having a sound-abs absorbing member inside the image carrier.

25. The image formation apparatus according to claim 24, wherein the high-frequency component reduction unit has a configuration for reducing the sliding noise of a recording medium in a paper feed transport unit.

26. The image formation apparatus according to claim 25, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

27. The image formation apparatus according to claim 18, wherein an impulsive sound reduction unit for reducing the impulsive sound is provided in order to satisfy the condition (b).

28. The image formation apparatus according to claim 27, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

29. An image formation apparatus in which a discomfort index S of sound obtained by the following tone quality evaluation equation (c) expressed in a regression equation, using regression coefficients of loudness value, sharpness value, tonality value and impulsiveness value of psychoacoustic parameters obtained from the operating noise at a position away from an end face of an image formation apparatus by a predetermined distance:

$$S=A\times(\text{loudness value})+B\times(\text{sharpness value})+C\times(\text{tonality value})+D\times(\text{impulsiveness value})+E,\ \text{where}$$

$$A=+0.229$$

$$B=+0.373$$

$$C=+4.327$$

$$D=+1.202$$

$$E=-3.767 \quad (c)$$

satisfies the condition of:

$$S\leqq 0.5436\times \text{nN}(ppm)-2.5795$$

$$16\leqq \text{ppm}\leqq 70 \quad (d),$$

and where ppm is defined as the number of sheets of A4 lateral size paper printed in one minute, and Ln is natural logarithm.

30. The image formation apparatus according to claim 29, wherein a high-frequency component reduction unit which reduces the high-frequency components is provided, in order to satisfy the condition (d).

31. The image formation apparatus according to claim 30, wherein the high-frequency component reduction unit has a configuration for reducing the sliding noise of a recording medium in a paper feed transport unit.

32. The image formation apparatus according to claim 31, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

33. The image formation apparatus according to claim 29, wherein an impulsive sound reduction unit for reducing the impulsive sound is provided in order to satisfy condition (d).

34. The image formation apparatus according to claim 33, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

35. An image formation apparatus in which, of loudness value, sharpness value, tonality value, impulsiveness value and ugliness value of psychoacoustic parameters obtained from operating noise at a position away from an end face of an image formation apparatus by a predetermined distance, the roughness value satisfies the condition of not larger than 2.20 (asper), and a discomfort index S of the sound obtained by the following tone quality evaluation equation (a) expressed in the regression equation, using the regression coefficients of loudness value, sharpness value, tonality value and impulsiveness value:

$$S=A\times(\text{loudness value})+B\times(\text{sharpness value})+C\times(\text{tonality value})+D\times(\text{impulsiveness value})+E,\ \text{where}$$

$$0.209\leqq A\leqq 0.249$$

$$0.308\leqq B\leqq 0.439$$

$$3.669\leqq C\leqq 4.984$$

$$0.994\leqq D\leqq 1.461$$

$$-4.280\leqq E\leqq 3.274 \quad (a)$$

satisfies the condition of:

$$S\leqq 0.6708\times \text{nN}(ppm)-2.824$$

$$16\leqq \text{ppm}\leqq 70 \quad (b),$$

and where pmm is defined as the number of sheets of A4 lateral size paper printed in one minute, and Ln is natural logarithm.

36. The image formation apparatus according to claim 35, wherein a pure sound component reduction unit is provided, in order to satisfy the condition (b).

37. The image formation apparatus according to claim 36, wherein the pure sound component reduction unit has a configuration for reducing the charging noise generated when charging is performed by an alternating current bias with respect to an image carrier.

38. The image formation apparatus according to claim 37, wherein the configuration for reducing the charging noise is a configuration for making the characteristic frequency of the image carrier a frequency different from a frequency of obtained by multiplying the frequency f of the alternating current bias by a natural number.

39. The image formation apparatus according to claim 37, wherein the configuration for reducing the charging noise is one having a sound-abs absorbing member inside the image carrier.

40. The image formation apparatus in according to claim 37, wherein the configuration for reducing the charging noise id one for performing damping processing to the image carrier.

41. The image formation apparatus according to claim 35, wherein a high-frequency component reduction unit which reduces the high-frequency components is provided, in order to satisfy the condition (b).

42. The image formation apparatus according to claim 41, wherein the high-frequency component reduction unit has a configuration for reducing the sliding noise of a recording medium in a paper feed transport unit.

43. The image formation apparatus according to claim 42, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

44. The image formation apparatus according to claim 35, wherein an impulsive sound reduction unit for reducing the impulsive sound is provided in order to satisfy the condition (b).

45. The image formation apparatus according to claim 44, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

46. An image formation apparatus in which, of loudness value, sharpness value, tonality value, impulsiveness value and roughness value of psychoacoustic parameters obtained from operating noise at a position away from an end face of an image formation apparatus by a predetermined distance, the roughness value satisfies the condition of not larger than 2.20 (asper), and a discomfort index S of the sound obtained by the following tone Quality evaluation equation (a) expressed in the regression equation, using the regression coefficients of loudness value, sharpness value, tonality value and impulsiveness value:

$$S=A\times(\text{loudness value})+B\times(\text{sharpness value})+C\times(\text{tonality value})+D\times(\text{impulsiveness value})+E, \text{ where}$$

$$0.209\leqq A\leqq 0.249$$

$$0.308\leqq B\leqq 0.439$$

$$3.669\leqq C\leqq 4.984$$

$$0.994\leqq D\leqq 1.461$$

$$-4.280\leqq E\leqq 3.274 \quad (a)$$

satisfies the condition of:

$$S\leqq 0.6708\times nN(ppm)-2.824$$

$$16\leqq ppm\leqq 70 \quad (d),$$

and where pmm is defined as the number of sheets of A4 lateral size paper printed in one minute, and Ln is natural logarithm.

47. The image formation apparatus according to claim 46, wherein high-frequency component reduction unit which reduces the high-frequency components is provided, in order to satisfy the condition (d).

48. The image formation apparatus according to claim 47, wherein the high-frequency component reduction unit has a configuration for reducing the sliding noise of a recording medium in a paper feed transport unit.

49. The image formation apparatus according to claim 48, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

50. The image formation apparatus according to claim 46, wherein an impulsive sound reduction unit for reducing the impulsive sound is provided in order to satisfy the condition (d).

51. The image formation apparatus according to claim 50, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

52. An image formation apparatus in which, of loudness value, sharpness value, tonality value, impulsiveness value and roughness value of psychoacoustic parameters obtained from operating noise at a position away from an end face of an image formation apparatus by a predetermined distance, the roughness value satisfies the condition of not larger than 2.20 (asper), and a discomfort index S of sound obtained by the following tone quality evaluation equation (c) expressed in a regression equation, using the regression coefficients of loudness value, sharpness value, tonality value and impulsiveness value of psychoacoustic parameters:

$$S=A\times(\text{loudness value})+B\times(\text{sharpness value})+C\times(\text{tonality value})+D\times(\text{impulsiveness value})+E, \text{ where}$$

$$A=+0.229$$

$$B=+0.373$$

$$C=+4.327$$

$$D=+1.202$$

$$E=-3.767 \quad (c)$$

satisfies the condition of:

$$S\leqq 0.6708\times Ln(ppm)-2.824$$

$$16\leqq ppm\leqq 70 \quad (b),$$

and where ppm is defined as the number of sheets of A4 lateral size paper printed in one minute, and Ln is natural logarithm.

53. The image formation apparatus according to claim 52, wherein a pure sound component reduction unit is provided, in order to satisfy either of the of the condition (b) and the equation (c).

54. The image formation apparatus according to claim 53, wherein the pure sound component reduction unit has a configuration for reducing the charging noise generated when charging is performed by an alternating current bias with respect to an image carrier.

55. The image formation apparatus according to claim 54, wherein the configuration for reducing the charging noise is a configuration for making the characteristic frequency of the image carrier a frequency different from a frequency obtained by multiplying the frequency f of the alternating current bias by a natural number.

56. The image formation apparatus according to claim 54, wherein the configuration for reducing the charging noise is one having a sound-absorbing member inside the image carrier.

57. The image formation apparatus according to claim 54, wherein the configuration for reducing the charging noise is one for performing da ping processing to the image carrier.

58. The image formation apparatus according to claim 52, wherein a high-frequency component reduction unit which reduces the high-frequency components is provided, in order to satisfy the condition (b).

59. The image formation apparatus according to claim 58, wherein the high-frequency component reduction unit has a configuration for reducing the sliding noise of a recording medium in a paper feed transport unit.

60. The image formation apparatus according to claim 59, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

61. The image formation apparatus according to claim 52, wherein a high-frequency component reduction unit which reduces the high-frequency components is provided, in order to satisfy the condition (b).

62. The image formation apparatus according to claim 61, wherein the high-frequency component reduction unit has a configuration for reducing the sliding noise of a recording medium in a paper feed transport unit.

63. The image formation apparatus according to claim 62, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

64. The image formation apparatus according to claim 52, wherein an impulsive sound reduction unit for reducing the impulsive sound is provided in order to satisfy the condition (b).

65. The image formation apparatus according to claim 64, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

66. An image formation apparatus in which, of loudness value, sharpness value, tonality value, impulsiveness value and roughness value of psychoacoustic parameters obtained from operating noise at a position away from an end face of an image formation apparatus by a predetermined distance, the roughness value satisfies the condition of not larger than 2.20 (asper), and a discomfort index S of sound obtained by the following tone quality evaluation equation (c) expressed in a regression equation, using the regression coefficients of loudness value, sharpness value, tonality value and impulsiveness value of psychoacoustic parameters:

$$S=A\times(\text{loudness value})+B\times(\text{sharpness value})+C\times(\text{tonality value})+D\times(\text{impulsiveness value})+E,\ \text{where}$$

$$A=+0.229$$

$$B=+0.373$$

$$C=+4.327$$

$$D=+1.202$$

$$E=-3.767 \tag{c}$$

satisfies the condition of:

$$S\leqq 0.6708\times Ln(ppm)-2.824$$

$$16\leqq \text{ppm}\leqq 70 \tag{b),}$$

and where ppm is defined as the number of sheets of A4 lateral size paper printed in one minute, and Ln is natural logarithm.

67. The image formation apparatus according to claim 66, wherein a high-frequency component reduction unit which reduces the high-frequency components is provided, in order to satisfy the condition (d).

68. The image formation apparatus according to claim 67, wherein the high-frequency component reduction unit has a configuration for reducing the sliding noise of a recording medium in a paper feed transport unit.

69. The image formation apparatus according to claim 60, wherein the high-frequency component reduction unit is a guide member which guides the recording medium, the guide member is formed of a flexible sheet, and the end portion of the flexible sheet which is brought into contact with the recording medium is curved so a not to have an edge, or bent so as to be rounded.

70. The image formation apparatus according to claim 66, wherein an impulsive sound reduction unit for reducing the impulsive sound is provided in order to satisfy the condition (d).

71. The image formation apparatus according to claim 70, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

72. An image formation apparatus in which, of loudness value, sharpness value, tonality value, impulsiveness value and relative approach value of psychoacoustic parameters obtained from operating noise at a position away from an end face of an image formation apparatus by a predetermined distance, the relative approach value satisfies the condition of not larger than 2.21, and a discomfort index S of sound obtained by the following tone quality evaluation equation (a) expressed in a regression equation, using regression coefficients of loudness value, sharpness value, tonality value and impulsiveness value:

$$S=A\times(\text{loudness value})+B\times(\text{sharpness value})+C\times(\text{tonality value})+D\times(\text{impulsiveness value})+E,\ \text{where}$$

$$0.209\leqq A\leqq 0.249$$

$$0.308\leqq B\leqq 0.439$$

$$3.669\leqq C\leqq 4.984$$

$$0.994\leqq D\leqq 1.461$$

$$-4.280\leqq E\leqq -3.274 \tag{a}$$

satisfies the condition of:

$$S\leqq 0.6708\times nN(ppm)-2.824$$

$$16\leqq \text{ppm}\leqq 70 \tag{b),}$$

and where pmm is defined as the number of sheets of A4 lateral size paper printed in one minute, and Ln is natural logarithm.

73. The image formation apparatus according to claim 72, wherein a pure sound component reduction unit is provided, in order to satisfy the condition (b).

74. The image formation apparatus according to claim 73, wherein the pure sound component reduction unit has a configuration for reducing the charging noise generated when charging is performed by an alternating current bias with respect to an image carrier.

75. The image formation apparatus according to claim 74, wherein the configuration for reducing the charging noise is a configuration for making the characteristic frequency of the image carrier a frequency different from a frequency of obtained by multiplying the frequency f of the alternating current bias by a natural number.

76. The image formation apparatus according to claim 74, wherein the configuration for reducing the charging noise is one having a sound-absorbing member inside the image carrier.

77. The image formation apparatus according to claim 74, wherein the configuration for reducing the charging noise is one for performing damping processing to the image carrier.

78. The image formation apparatus according to claim 72, wherein a high-frequency component reduction unit which reduces the high-frequency components is provided, in order to satisfy the condition (b).

79. The image formation apparatus according to claim 78, wherein the high-frequency component reduction unit has a configuration for reducing the sliding noise of a recording medium in a paper feed transport unit.

80. The image formation apparatus according to claim 79, wherein the impulsive sound reduction unit comprises a paper feed transport controls unit which controls the operation of an electromagnetic clutch provided respectively in the paper feed transport passage having a plurality of paper feed stages such that an electromagnetic clutch on the upper stage than the paper feed stage to be used is operated.

81. The image formation apparatus according to claim 72, wherein an impulsive sound reduction unit for reducing the impulsive sound is provided in order to satisfy the condition (b).

82. The image formation apparatus according to claim 81, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

83. An image formation apparatus in which, of loudness value, sharpness value, tonality value, impulsiveness value and relative approach value of psychoacoustic parameters obtained from operating noise at a position away from an end face of an image formation apparatus by a predetermined distance, the relative approach value satisfies the condition of not larger than 2.21 and a discomfort index S of the sound obtained by the following tone quality evaluation equation (a) expressed in a regression equation using the regression coefficients of loudness value sharpness value, tonality value and impulsiveness value:

$$S = A\times(\text{loudness value}) + B\times(\text{sharpness value}) + C\times(\text{tonality value}) + D\times(\text{impulsiveness value}) + E, \text{ where}$$

$$0.209 \leqq A \leqq 0.249$$

$$0.308 \leqq B \leqq 0.439$$

$$3.669 \leqq C \leqq 4.984$$

$$0.994 \leqq D \leqq 1.461$$

$$-4.280 \leqq E \leqq -3.274 \qquad (a)$$

satisfies the condition of:

$$S \leqq 0.6708\times nN(ppm) - 2.824$$

$$16 \leqq ppm \leqq 70 \qquad (d),$$

and where pmm is defined as the number of sheets of A4 lateral size paper printed in one minute, and Ln is natural logarithm.

84. The image formation apparatus according to claim 83, wherein a high-frequency component reduction unit which reduces the high-frequency components is provided, in order to satisfy the condition (d).

85. The image formation apparatus according to claim 84, wherein the high-frequency component reduction unit has a configuration for reducing the sliding noise of a recording medium in a paper feed transport unit.

86. The image formation apparatus according to claim 85, wherein the high-frequency component reduction unit is a guide member which guides the recording medium, the guide member is formed of a flexible sheet, and the end portion of the flexible sheet which is brought into contact with the recording medium is curved so a not to have an edge, or bent so as to be rounded.

87. The image formation apparatus according to claim 83, wherein an impulsive sound reduction unit for reducing the impulsive sound is provided in order to satisfy the condition (d).

88. The image formation apparatus according to claim 87, wherein the impulsive sound reduction unit comprised a paper feed transport control unit which controls the operation of an electromagnetic clutch provided respectively in the paper feed transport passage having a plurality of paper feed stages such that an electromagnetic clutch on the upper stage than the paper feed stage to be used is operated.

89. An image formation apparatus in which, of loudness value, sharpness value, tonality value, impulsiveness value and relative approach value of psychoacoustic parameters obtained from operating noise at a position away from an end face of an image formation apparatus by a predetermined distance, the relative approach value satisfies the condition of not larger than 2.21, and a discomfort index S of sound obtained by the following tone quality evaluation equation (c) expressed in a regression equation, using the regression coefficients of loudness value, sharpness value, tonality value and impulsiveness value of psychoacoustic parameters:

$$S = A\times(\text{loudness value}) + B\times(\text{sharpness value}) + C\times(\text{tonality value}) + D\times(\text{impulsiveness value}) + E, \text{ where}$$

$$A = +0.229$$

$$B = +0.373$$

$$C = +4.327$$

$$D = +1.202$$

$$E = -3.767 \qquad (c)$$

satisfies the condition of:

$$S \leqq 0.6708\times Ln(ppm) - 2.824$$

$$16 \leqq ppm \leqq 70 \qquad (b),$$

and where ppm is defined as the number of sheets of A4 lateral size paper printed in one minute, and Ln is natural logarithm.

90. The image formation apparatus according to claim 89, wherein a pure sound component reduction unit is provided, in order to satisfy either on of the condition (b) and the equation (c).

91. The image formation apparatus according to claim 90, wherein the pure sound component reduction unit has a configuration for reducing the charging noise generated when charging is performed by an alternating current bias with respect to an image carrier.

92. The image formation apparatus according to claim 91, wherein the configuration for reducing the charging noise is one having a sound-absorbing member inside the image carrier.

93. The image formation apparatus according to claim 91, wherein the configuration for reducing the charging noise is one for performing damping processing to the image carrier.

94. The image formation apparatus according to claim 90, wherein the configuration for reducing the charging noise is a configuration for making the characteristic frequency of the image carrier a frequency different from a frequency of obtained by multiplying the frequency f of the alternating current bias by a natural member.

95. The image formation apparatus according to claim 89, wherein a high-frequency component reduction unit which reduces the high-frequency components is provided, in order to satisfy the condition (b).

96. The image formation apparatus according to claim 95, wherein the high-frequency component reduction unit has a configuration for reducing the sliding noise of a recording medium in a paper feed transport unit.

97. The image formation apparatus according to claim 96, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

98. The image formation apparatus according to claim 89, wherein an impulsive sound reduction unit for reducing the impulsive sound is provided in order to satisfy condition (b).

99. The image formation apparatus according to claim 98, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

100. An image formation apparatus in which, of loudness value, sharpness value, tonality value, impulsiveness value and relative approach value of psychoacoustic parameters obtained from operating noise at a position away from an end face of an image formation apparatus by a predetermined distance, the relative approach value satisfies the condition of not larger than 2.21, and a discomfort index S of sound obtained by the following tone quality evaluation equation (c) expressed in a regression equation, using the regression coefficients of loudness value, sharpness value, tonality value and impulsiveness value of psychoacoustic parameters:

$$S = A\times(\text{loudness value}) + B\times(\text{sharpness value}) + C\times(\text{tonality value}) + D\times(\text{impulsiveness value}) + E, \text{ where}$$

$$A = +0.229$$

$$B = +0.373$$

$$C = +4.327$$

$$D = +1.202$$

$$E = -3.767 \quad \text{(c)}$$

satisfies the condition of:

$$S \leqq 0.5436\times Ln(ppm) - 2.5795$$

$$16 \leqq \text{ppm} \leqq 70 \quad \text{(d),}$$

and where ppm is defined as the number of sheets of A4 lateral size paper printed in one minute, and Ln is natural logarithm.

101. The image formation apparatus according to claim 100, wherein a high-frequency component reduction unit which reduces the high-frequency components is provided, in order to satisfy the condition (d).

102. The image formation apparatus according to claim 101, wherein the high-frequency component reduction unit has a configuration for reducing the sliding noise of a recording medium in a paper feed transport unit.

103. The image formation apparatus according to claim 102, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

104. The image formation apparatus according to claim 101, wherein an impulsive sound reduction unit for reducing the impulsive sound is provided in order to satisfy the condition (d).

105. The image formation apparatus according to claim 104, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

106. An image formation apparatus in which a discomfort index S of sound obtained by the following tone quality evaluation equation (e) expressed in a regression equation, using the regression coefficients of sound pressure level, and loudness value, sharpness value, tonality value and impulsiveness value of psychoacoustic parameters obtained from operating noise at a position away from an end face of an image formation apparatus by a predetermined distance, and ppm value:

$$S = G\times(\text{sound pressure level}) + A\times(\text{loudness value}) + B\times(\text{sharpness value}) + C\times(\text{tonality value}) + D\times(\text{impulsiveness value}), + F\times(ppm\ \text{value}) + E, \text{ where}$$

$$0.0442 \leqq G \leqq 0.0830$$

$$0.0678 \leqq A \leqq 0.1677$$

$$0.3629 \leqq B \leqq 0.5084$$

$$2.5473 \leqq C \leqq 4.0677$$

$$-0.0533 \leqq D \leqq 0.3279$$

$$-0.0058 \leqq F \leqq 0.0006$$

$$-3.7769 \leqq E \leqq 7.6274 \quad \text{(e)}$$

satisfies the condition of:

$$S \leqq 0.5432\times \text{nN}(ppm) - 2.3398$$

$$16 \leqq \text{ppm} \leqq 70 \quad \text{(f),}$$

and where pmm is defined as the number of sheets of A4 lateral size paper printed in one minute, and Ln is natural logarithm.

107. The image formation apparatus according to claim 106, wherein with respect to the noise emitted from the image formation apparatus, the discomfort index S of noise in the direction of the operating section at a distance of 1.00 m±0.03 mm from the end face of the image formation apparatus, and at a height of 1.50±0.03 m above the floor level or at a height of 1.20±0.03 m above the floor level, is within the tolerance.

108. The image formation apparatus according to claim 106, wherein with respect to the noise emitted from the image formation apparatus, the discomfort index S calculated from a mean value of physical quantity of noise in four directions of front and back, and right and left, at a distance of 1.00 m±0.03 mm from the end face of the image formation apparatus, and at a height of 1.50±0.03 m above the floor level or at a eight of 1.20±0.03 m above the floor level, is within the tolerance.

109. The image formation apparatus according to claim 106, wherein with respect to the noise emitted from the image formation apparatus, the discomfort index S of at least one side, at a distance of 1.00 m±0.03 mm from the end face of the image formation apparatus, and at a height of 1.50±0.03 m above the floor level or at a height of 1.20±0.03 m above the floor level, is within the tolerance.

110. The image formation apparatus according to claim 106, wherein with respect to the noise emitted from the image formation apparatus, the discomfort index S of noise of all the four sides, at a distance of 1.00 m±0.03 mm from the end face of the image formation apparatus, and at a height of 1.50±0.03 m above the floor level or at a height of 1.20±0.03 m above the floor level, is within the tolerance.

111. The image formation apparatus according to claim 106, wherein a high-frequency component reduction unit which reduces the high-frequency components is provided, in order to satisfy the condition (f).

112. The image formation apparatus according to claim 111, wherein the high-frequency component reduction unit has a configuration for reducing the sliding noise of a recording medium in a paper feed transport unit.

113. The image formation apparatus according to claim 112, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

114. The image formation apparatus according to claim 106, wherein an impulsive sound reduction unit for reducing the impulsive sound is provided in order to satisfy Othe condition (f).

115. The image formation apparatus according to claim 114, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

116. An image formation apparatus in which a discomfort index S of the sound obtained by the following tone equality evaluation equation (e) expressed in a regression equation, using the regression coefficients of sound pressure level, and loudness value, sharpness value, tonality value and impulsiveness value of the psychoacoustic parameters obtained from the operating noise at a position away from an end face of an image formation apparatus by a predetermined distance, and ppm value:

$$S=G\times(\text{sound pressure level})+A\times(\text{loudness value})+B\times(\text{sharpness value})+C\times(\text{tonality value})+D\times(\text{impulsiveness value}),+F\times(ppm\ \text{value})+E,\ \text{where}$$

$$0.0442\leqq G\leqq 0.0830$$

$$0.0678\leqq A\leqq 0.1677$$

$$0.3629\leqq B\leqq 0.5084$$

$$2.5473\leqq C\leqq 4.0677$$

$$-0.0533\leqq D\leqq 0.3279$$

$$-0.0058\leqq F\leqq 0.0006$$

$$-3.7769\leqq E\leqq 7.6274 \qquad (e)$$

satisfies the condition of:

$$S\leqq 0.416\times \text{LN}(ppm)-2.0952 \qquad (h)$$

$$16\leqq \text{ppm}\leqq 70,$$

and where pmm is defined as the number of sheets of A4 lateral size paper printed in one minute, and Ln is natural logarithm.

117. The image formation apparatus according to claim 116, wherein a high-frequency component reduction unit which reduces the high-frequency components is provided, in order to satisfy condition (h).

118. The image formation apparatus according to claim 117, wherein the high-frequency component reduction unit has a configuration for reducing the sliding noise of a recording medium in a paper feed transport unit.

119. The image formation apparatus according to claim 118, wherein the high-frequency component reduction unit is a guide member which guides the recording medium, the guide member is formed of a flexible sheet, and the end portion often flexible sheet which is brought into contact with the recording medium is curved so as not to have an edge, or bent so as to be rounded.

120. The image formation apparatus according claim 116, wherein an impulsive sound reduction unit for reducing the impulsive sound is provided in order to satisfy condition (h).

121. The image formation apparatus according to claim 120, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

122. An image formation apparatus in which the a discomfort index S of the sound obtained by the following tone quality evaluation equation g) expressed in a regression equation, using the regression coefficients of sound pressure level, and loudness value, sharpness value, tonality value and impulsiveness value of psychoacoustic parameters obtained from the operating noise at a position away from an end face of an image formation apparatus by a predetermined distance, and ppm value:

$$S=G\times(\text{sound pressure level})+A\times(\text{loudness value})+B\times(\text{sharpness value})+C\times(\text{tonality value})+D\times(\text{impulsiveness value})+F\times(ppm\ \text{value})+E,\ \text{where}$$

$$G=+0.0636$$

$$A=+0.1178$$

$$B=+0.4356$$

$$C=+3.3075$$

$$D=+0.1373$$

$$F=-0.0026$$

$$E=-5.7022 \qquad (g)$$

satisfies the condition of:

$$S\leqq 0.5432\times Ln(ppm)-2.3398$$

$$16\leqq \text{ppm}\leqq 70 \qquad (f),$$

and where ppm is defined as the number of sheets of A4 lateral size paper printed in one minute, and Ln natural logarithm.

123. The image formation apparatus according to claim 122, wherein with respect to the noise emitted from the image formation apparatus, the discomfort index S of noise in the direction of the operating section at a distance of 1.00 m±0.03 mm from the end face of the image formation apparatus, and at a height of 1.50±0.03 m above the floor level or at a height of 1.20±0.03 m above the floor level, is within the tolerance.

124. The image formation apparatus according to claim 122, wherein with respect to the noise emitted from the image formation apparatus, the discomfort index S calculated from a mean value of physical quantity of noise in four directions of front and back, and right and left, at a distance of 1.00 m±0.03 mm from the end face of the image formation apparatus, and at a height of 1.50±0.03 m above the floor level or at a height of 1.20±0.03 m above the floor level, is within the tolerance.

125. The image formation apparatus according to claim 122, wherein with respect to the noise emitted from the image formation apparatus, the discomfort index S of at least one side, at a distance of 1.00 m±0.03 mm from the end face of the image formation apparatus, and at a height of 1.50±0.03 m above the floor level or at a eight of 1.20±0.03 m above the floor level, is within the tolerance.

126. The image formation apparatus according to claim 122, wherein with respect to the noise emitted from the image formation apparatus, the discomfort index S of noise of all the four sides, at a distance of 1.00 m±0.03 mm from the end face of the image formation apparatus, and at a height of 1.50±0.03 m above the floor level or at a height of 1.20±0.03 m above the floor level, is within the tolerance.

127. The image formation apparatus according to claim 122, wherein a high-frequency component reduction unit which reduces the high-frequency components is provided, in order to satisfy the condition (f).

128. The image formation apparatus according to claim 127, wherein the high-frequency component reduction unit has a configuration for reducing the sliding noise of a recording medium in a paper feed transport unit.

129. The image formation apparatus according to claim 128, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

130. The image formation apparatus according to claim 122, wherein an impulsive sound reduction unit for reducing the impulsive sound is provided in order to satisfy the condition (f).

131. The image formation apparatus according to claim 130, wherein the impulsive sound reduction unit comprises a paper feed transport control unit which controls the operation of an electromagnetic clutch provided respectively in the paper feed transport passage having a plurality of paper feed stages such that an electromagnetic clutch on the upper stage than the paper feed stage to be used is operated.

132. An image formation apparatus in which discomfort index S of sound obtained by the following tone quality evaluation equation (g) expressed in a regression equation, using the regression coefficients of sound pressure level, and loudness value, sharpness value, tonality value and impulsiveness value of psychoacoustic parameters obtained from the operating noise at a position away from an end face of an image formation apparatus by a predetermined distance, and ppm value:

$$S = G\times(\text{sound pressure level}) + A\times(\text{loudness value}) + B\times(\text{sharpness value}) + C\times(\text{tonality value}) + D\times(\text{impulsiveness value}) + F\times(ppm\ \text{value}) + E, \text{ where}$$

$$G=+0.0636$$

$$A=+0.1178$$

$$B=+0.4356$$

$$C=+3.3075$$

$$D=+0.1373$$

$$F=-0.0026$$

$$E=-5.7022 \quad \text{(g)}$$

satisfies the condition of:

$$S \leqq 0.0416\times Ln(ppm) - 2.0952$$

$$16 \leqq ppm \leqq 70,$$

and where ppm is defined as the number of sheets of A4 lateral size paper printed in one minute, and Ln s natural logarithm.

133. The image formation apparatus according to claim 132, wherein a reduction unit which reduces the high-frequency components is provided, in order to satisfy condition (h).

134. The image formation apparatus according to claim 133, wherein the high-frequency component reduction unit has a configuration for reducing the sliding noise of a recording medium in a paper feed transport unit.

135. The image formation apparatus according to claim 134, wherein the high-frequency component reduction unit is a guide member which guides the recording medium, the guide member is formed of a flexible sheet, and the end portion of the flexible sheet which is brought into contact with the recording medium is curved so as not to have an edge, or bent so as to be rounded.

136. The image formation apparatus according to claim 132, wherein an impulsive sound reduction unit for reducing the impulsive sound is provided in order to satisfy condition (h).

137. The image formation apparatus according to claim 136, wherein the impulsive sound reduction unit comprises a paper feed transport controls unit which controls the operation of an electromagnetic clutch provided respectively in the paper feed transport passage having a plurality of paper feed stages such that an electromagnetic clutch on the upper stage than the paper feed stage to be used is operated.

138. A tone quality improving method of an image formation apparatus comprising:

deriving a tone quality evaluation equation capable of evaluating uncomfortable noise emitted from the image formation apparatus, by using the loudness value, sharpness value, tonality value and impulsiveness value, being psychoacoustic parameters; and decreasing the discomfort index obtained by the equation to a certain value, by reducing the noise having the correlation with a particular psychoacoustic parameter of the psychoacoustic parameters.

139. The tone quality improving method of an image forma ion apparatus according to claim 138, wherein sliding noise at the time of carrying the paper, which has the correlation with the sharpness value and the loudness value, is decreased.

140. The tone quality improving method of an image formation apparatus according to claim 138, wherein the charging noise of an image carrier having the correlation with the tonality value is decreased.

141. The tone quality improving method of an image formation apparatus according to claim 138, wherein the noise of the electromagnetic clutch of the paper feed unit having the correlation with the impulsiveness value, loudness value and sharpness value is decreased.

* * * * *